(12) United States Patent
Murakami et al.

(10) Patent No.: US 8,445,081 B2
(45) Date of Patent: May 21, 2013

(54) POLARIZING PLATE PROTECTIVE FILM, POLARIZING PLATE AND LIQUID CRYSTAL DISPLAY DEVICE

(75) Inventors: Takashi Murakami, Hachioji (JP); Noriyasu Kuzuhara, Kunitachi (JP); Minori Tamagawa, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 992 days.

(21) Appl. No.: 11/880,986

(22) Filed: Jul. 25, 2007

(65) Prior Publication Data

US 2008/0049324 A1 Feb. 28, 2008

(30) Foreign Application Priority Data

Jul. 31, 2006 (JP) .................................. 2006-207638

(51) Int. Cl.
*G02F 1/1335* (2006.01)
*C08L 1/10* (2006.01)

(52) U.S. Cl.
USPC ........... 428/1.33; 428/1.31; 349/96; 349/122; 106/171.1

(58) Field of Classification Search
USPC ........... 428/1.3–1.31, 1.33; 349/96, 117–122; 106/171.1
See application file for complete search history.

(56) References Cited

U.S. PATENT DOCUMENTS

| | | | |
|---|---|---|---|
| 2002/0102369 A1* | 8/2002 | Shimizu et al. | 428/1.33 |
| 2003/0171458 A1* | 9/2003 | Buchanan et al. | 524/32 |
| 2004/0247889 A1* | 12/2004 | Nakajima et al. | 428/423.1 |
| 2005/0208231 A1* | 9/2005 | Nimura et al. | 428/1.3 |

FOREIGN PATENT DOCUMENTS

| | | |
|---|---|---|
| JP | 2003-012859 A | 1/2003 |
| JP | 2004-315613 A | 11/2004 |
| JP | 2006-063266 A | 3/2006 |
| JP | 2006-265301 A | 10/2006 |
| JP | 2007-138121 A | 6/2007 |
| JP | 2007-169592 A | 7/2007 |
| JP | 2007-307826 A | 11/2007 |

OTHER PUBLICATIONS

JPO Website Machine English Translation of JP 2007-169592, Se et al., Jul. 5, 2007.*
Japanese Office Action mailed Apr. 24, 2012 in Patent Application No. TOKUGAN No. 2008-527705.

* cited by examiner

*Primary Examiner* — Sophie Hon
(74) *Attorney, Agent, or Firm* — Holtz Holtz Goodman & Chick PC

(57) ABSTRACT

A polarizing plate protective film comprising a cellulose ester, and a saccharide ester compound in which all or a part of OH groups in Compound (A) or in Compound (B) are esterified, wherein Compound (A) consists of one of a furanose structure and a pyranose structure, and Compound (B) consists of two to twelve of at least one type of a furanose structure and a pyranose structure which are bonded in Compound (B); wherein the polarizing plate protective film exhibits its Ro of 0-10 nm and Rt of −30 to +20 nm.

5 Claims, No Drawings

POLARIZING PLATE PROTECTIVE FILM, POLARIZING PLATE AND LIQUID CRYSTAL DISPLAY DEVICE

This application is based on Japanese Patent Application No. 2006-207638 filed on Jul. 31, 2006 in Japanese Patent Office, the entire content of which is hereby incorporated by reference.

FIELD OF THE INVENTION

The present invention relates to a polarizing plate protective film, a polarizing plate and a liquid crystal display device, and more specifically, relates to a polarizing plate and a liquid crystal display device, which have a low Rt and depressed retardation value variation under varying humidity enabling stabilized display quality.

BACKGROUND

In accordance with demand for higher performance and/or higher quality of a liquid crystal display device, various requirements have been made on polarizing plate protective film.

As ordinary polarizing plate protective film for a liquid crystal display device, primarily utilized is film comprised of cellulose ester as a raw material. Cellulose ester film production generally employs a solution casting method in view of enhanced flatness, and also since said method tends to decrease refractive index in the thickness direction compared to the refractive index in the plane of the film.

In Patent Document 1, cellulose ester film, the optical anisotropy of which has been decreased by addition of an ethylenical polymer, is described, and film can be prepared in which particularly the retardation value in the thickness direction Rt can be decreased.

Further, an in-plain switching mode type (hereinafter, referred to as an IPS type) liquid crystal display device, to improve display ability (viewing angle, color, and gray scale, etc.) of a liquid crystal display device, it is more preferable to utilize a polarizing plate employing cellulose ester film exhibiting a low retardation value compared to a polarizing plate employing conventional cellulose ester, and film described in Patent Document 1 described above, among others, exhibits excellent optical characteristics.

However, when a polarizing plate incorporating a cellulose ester film, the optical anisotropy of which has been decreased, is utilized in a liquid crystal display device, it has been proven that variation of visual recognition such as contrast decreases and color shift due to excessive heat from a backlight, in the case of being used under an environment of such as high temperature and high humidity for a long duration, which required rushed improvement.

[Patent Document 1] Unexamined Japanese Patent Application Publication No. (herein after, referred to as JP-A) 2003-12859

SUMMARY OF THE INVENTION

Problems to be Solved by Present Invention

This invention has been created in view of the above-discussed problems. An object is to provide a cellulose ester type polarizing plate protective film, which exhibits high retardation stability even when used under an environment of such as high temperature and high humidity for a long duration, as well as a polarizing plate and a liquid crystal display device, which utilize the same and exhibit excellent viewing angle stability. Specifically, the object of this invention is to provide a polarizing plate suitable for an IPS type liquid crystal display device, such as IPS and FFS.

Means to Solve the Problems

The above-described object of this invention can be achieved by the following conditions.

Item 1. A polarizing plate protective film comprising:
a cellulose ester;
a saccharide ester compound in which all or a part of OH groups in Compound (A) or in Compound (B) are esterified, wherein Compound (A) consists of one of a furanose structure and a pyranose structure, and Compound (B) consists of two to twelve of at least one type of a furanose structure and a pyranose structure which are bonded in Compound (B);
wherein the polarizing plate protective film exhibits Ro of 0-10 nm and Rt of −30 to +20 nm, which are represented by the following equations.

$$Ro = (nx - ny) \times d \qquad \text{Equation (i)}$$

$$Rt = [(nx + ny)/2 - nz] \times d \qquad \text{Equation (ii)}$$

wherein, Ro is a retardation value in the film plane; Rt is a retardation value in the thickness direction; nx is a refractive index in the slow axis direction in the film plane; ny is a refractive index in the fast axis direction in the film plane; nz is a refractive index in the film thickness direction (refractive index was measured under an environment of 23° C. and 55% RH, at a wavelength of 590 nm); and d is a film thickness (nm)).

Item 2. The polarizing plate protective film described in Item 1 above, further comprising an acryl polymer having a weight average molecular weight of not less than 2,000 and not more than 30,000 or a polyester having no aromatic ring and having a weight average molecular weight of not less than 500 and not more than 10,000.

Item 3. The polarizing plate protective film described in above Item 2, wherein as the acryl polymer, the polarizing plate protective film contains Polymer X prepared by copolymerization of ethylenically unsaturated monomer Xa, which has at least no aromatic ring nor a hydrophilic group in a molecule, and ethylenically unsaturated monomer Xb, which has no aromatic ring but has a hydrophilic group in a molecule, and Polymer X has a weight average molecular weight of not less than 2,000 and not more than 30,000.

Item 4. The polarizing plate protective film described in Item 2 above, wherein as the acryl polymer, the polarizing plate protective film contains Polymer X which is represented by following Formula (X) and prepared by copolymerization of ethylenically unsaturated Monomer Xa, which has at least no aromatic ring nor a hydrophilic group in the molecule, and ethylenically unsaturated Monomer Xb, which has no aromatic ring but has a hydrophilic group in a molecule, and Polymer X has a weight average molecular weight of not less than 2,000 and not more than 30,000; and Polymer Y which is represented by following Formula (Y) and prepared by polymerization of ethylenically unsaturated monomer Ya having no an aromatic ring and Polymer Y has a weight average molecular weight of not less than 500 and not more than 3,000.

$$-(Xa)m-(Xb)n-(Xc)p- \qquad \text{Formula (X)}$$

In the formula, Xc is a monomer unit polymerizable with Xa and Xb. m, n and p are a mole composition ratio. Herein, m and n are never 0, and m+n+p=100.

$$-(Ya)k-(Yb)q- \quad \text{Formula (Y)}$$

In the formula, Yb is a monomer unit copolymerizable with Ya. k and q are a mole composition ratio. Herein, k+q=100.

Item 5. The polarizing plate protective film described in Item 3 or 4, wherein aforesaid Polymer X is represented by following Formula (X-1) and aforesaid Polymer Y is represented by following Formula (Y-1).

$$—[CH_2—C(—R_1)(—CO_2R_2)]m-[CH_2—C(—R_3)(—CO_2R_4—OH-]n-[Xc]p- \quad \text{Formula (X-1)}$$

$$—[CH_2—C(—R_5)(—CO_2R_6)—]k-[Yb]q- \quad \text{Formula (Y-1)}$$

In the formula, $R_1$, $R_3$ and $R_5$ is H or $CH_3$. $R_2$ is an alkyl group or a cycloalkyl group having a carbon number of 1-12. $R_4$ and $R_6$ are —$CH_2$—, —$C_2H_4$— or —$C_3H_6$—. Xc is a monomer unit polymerizable with Xa and Xb. Yb is a monomer unit copolymerizable with Ya. m, n, k, p and q are a mole composition ratio. Herein, m, n and k are never 0; m+n+p=100 and k+q=100.

Item 6. The polarizing plate protective film described in aforesaid Item 2, wherein the polarizing plate protective film contains a compound represented by following Formula (B1) or (B2) as the aforesaid polyester.

$$B_1\text{-}(G\text{-}A\text{-})mG\text{-}B_1 \quad \text{Formula (B1)}$$

wherein $B_1$ is mono-carboxylic acid having 1-12 carbon atoms; G is dihydric alcohol having 2-12 carbon atoms; and A is dibasic acid having 2-12 carbon atoms. Neither of $B_1$, G and A contains an aromatic ring. m is a repeating number.

$$B_2\text{-}(A\text{-}G\text{-})nA\text{-}B_2 \quad \text{Formula (B2)}$$

wherein, $B_2$ is monohydric alcohol having 1-12 carbon atoms; G is dihydric alcohol having 2-12 carbon atoms; and A is dibasic acid having 2-12 carbon atoms. Neither of $B_2$, G and A contains an aromatic ring. n is a repeating number.

Item 7. The polarizing plate protective film described in aforesaid item 1, wherein the polarizing plate protective film further comprising at least one kind of additive selected from Formulas (1), (2), (3), (4), (5), (6), (7), (8), (9), (10), (11), (12), (13) and (14).

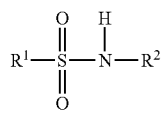

Formula (1)

(wherein, $R^1$ and $R^2$ are each independently an alkyl group which may be provided with a substituent or an aryl group which may be provided with a substituent.)

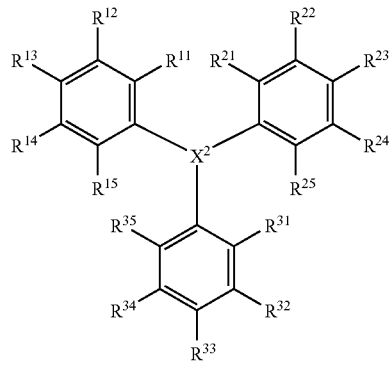

Formula (2)

(wherein, $X^2$ is B, C—R (R is a hydrogen atom or a substituent.) or N. $R^{11}$, $R^{12}$, $R^{13}$, $R^{14}$, $R^{15}$, $R^{21}$, $R^{22}$, $R^{23}$, $R^{24}$ $R^{25}$, $R^{31}$, $R^{32}$, $R^{33}$, $R^{34}$ and $R^{35}$ are a hydrogen atom or a substituent.)

$$R1\text{-}(OH)n \quad \text{Formula (3)}$$

(wherein, R1 is an n-valent organic group and n is a positive integer of not less than 2.)

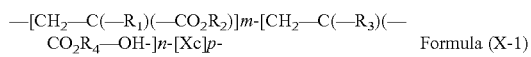

Formula (4)

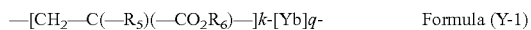

Formula (5)

Formula (6)

Formula (7)

Formula (8)

Formula (9)

-continued

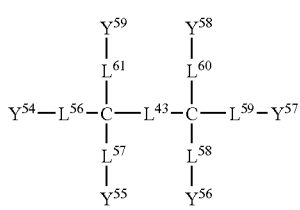

Formula (10)

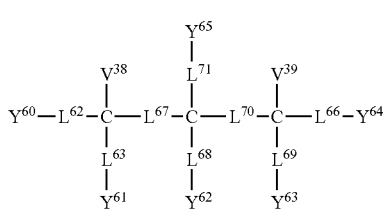

Formula (11)

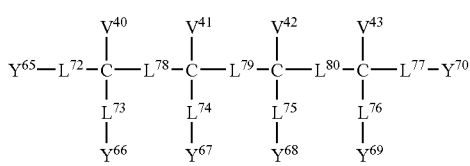

Formula (12)

(wherein, $Y^{31}$-$Y^{70}$ are each independently an acyloxy group having 1-20 carbon atoms, an alkoxycarbonyl group having 2-20 carbon atoms, an amido group having 1-20 carbon atoms, a carbamoyl group having 1-20 carbon atoms or a hydroxyl group. $V^{31}$-$V^{43}$ are each independently a hydrogen atom or an aliphatic group having 1-20 carbon atoms. $L^{31}$-$L^{80}$ are each independently a single bond or a divalent saturated connecting group having 0-20 carbon atoms. $V^{31}$-$V^{43}$ and $L^{31}$-$L^{80}$ may be further provided with a substituent.)

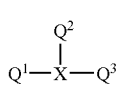

Formula (13)

(wherein, $Q^1$, $Q^2$ and $Q^3$ are each independently a group having a 5-member ring or a 6-member ring. The ring includes a hydrocarbon ring and a heterocyclic ring. The ring may form a condensed ring together with other rings.)

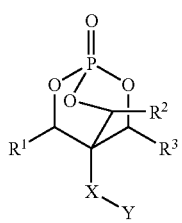

Formula (14)

(wherein, $R^1$, $R^2$ and $R^3$ are each independently a hydrogen atom or an alkyl group having 1-5 carbon atoms; X is a single bond, —O—, —CO—, an alkylene group or an arylene group; and Y is a hydrogen atom, an alkyl group, an aryl group or an aralkyl group.)

Item 8. A polarizing plate comprising a polarizing plate protective film described in any one of aforesaid Items 1-7 on at least one surface of a polarizer.

Item 9. A liquid crystal display device comprising the polarizing plate described in aforesaid Item 8 being pasted on at least one surface of a liquid crystal cell.

Item 10. The liquid crystal display device described in aforesaid Item 9, wherein the liquid crystal display device is an IPS mode type liquid crystal display device.

Effects of the Invention

This invention can provide a cellulose ester type polarizing plate protective film having high retardation stability even in the case of being kept under an environment of such as high temperature and high humidity for a long period. In particular, this invention can provide a polarizing plate protective film suitable for an IPS type liquid crystal display device such as IPS and FTS.

DETAILED DESCRIPTION OF THE INVENTION

In the following, the most preferable embodiment to practice this invention will be detailed; however, this invention is not limited thereto.

The inventors of this invention, as a result of extensive study in view of the above-described problems, have found that, by employing a polarizing plate protective film characterized by containing polarizing plate protective film comprising, a cellulose ester; a saccharide ester having, an ester of Compound (A), Compound (A) having one furanose structure or one pyranose structure in the molecule, wherein all or a part of OH groups in Compound (A) are esterified; or an ester of Compound (B), Compound (B) having two to twelve of at least one of a furanose structure and a pyranose structure bonded in the molecule, wherein all or a part of OH groups in Compound (B) are esterified; wherein the polarizing plate protective film exhibits Ro of 0-10 nm and Rt of −30-+20 nm, wherein Ro and Rt are represented by the following equations; cellulose ester type polarizing plate protective film having a high retardation stability and a polarizing plate and a liquid crystal display device, which utilize the same and exhibit an excellent viewing angle, can be provided.

$$Ro=(nx-ny)\times d \qquad \text{Equation (i)}$$

$$Rt=((nx+ny)/2-nz)\times d \qquad \text{Equation (ii)}$$

(wherein, Ro is a retardation value in the film plane; Rt is a retardation value in the thickness direction; nx is a refractive index in the slow axis direction in the film plane; ny is a refractive index in the fast axis direction in the film plane; nz is a refractive index in the film thickness direction (refractive index was measured under an environment of 23° C. and 55% RH, at a wavelength of 590 nm); and d is a film thickness (nm)).

Among them, the inventors have also found that polarizing plate protective film preferably contains an acryl polymer having a weight average molecular weight of not less than 500 and not more than 30,000 or a polyester having no aromatic ring and having a weight average molecular weight of not less than 500 and not more than 10,000 or a compound represented by Formulas (1)-(14).

In the following, this invention will be detailed.

<Compound Provided with Furanose Structure or Pyranose Structure of this Invention>

A polarizing plate protective film of the present invention is characterized by containing: a cellulose ester; and a saccharide ester compound in which all or a part of OH groups in Compound (A) having one of a furanose structure and a pyranose structure or in Compound (B) in which two to twelve of at least one type of a furanose structure and a pyranose structure are bonded, are esterified.

Preferable examples of Compound (A) and Compound (B) include the following compounds, but this invention is not limited to these examples.

As preferable examples of Compound (A), glucose, galactose, mannose, fructose, xylose, and arabinose may be cited.

As preferable examples of Compound (B), lactose, sucrose, nystose, cellobiose, maltose, cellotriose, maltotriose, raffinose and kestose may be cited.

Among Compound (A) and Compound (B), the specifically preferable compound are those having both of the furanose structure and the pyranose structure. As the example, listed is sucrose.

Monocarboxylic acid utilized at the time of synthesis of "a saccharide ester compound in which all or a part of OH groups in Compound (A) or in Compound (B) are esterified, wherein Compound (A) consists of one of a furanose structure and a pyranose structure, and Compound (B) consists of two to twelve of at least one type of a furanose structure and a pyranose structure which are bonded in Compound (B)" of this invention, is not specifically limited, and such as aliphatic monocarboxylic acid, alicyclic monocarboxylic acid and aromatic monocarboxylic acid, well known in the art, can be utilized for esterification to prepare a sugar ester compound which will be employed in this invention. Utilized monocarboxylic acid may be one type or a mixture of not less than two types.

Preferable aliphatic monocarboxylic acid includes saturated fatty acid such as acetic acid, propionic acid, butyric acid, isobutyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid, arachidic acid and octenoic acid.

Preferable examples of alicyclic monocarboxylic acid include cyclopentane carboxylic acid, cyclohexane carboxylic acid and cyclooctane carboxylic acid; or derivatives thereof.

Preferable examples of aromatic monocarboxylic acid include aromatic monocarboxylic acid, in which a substituent such as an alkyl group or an alkoxy group having a carbon number of 1-5 is introduced in a benzene ring of benzoic acid such as benzoic acid and toluic acid; aromatic monocarboxylic acid having at least two benzene rings such as cinnamic acid, benzylic acid, biphenyl carboxylic acid, naphthaline carboxylic acid and tetraline carboxylic acid; or derivatives thereof, however, benzoic acid is specifically preferable.

Among the esterified compounds of Compound (A) and Compound (B) (being saccharide ester compounds), an acetylated compound in which acetyl groups are introduced by esterification, is preferable.

Details of the production method of the above acetylated compounds are described in JP-A No. 8-245678.

In addition to the esterified compound of Compound (A) and Compound (B), an esterified compound of oligosaccharide can be employed as an esterified compound of a compound in which three to twelve of at least one type of a furanose structure and a pyranose structure are bonded.

The oligosaccharide can be produced by acting a ferment such as amylase to starch, cane sugar and so on. As a oligosaccharide usable for the invention, marthe oligosaccharide, iso-marthe oligosaccharide, fructo oligosaccharide, galact oligosaccharide, and xylo oligosaccharide may be listed.

The oligosaccharide can be acetylated with the same method as that for the above Compounds (A) and (B).

Next, a production example of a saccharide ester compound is described.

Two hundreds ml of acetic anhydride was dropped into a solution in which 100 ml of pyridine was added into 29.8 g, 166 mmol of glucose and a reaction among them was conducted for 24 hours. Subsequently, the resultant solution was condensed with an evaporator and the condensed solution was put in iced water. After leaving it alone for one hour, the solution was filtered with a glass filter so as to separate a solid and water, and then the solid on the glass filter was dissolved with chloroform, and the solution is separated with chilled water until the solution became neutrality. After separating an organic layer, it was dried with anhydrous sodium sulfate. Further, after removing the anhydrous sodium sulfate by filtration, chloroform was removed with an evaporator, and then conducting drying under reduced pressure, whereby glucose penta acetate (58.8 g, 150 mmol, 90.9%) was obtained.

Incidentally, the above monocarboxylic acid can be used instead of the above-mentioned acetic anhydride.

In the following, specific examples of a saccharide ester compound of this invention will be listed, however, this invention is not limited thereto.

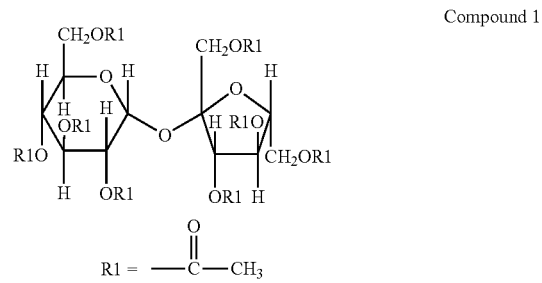

Compound 1

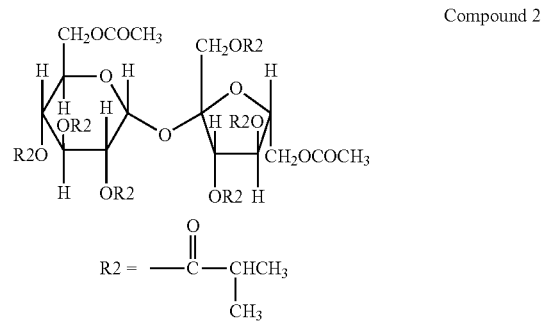

Compound 2

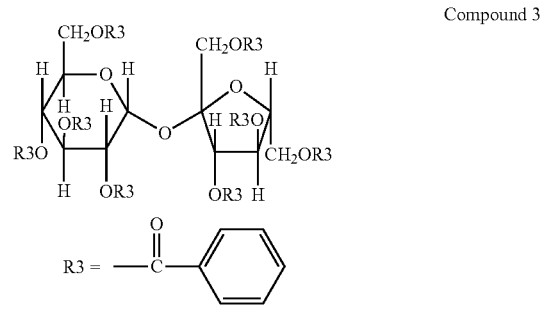

Compound 3

-continued
Compound 4
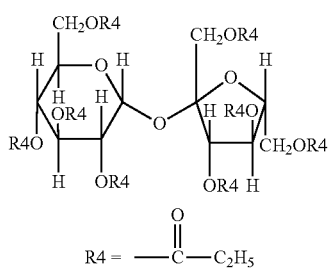
R4 = —C(=O)—C₂H₅
Compound 5
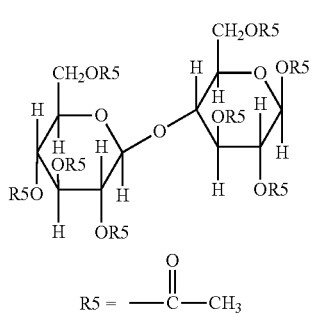
R5 = —C(=O)—CH₃
Compound 6
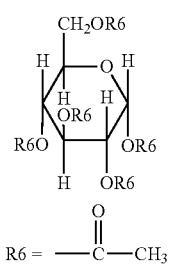
R6 = —C(=O)—CH₃
Compound 7
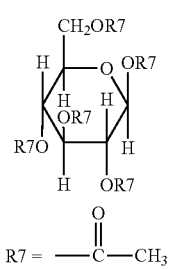
R7 = —C(=O)—CH₃
Compound 8
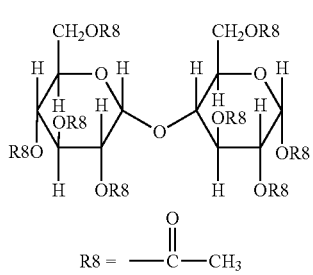
R8 = —C(=O)—CH₃
Compound 9
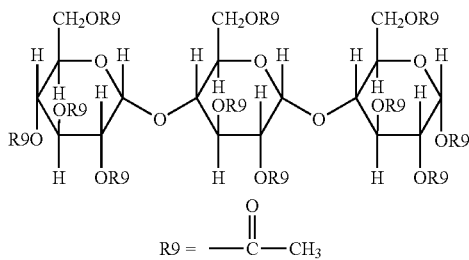
R9 = —C(=O)—CH₃
Compound 10
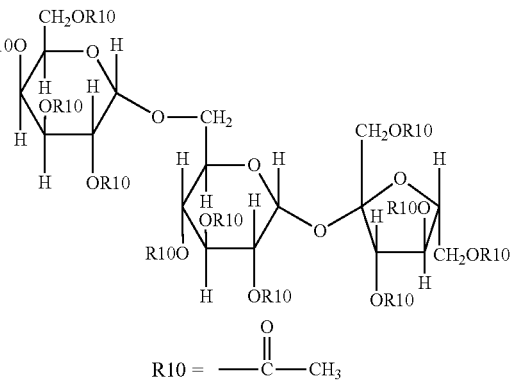
R10 = —C(=O)—CH₃
Compound 11
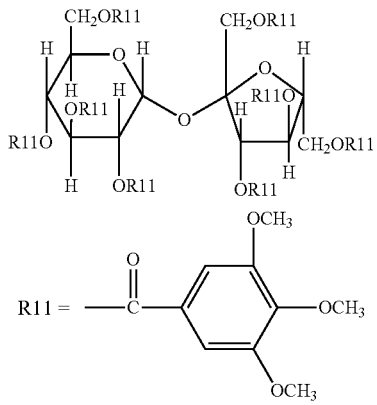
R11 = —C(=O)—C₆H₂(OCH₃)₃
Compound 12
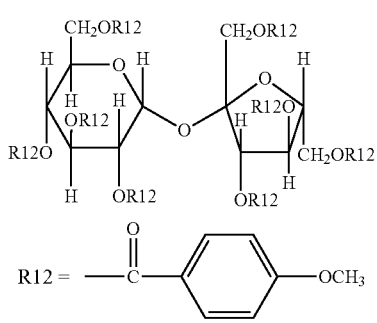
R12 = —C(=O)—C₆H₄—OCH₃

-continued
Compound 13
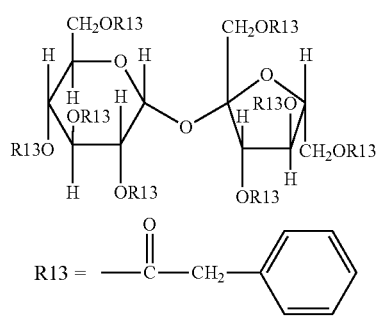
Compound 14
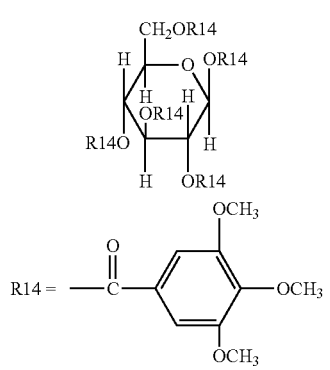
Compound 15
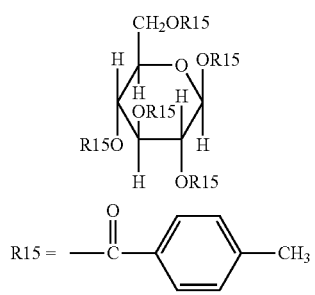
Compound 16
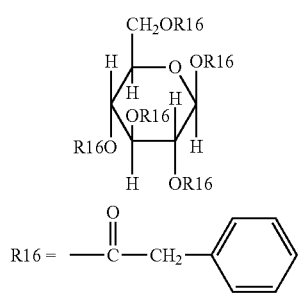
Compound 17
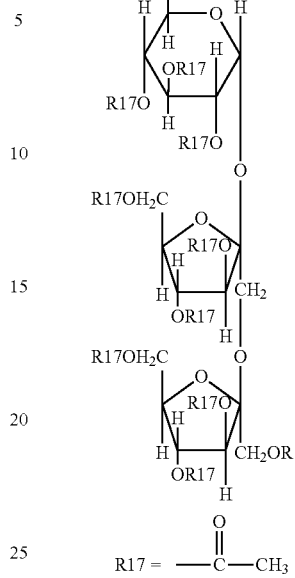
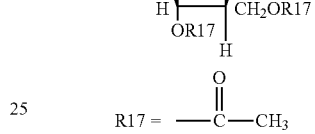
Compound 18
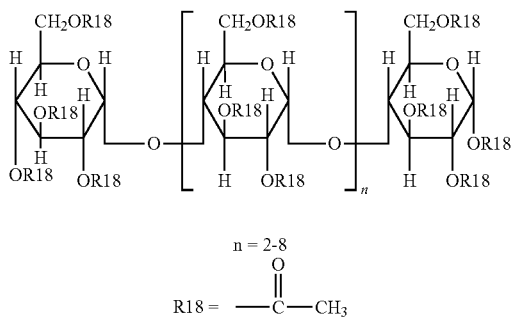
Compound 19
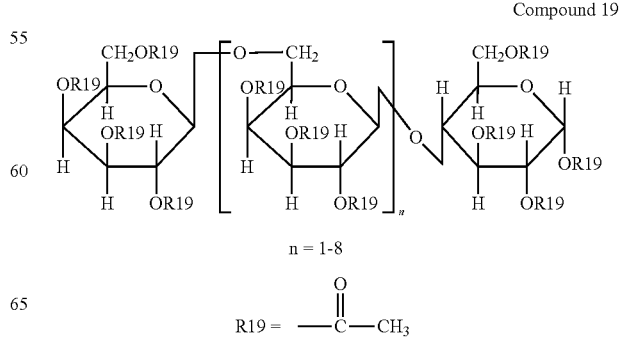

-continued

Compound 20

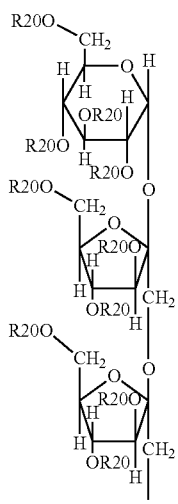

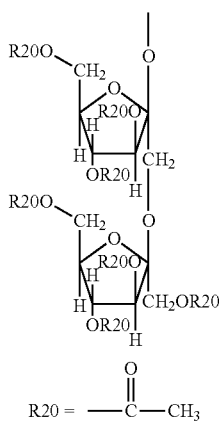

R20 = —C(=O)—CH₃

Compound 21

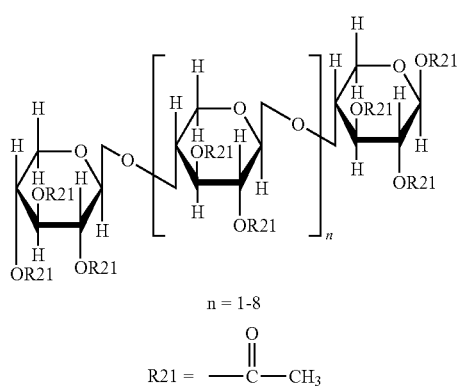

n = 1-8

R21 = —C(=O)—CH₃

-continued

Compound 22

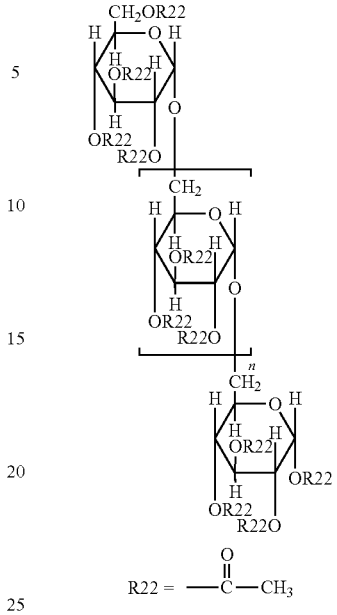

R22 = —C(=O)—CH₃

Polarizing plate protective film of this invention preferably contains a saccharide ester compound in which all or a part of OH groups in Compound (A) or in Compound (B) are esterified, wherein Compound (A) consists of one of a furanose structure and a pyranose structure, and Compound (B) consists of two to twelve of at least one type of a furanose structure and a pyranose structure which are bonded in Compound (B), at 1-35 weight % and specifically at 5-30 weight % in film, to restrain variation on humidity of a phase difference value on humidity and to stabilize display quality. In this range, it is preferable that excellent effects of this invention are exhibited as well as no bleed out is observed during storage of a master roll. Among them, it is preferable to combine a saccharide ester compound in which all OH groups are esterified and a saccharide ester compound in which more than one OH groups are remained. This will help to further reduce bleeding out and changes of viewing angle, compared to the case of using only a saccharide ester compound in which all OH groups are esterified. For example, preferred is a mixture of sucrose octaacetate, sucrose heptaacetate, and sucrose hexaacetate. The mixing ratio of them is not specifically limited, but cited may be, for example, 30:30:30, 40:30: 30, 40:50:10, 50:30:20, 60:30:10, 80:10:10, 90:7:3, and 95:5: 0. The ratio is controlled by adjustment of reaction time or an added amount of each acid at the time of esterification of saccharides, or by mixing of each saccharide ester compound.

<Acryl Polymer, Polyester>

Polarizing plate protective film of this invention preferably contains acryl polymer having a weight average molecular weight of not less than 500 and not more than 30,000, as polymer resin to control a retardation value, and among them preferably contains polymer X having a weight average molecular weight of not less than 2,000 and not more than 30,000, and more preferably not less than 5,000 and not more than 30,000, which is prepared by copolymerization of ethylenically unsaturated monomer Xa which contains no aromatic ring nor a hydrophilic group in a molecule and ethylenically unsaturated monomer Xb which contains no aromatic ring but contains a hydrophilic group in a molecule, and more preferably contains polymer X having a weight average molecular weight of not less than 2,000 and not more than 30,000, which is prepared by copolymerization of ethylenically unsaturated monomer Xa which contains no aromatic ring nor a hydrophilic group in a molecule and ethylenically unsaturated monomer Xb which contains no aromatic ring but contains a hydrophilic group in a molecule, and Polymer Y having a weight average molecular weight of not less than 500 and not more than 3,000, which is prepared by polymerization of ethylenically unsaturated monomer Ya provided with no aromatic ring.

<Polymer X, Polymer Y>

Polymer X of this invention is a polymer having a weight average molecular weight of not less than 2,000 and not more than 30,000, which is prepared by copolymerization of ethylenically unsaturated monomer Xa which contains no aromatic ring nor a hydrophilic group in a molecule and ethylenically unsaturated monomer Xb which contains no aromatic ring but contains a hydrophilic group in a molecule.

Xa is preferably acryl or methacryl monomer provided with no aromatic ring and no hydrophilic group in a molecule, and Xb is preferably acryl or methacryl monomer provided with no aromatic ring but provided with a hydrophilic group, in a molecule.

Polymer X of this invention is represented by following Formula (X):

$-(Xa)m-(Xb)n-(Xc)p-$    Formula (X)

And Polymer X is a more preferable polymer represented by following Formula (X-1).

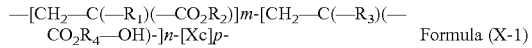

$-[CH_2-C(-R_1)(-CO_2R_2)]m-[CH_2-C(-R_3)(-CO_2R_4-OH)-]n-[Xc]p-$    Formula (X-1)

(wherein, $R_1$ and $R_3$ is H or $CH_3$. $R_2$ is an alkyl group or a cycloalkyl group having a carbon number of 1-12. $R_4$ is $-CH_2-$, $-C_2H_4-$ or $-C_3H_6-$. Xc is a monomer unit polymerizable with Xa and Xb. m, n and p are a mole composition ratio. Herein, m, n and k are never 0; and m+n+p=100)

Monomer as a monomer unit constituting Polymer X of this invention will be listed below; however, this invention is not limited thereto.

In Polymer X, a hydrophilic group refers to a hydroxide group and a group provided with an ethylene oxide connecting chain.

Ethylenically unsaturated monomer Xa which is provided with no aromatic ring nor hydrophilic group in a molecule includes such as methylacrylate, ethyl acrylate, (i-, n-) propyl acrylate, (n-, i-, s-, t-) butyl acrylate, (n-, i-, s-) pentyl acrylate, (n-, i-) hexyl acrylate, (n-, i-) heptyl acrylate, (n-, i-) octyl acrylate, (n-, i-) nonyl acrylate, (n-, i-) myristyl acrylate, (2-ethylhexyl)acrylate, (ε-caploractone)acrylate, (2-hydroxyethyl)acrylate and (2-ethoxyethyl)acrylate; or those in which acrylic ester described above are converted to methacrylic ester. Among them, methyl acrylate, ethyl acrylate, methyl methacrylate, ethyl methacrylate and (n-, i-) propyl acrylate are preferable.

Ethylenically unsaturated monomer Xb, which is provided with no aromatic ring but is provided with a hydrophilic group, is preferably acrylic ester or methacrylic ester as a monomer unit having a hydroxyl group, and includes (2-hydroxyethyl)acrylate, (2-hydroxypropyl)acrylate, (3-hydroxypropyl)acrylate, (4-hydroxybutyl)acrylate and (2-hydroxybutyl)acrylate; or those in which these acrylic acid is replaced by metharylic acid; and preferably (2-hydroxyethyl)acrylate, (2-hydroxyethyl)methacrylate, (2-hydroxypropyl)acrylate and (3-hydroxypropyl)acrylate.

Xc is not specifically limited provided being ethylenically unsaturated monomer other than Xa and Xb, and capable of copolymerization with Xa and Xb, however, is preferably those having no aromatic ring.

The mole composition ratio of Xa, Xb and Xc is preferably in a range of 99/1-65/35, and more preferably in a range of 95/5-75/25. p of Xc is 0-10. Xc may be plural monomer units.

When a mole composition ratio of Xa is large, compatibility with cellulose ester is improved; however, retardation value in the film thickness direction Rth is increased. When a mole composition ratio of Xb is large, the above-described compatibility is deteriorated; however, an effect to decrease Rth is high. Further, when a mole composition ratio of Xb is over the above-described range, there is a tendency of causing haze at the time of casting, and it is preferable to determine mole composition ratios of Xa and Xb so as to optimize these effects.

The molecular weight of Polymer X is not less than 2,000 and not more than 30,000, more preferably not less than 5,000 and not more than 30,000, and still more preferably not less than 8,000 and not more than 25,000, based on a weight average molecular weight.

By setting the weight average molecular weight to not less than 2,000, specifically not less than 5,000, it is preferable that obtained can be advantages such as small dimension variation of cellulose ester film under high temperature and high humidity and small curl as polarizing plate protective film. When the weight average molecular weigh is not more than 30,000, compatibility with cellulose ester is more improved, and bleed out under high temperature and high humidity as well as generation of haze immediately after casting will be restrained.

The weight average molecular weight of polymer X of this invention can be controlled by a molecular weight controlling method well known in the art. Such a molecular weight controlling method includes a method to incorporate a chain transfer agent such as lauryl mercaptan and octyl thioglycolate. Further, polymerization temperature is generally from room temperature to 130° C. and preferably 50-100° C., and the molecular weight control is possible by controlling this temperature or polymerization reaction time.

A weight average molecular weight can be measured by the following method.

(Measurement Method of Weight Average Molecular Weight)

Weight average molecular weight Mw was measured by means of gel permeation chromatography.

The measurement condition is as follows.

Solvent: Methylene chloride
Column: Shodex K806, K805 and K803G (3 columns, manufactured by Showa Denko K.K., were utilized in connection)
Column temperature: 25° C.
Sample concentration: 0.1 weight %
Detector: RI Model 504 (manufactured by Science Corp.)
Pump: L6000 (manufactured by Hitachi Corp.)
Flow rate: 1.0 ml/min
Calibration Curve: A calibration curve based on 13 samples of standard polystyrene STK (manufactured by Toso Co., Ltd.), having a molecular weight Mw=1,000,000–500, was utilized. 13 samples were utilized at approximately same intervals.

Polymer Y of this invention is a polymer which is prepared by polymerization of ethylenically unsaturated monomer Ya and has a weight molecular weight of not less than 500 and not more than 3,000. When a weight average molecular weight is not less than 500, it is preferable that residual monomer in polymer is decreased. Further, to set the molecular weight of not more than 3,000, it is preferable that retardation value Rt decreasing capability is maintained. Ya is preferably acryl or methacryl monomer having no aromatic rings.

Polymer Y of this invention is represented by following Formula (Y).

(Ya)$k$-(Yb)$q$-    Formula (Y)

Further, Polymer Y of this invention is more preferably polymer represented by following Formula (Y-1).

—[CH$_2$—C(—R$_5$)(—CO$_2$R$_6$)]$k$-[Yb]$q$-    Formula (Y-1)

(in the formula, R$_6$ is an alkyl group or a cycloalkyl group having a carbon number of 1-12. Yb is a monomer unit polymerizable with Ya. k and q are a mole composition ratio, wherein, k is not 0, and k+p=100.)

Yb is not specifically limited provided being ethylenically unsaturated monomer which is copolymerizable with Ya. Yb may be plural monomer. k+q=100, and q is preferably 0-30.

Ethylenically unsaturated monomer Ya, which constitutes Polymer Y prepared by polymerizing ethylenically unsaturated monomer having no aromatic ring, includes such as methyl acrylate, ethyl acrylate, (i-, n-) propyl acrylate, (n-, i-, s-, t-) butyl acrylate, (n-, i-, s-) pentyl acrylate, (n-, i-) hexyl acrylate, (n-, i-) heptyl acrylate, (n-, i-) octyl acrylate, (n-, i-) nonyl acrylate, (n-, i-) myristyl acrylate, cyclohexyl acrylate, (2-ethylhexyl)acrylate, (ε-caploractone)acrylate, (2-hydroxypropyl)acrylate, (3-hydroxypropyl)acrylate, (4-hydroxybutyl)acrylate and (2-hydroxybutyl)acrylate as acrylic ester; those in which the above-described acrylic ester is changed into methacrylic ester as methacrylic ester; and such as acrylic acid, methacrylic acid, maleic acid anhydride, crotonic acid and itaconic acid as unsaturated acid.

Yb is not specifically limited provided being ethylenically unsaturated monomer copolymerizable with Yb, however, is preferably such as vinyl acetate, vinyl propionate, vinyl butyrate, vinyl valerate, vinyl pivalate, vinyl caproate, vinyl capriate, vinyl laurate, vinyl myristate, vinyl palmitate, vinyl stearate, vinyl cyclohexane carboxylate, vinyl octylate, vinyl methacrylate, vinyl crotonate, vinyl sorbitate and vinyl cinnamate as vinyl ester. Yb may be plural monomer.

To synthesize Polymers X and Y, since control of a molecular weight is difficult by an ordinary polymerization, it is preferable to employ a method capable of making uniform molecular weight without making the molecular weight large. Such a polymerization method includes a method in which a peroxide polymerization initiator such as cumene peroxide and t-butyl hydroperoxide is utilized, a method in which a polymerization initiator of an amount larger than that in an ordinary polymerization is utilized, a method in which a chain transfer agent such as a mercapto compound and carbon tetrachloride is utilized, a method in which a polymerization terminator such as benzoquinone and dinitrobenzene in addition to a polymerization initiator is utilized, and further, a method in which block polymerization is performed by use of a compound having one thiol group and a secondary hydroxyl group or said compound together with an organometalic compound, as a polymerization catalyst; any method can be utilized in this invention, however, a polymerization method to utilize a compound having a thiol group and a secondary hydroxyl group in a molecule as a chain transfer agent is preferable. In this case, at the terminal of Polymer Y, an hydroxyl group and thioether derived from a polymerization catalyst and a chain transfer agent are provided. By this terminal residual group, compatibility of Y and cellulose ester can be controlled.

The hydroxyl group value of polymer X and Y is preferably 30-150 [mg KOH/g].

(Measurement Method of Hydroxyl Group Value)

This measurement is based on JIS K 0070 (1992). This hydroxyl group value is defined as mg number of potassium hydroxide which is required to neutralize acetic acid bonding to a hydroxyl group when 1 g of a sample is acetylated. Specifically, X g (approximately 1 g) of a sample is precisely weighed in a flask, which is added with exactly 20 ml of an acetylation agent (20 ml of acetic acid anhydride is added with pyridine to make 400 ml). The flask is equipped with an air condenser at the mouth and heated in a glycerin bath of 95-100° C. After 1 hour and 30 minutes, the system is cooled and added with 1 ml of pure water through the air condenser to decompose acetic acid anhydride into acetic acid. Next titration with a 0.5 mol/L ethanol solution of potassium hydroxide was performed by use of a potentiometric titrator to determine the inflection point of the obtained titration curve as an end point. Further, as a blank test, titration without a sample is performed to determine the inflection point of a titration curve. A hydroxyl group value is calculated by the following equation.

Hydroxyl group value={($B$–$C$)×$f$×28.05/$X$}+$D$ (in the equation, B is quantity (ml) of a 0.5 mol/L ethanol solution of potassium hydroxide utilized for a blank test, C is quantity (ml) of a 0.5 mol/L ethanol solution of potassium hydroxide utilized for titration, f is a factor of a 0.5 mol/L ethanol solution of potassium hydroxide, D is an acid value, and 28.05 is ½ of molar quantity 56.11 of potassium hydroxide.)

Both of Polymer X and Polymer Y described above exhibit excellent compatibility with cellulose ester, excellent productivity without evaporation or vaporization, good reservability small water vapor permeability and excellent dimension stability, as polarizing plate protective film.

The content of polymer X and Polymer Y in cellulose ester film may be 1-40 weight %, and preferably in a range to satisfy following equations (i) and (ii). When a content of polymer X is X g, [weight %=(weight of polymer X/weight of cellulose ester)×[00] and a content of Polymer Y is Y g (weight %)], $5 \leq X+Y \leq 35$ (weight %)    Equation (i)

$0.05 \leq Y/(X+Y) \leq 0.4$    Equation (ii)

Preferable range of equation (i) is 10-25 weight %.

When the total amount of polymer X and Polymer Y is not less than 5 weight %, a sufficient effect to decrease retardation value Rt can be achieved. Further, when the total amount is not more than 35 weight %, adhesion with a polyvinyl alcohol type polarizer is good.

Polymer X and Polymer Y are directly added and dissolved as materials to constitute a dope solution which will be described later, however, may be added into a dope solution after having been dissolved in an organic solvent to dissolve cellulose ester in advance.

<Polyester>

(Polyester Represented by Formula (B1) or (B2))

Polarizing plate protective film of this invention is preferably incorporated also with polyester represented by following Formula (B1) or (B2) to control the retardation value. These are polyesters obtained from divalent alcohol G having 2-12 carbon atoms, dibasic acid A having 2-12 carbon atoms, and monocarboxylic acid B$_1$ having 1-12 carbon atoms or monoalcohol B$_2$ having 1-12 carbon atoms.

B$_1$-(G-A-)$m$G-B$_1$    Formula (B1)

(wherein, $B_1$ is mono-carboxylic acid having a carbon number of 1-12; G is dihydric alcohol having a carbon number of 2-12; and A is dibasic acid having a carbon number of 2-12. Neither of $B_1$, G and A contains an aromatic ring. m is a repeating number.)

$$B_2\text{-}(A\text{-}G\text{-})nA\text{-}B_2 \quad \text{Formula (B2)}$$

(wherein, $B_2$ is monohydric alcohol having a carbon number of 1-12; G is dihydric alcohol having a carbon number of 2-12; and A is dibasic acid having a carbon number of 2-12. Neither of $B_2$, G and A contains an aromatic ring. n is a repeating number.)

Monocarboxylic acid represented by $B_1$ is not specifically limited and aliphatic monocarboxylic acid and alicyclic monocarboxylic acid well known in the art can be utilized.

Preferable monocarboxylic acid includes the following, however, this invention is not limited thereto.

As aliphatic monocarboxylic acid, utilized is fatty acid provided with a straight chain or a side chain and having 1-32 carbon atoms, more preferably 1-20 and specifically preferably 1-12. To incorporate acetic acid is preferable because compatibility with cellulose ester is increased, and it is also preferable to utilize a mixture of acetic acid with other monocarboxilic acid.

Preferable aliphatic monocarboxylic acid includes saturated fatty acid such as formic acid, acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid.

As alcohol component represented by $B_2$ is not specifically limited, and alcohols well known in the art can be utilized. For example, straight chain or branched aliphatic saturated alcohol or aliphatic unsaturated alcohol having 1-32 carbon atoms, can be preferably utilized. The carbon number is more preferably 1-20, and specifically preferably 1-12.

A dihydic alcohol component represented by G includes the following; however, this invention is not limited thereto. Listed are such as ethylene glycol, diethylene glycol, 1,2-propylene glycol, 1,3-propylene glycol, 1,2-butylene glycol, 1,3-butylene glycol, 1,4-butylene glycol, 1,5-pentanediol, 1,6-hexanediol, 1,5-pentylene glycol, diethylene glycol, triethylene glycol and tetraethylene glycol; among them, ethylene glycol, 1,2-propylene glycol, 1,3-propylene glycol, 1,2-butylene glycol, 1,3-butylene glycol, 1,4-butylene glycol, 1,6-hexanediol, diethylene glycol and triethylene glycol are preferable; and further, 1,3-propylene glycol, 1,4-butylene glycol, 1,6-hexanediol and diethylene glycol are more preferably utilized.

A dibasic acid (dicarboxylic acioid) component represented by A is preferably aliphatic dibasic acid and alicyclic dibasic acid, and utilized is at least one selected from, such as malonic acid, succinic acid, glutalic acid, adipic acid, pimeritic acid, suberic acid, azeric acid, sebacic acid, undecane dicarboxylic acid and dodecane dicarboxylic acid; and specifically, those having a carbon number of 4-12 as aliphatic dicarboxylic acid. That is, not less than two types of dibasic acid may be utilized in combination.

m and n are a repeating number and is preferably not less than 1 and not more than 170.

A weight average molecular weight of polyester is preferably not more than 20,000 and more preferably not more than 10,000. Specifically polyester having a weight average molecular weight of 500-10,000 is excellent in compatibility with cellulose ester as well as hardly causes evaporation and vaporization during casting.

Condensation polymerization of polyester is performed by means of an ordinary method. For example, it can be easily synthesized by a direct reaction of the above-described dibasic acid with glycol; a heat melt condensation method by a polyesterification reaction of the above-described dibasic acid or alkylesters thereof, such as a polyesterification reaction or an ester exchange reaction of methylester of dibasic acid with glycols; or a dehydrohalogenide reaction of acid chloride of these acid and glycol, however, polyester having not so large weight average molecular weight is preferably synthesized by a direct reaction. Polyester having a high distribution in the low molecular weight side has very good compatibility with cellulose ester, and polarizing plate protective film having small water vapor permeability and excellent transparency can be prepared.

As a controlling method of a molecular weight, a conventional method can be utilized without specific limitation. For example, although it depends on a polymerization condition, by a method to shield a molecular terminal by mono-valent acid (monocarboxylic acid) or mono-hydric alcohol (monoalcohol) and the control is possible by an addition amount of these mono-valent compounds. In this case, monovalent acid is preferable with respect to stability of polymer.

For example, listed are such as acetic acid, propionic acid and butyric acid, and selected are those which is not evaporated out of the system during condensed polymerization but can be easily evaporated out of the system when the reaction is stopped and such a monovalent acid is removed out of the system, however, these may be utilized as a mixture. Further, in the case of a direct reaction, the weight average molecular weight can be controlled also by judging the timing to stop the reaction based on the quantity of water evaporated out during the reaction. In addition to these, the molecular weight control is possible also by biasing a mol number of glycol or dibasic acid which are charged, as well as by controlling the reaction temperature.

Polyester according to this invention is preferably contained at 1-40 weight %, more preferably at 2-30 weight % and specifically preferably at 5-15 weight %, against cellulose ester.

<Compounds Represented by Formulas (1)-(14)>

Next, a preferable compound of Formula (1) to control retardation value in this invention will be explained.

In aforesaid Formula (1), the total sum of carbon numbers of $R^1$ and $R^2$ is preferably not less than 10.

Substituents of $R^1$ and $R^2$ are preferably a fluorine atom, an alkyl group, an aryl group, an alkoxy group, a sulfon group and a sulfonamide group; and specifically preferably an alkyl group, an aryl group, an alkoxy group, a sulfon group and a sulfonamide group.

Further, an alkyl group may be straight chained, branched or cyclic, and preferably has 1-25 carbon atoms, more preferably 6-25 and specifically preferably 6-20 (such as methyl, ethyl, propyl, isopropyl, butyl, isobutyl, t-butyl, amyl, isoamyl, t-amyl, hexyl, cyclohexyl, heptyl, octyl, bicyclooctyl, nonyl, adamantyl, decyl, t-octyl, undecyl, dodecyl, tridecyl, tetradecyl, pentadecyl, hexadecyl, heptadecyl, octadecyl, nonadecyl and didecyl).

Aryl groups are preferably those having 6-30 carbon atoms and specifically preferably 6-24 (such as phenyl, biphenyl, terphenyl, naphthyl, binaphthyl and triphenylphenyl).

Preferable examples of a compound represented by Formula (1) will be shown below; however, this invention is not limited thereto.
A-1
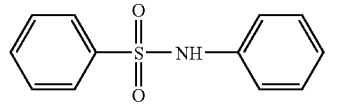
A-2
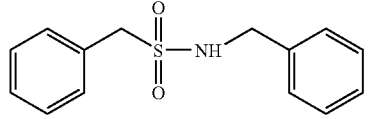
A-3
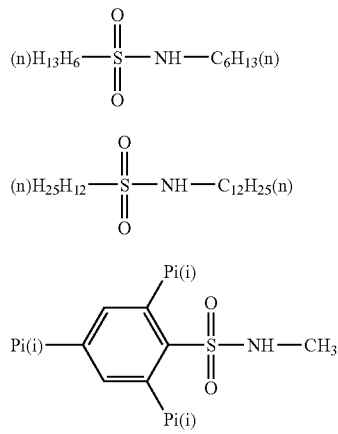
A-4
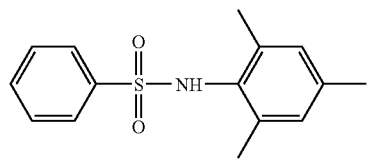
A-5
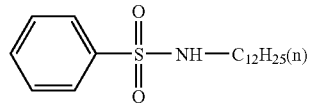
A-6
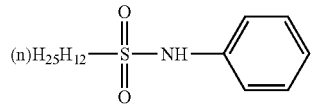
A-7
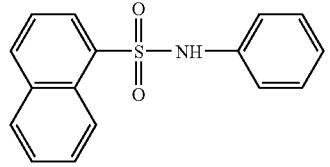
A-8
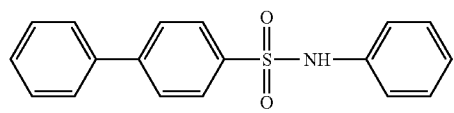
A-9
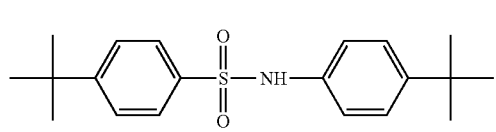
A-10
A-11
A-12
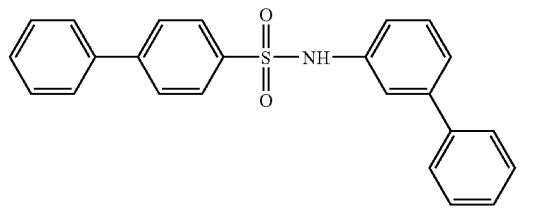
A-13
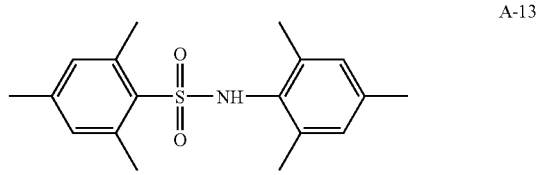
A-14
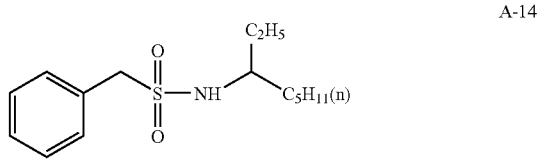
A-15
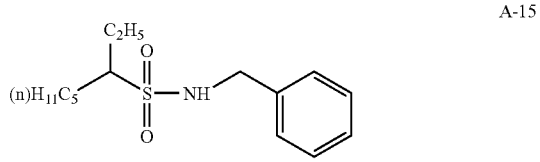
A-16
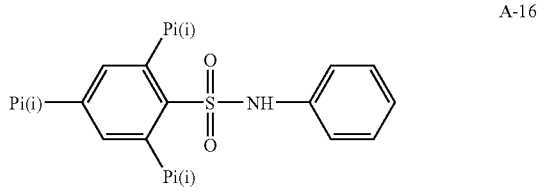
A-17
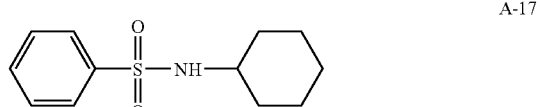
A-18
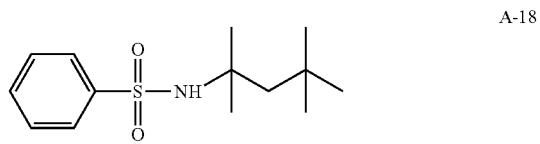
A-19
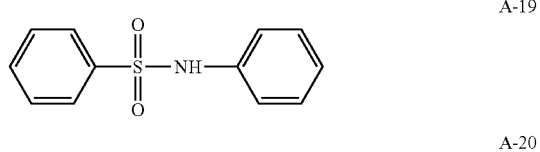
A-20
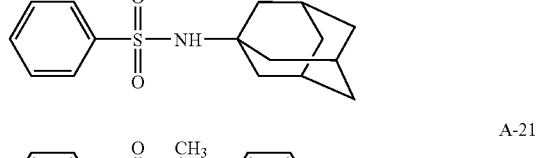
A-21
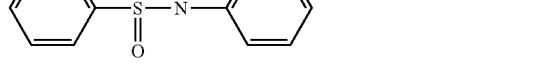

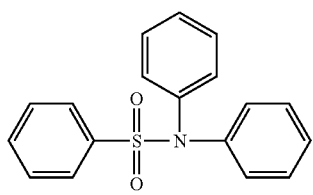
A-22

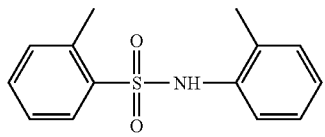
A-23

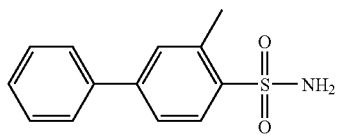
A-24

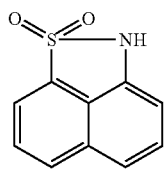
A-25

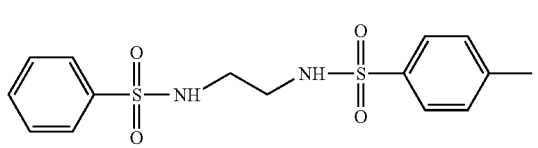
A-26

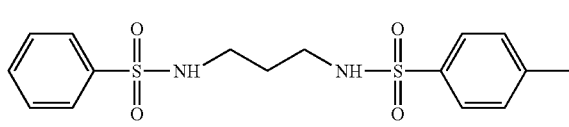
A-27

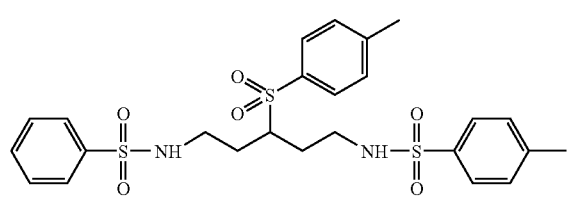
A-28

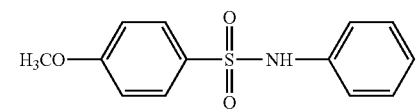
A-29

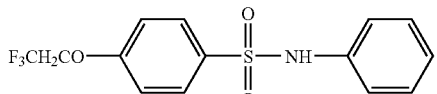
A-30

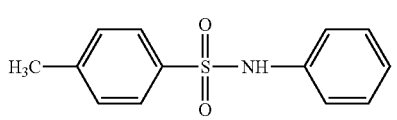
A-31

Next, compounds of Formula (2) will be detailed.

X is B, C—R (R is a hydrogen atom or a substituent), N, P or P=O. X is preferably B, C—R (R is preferably an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a hydroxyl group, a mercapto group, a halogen atom (such as a fluorine atom, a chlorine atom, a bromine atom and an iodine atom) and carboxyl group; more preferably an aryl group, an alkoxy group, an aryloxygroup, a hydroxyl group and a halogen atom; furthermore preferably an alkoxy group and a hydroxyl group; and specifically preferably a hydroxyl group), N and P=O, more preferably C—R and N; and specifically preferably C—R.

$R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ each independently are a hydrogen atom or a substituent. As a substituent, substituent T, which will be described later, can be applied. $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are preferably an alkyl group, an alkenyl group, an alkynyl group, an aryl group, a substituted or unsubstituted amino group, an alkoxy group, an aryloxy group, an acyl group, an alkoxycarbonyl group, an aryloxycarbonyl group, an acyloxy group, an acylamino group, an alkoxycarbonylamino group, an aryloxycarbonylamino group, a sulfonylamino group, a sulfamoylamino group, a carbamoyl group, an alkylthio group, an arylthio group, a sulfonyl group, a sulfinyl group, an ureido group, an phosphoric amido group, a hydroxyl group, a mercapto group, a halogen atom (such as a fluorine atom, a chlorine atom, a bromine atom and an iodine atom), a cyano group, a sulfo group, a carboxyl group, a nitro group, a hydroxamic group, a sulfino group, a hydrazine group, an imino group, a heterocyclic group (preferably having 1-30 carbon atoms and more preferably of 1-12; a hetero atom of which is such as a nitrogen atom, an oxygen atom or a sulfur atom; and specifically includes such as imidazolyl, pyridyl, quinolyl, furyl, pyperidyl, morpholino, benzoxazolyl, benzimidazolyl and benzthiazolyl) and silyl group; more preferably an alkyl group, an aryl group, a substituted or unsubstituted amino group, an alkoxy group and an aryloxy group; and furthermore preferably an alkyl group, an aryl group and an alkoxy group.

These substituents may be further substituted. Further, when at least two substituents are provided, they may be the same or different. And, they may form a ring by bonding to each other when it is possible.

In the following, the aforesaid substituent R will be explained. Substituent R includes, for example, an alkyl group (preferably having 1-20 carbon atoms, more preferably 1-12 and specifically preferably 1-8; such as methyl, ethyl, isopropyl, tert-butyl, n-octyl, n-decyl, n-hexadecyl, cyclopropyl, cyclopentyl and cyclohexyl), an alkenyl group (preferably having 2-20 carbon atoms, more preferably 2-12 and specifically preferably 2-8; such as vinyl, allyl, 2-butenyl and 3-pentenyl), an alkynyl group (preferably having 2-20 carbon atoms, more preferably 2-12 and specifically preferably 2-8; such as propagyl and 3-pentynyl), an aryl group (preferably having 6-30 carbon atoms, more preferably 6-20 and specifically preferably 6-12; such as phenyl, p-methylphenyl and naphthyl), a substituted or unsubstituted amino group (preferably having 0-20 carbon atoms, more preferably 0-10 and specifically preferably 0-6; such as amino, methylamino, dimethylamino, diethylamino and dibenzylamino), an alkoxy group (preferably having 1-20 carbon atoms, more preferably 1-12 and specifically preferably 1-8; such as methoxy, ethoxy and butoxy), an aryloxy group (preferably having 6-20 carbon atoms, more preferably 6-16 and specifically preferably 6-12; such as phenyloxy and 2-naphthyloxy), an acyl group (preferably having 1-20 carbon atoms, more preferably 1-16 and specifically preferably 1-12; such as acetyl, benzoyl, formyl and pivaloyl), an alkoxycarbonyl group (preferably having 2-20 carbon atoms, more preferably 2-16 and specifically preferably 2-12; such as methoxycarbonyl and ethoxycarbonyl), an aryloxycarbonyl group (preferably having 7-20 carbon atoms, more preferably 7-16 and specifically preferably 7-10; such as phenyoxycarbonyl), an acyloxy group (preferably having 2-20 carbon atoms, more preferably 2-16 and specifically preferably 2-10; such as acetoxy and benzoyloxy), an acylamino group (preferably having 2-20 carbon atoms, more preferably 2-16 and specifically preferably 2-10; such as acetylamino and benzoylamino), an alkoxycarbonylamino group (preferably having 2-20 carbon atoms, more preferably 2-16 and specifically preferably 2-12; such as methoxycarbonylamion), an aryloxycarbonylamino group (preferably having 7-20 carbon atoms, more preferably 7-16 and specifically preferably 7-12; such as phenyloxycarbonylamino), a sulfonylamino group (preferably having 1-20 carbon atoms, more preferably 1-16 and specifically preferably 1-12; such as methanesulfonylamino and benzenesulfonylamino), a sulfamoylamino group (preferably having 0-20 carbon atoms, more preferably 0-16 and specifically preferably 0-12; such as sulfamoyl, methylsulfamoyl, dimethylsulfamoyl and phenylsulfamoyl), a carbamoyl group (preferably having 1-20 carbon atoms, more preferably 1-16 and specifically preferably 1-12; such as carbamoyl, methylcarbamoyl, diethylcarbamoyl and phenylcarbamoyl), an alkylthio group (preferably having 1-20 carbon atoms, more preferably 1-16 and specifically preferably 1-12; such as methylthio and ethylthio), an arylthio group (preferably having 6-20 carbon atoms, more preferably 6-16 and specifically preferably 6-12; such as phenylthio), a sulfonyl group (preferably having 1-20 carbon atoms, more preferably 1-16 and specifically preferably 1-12; such as mesyl and tosyl), a sulfinyl group (preferably having 1-20 carbon atoms, more preferably 1-16 and specifically preferably 1-12; such as methanesulfinyl and benzenesulfinyl), an ureido group (preferably having 1-20 carbon atoms, more preferably 1-16 and specifically preferably 1-12; such as ureido, methylureido and phenylureido), an phosphoric amido group (preferably having 1-20 carbon atoms, more preferably 1-16 and specifically preferably 1-12; such as dimethylphosphoric amido and phenylphosphoric amido), a hydroxyl group, a mercapto group, a halogen atom (such as a fluorine atom, a chlorine atom, a bromine atom and an iodine atom), a cyano group, a sulfo group, a carboxyl group, a nitro group, a hydroxam group, a sulfino group, a hydrazine group, an imino group, a heterocyclic group (preferably having 1-30 carbon atoms and more preferably 1-12; a hetero atom of which is such as a nitrogen atom, an oxygen atom or a sulfur atom; and specifically includes such as imidazolyl, pyridyl, quinolyl, furyl, pyperidyl, morpholino, benzoxazolyl, benzimidazolyl and benzthiazolyl) and silyl group (preferably having 3-40 carbon atoms, more preferably 3-30 and specifically preferably 3-24, such as trimethylsilyl and triphenylsilyl). These substituents may be further substituted. Further, when at least two substituents are provided, they may be the same or different. And, they may form a ring by bonding to each other when it is possible.

In the following, compounds represented by Formula (2) will be decided referring to specific examples, however, this invention is not limited to the following examples.

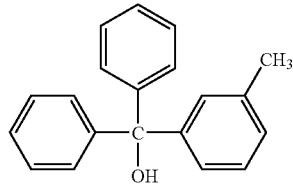

C-1

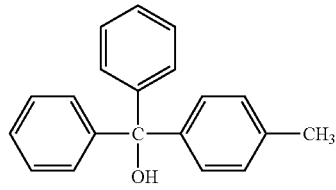

C-2

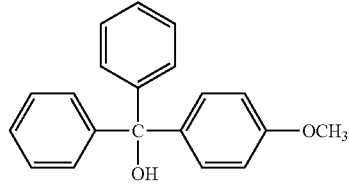

C-3

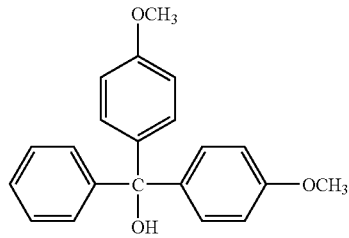

C-4

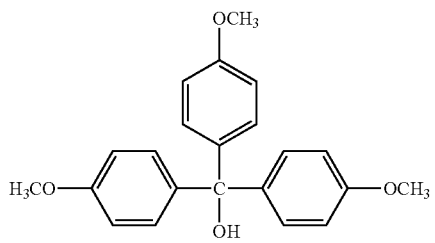

C-5

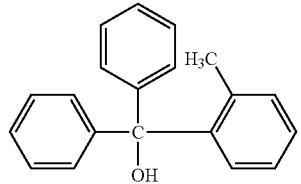

C-6

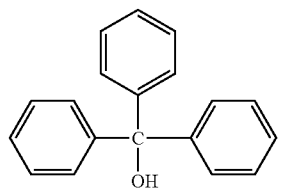

C-7

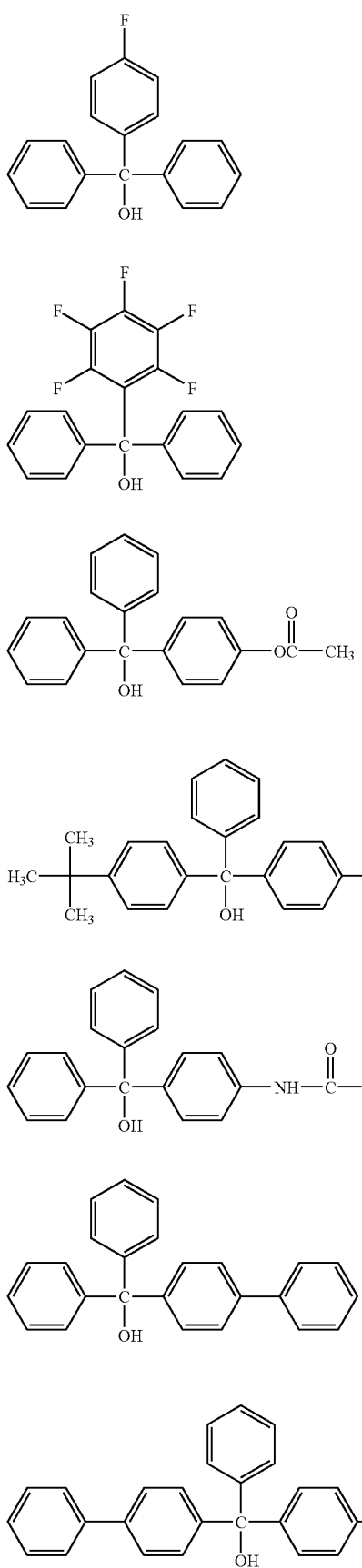
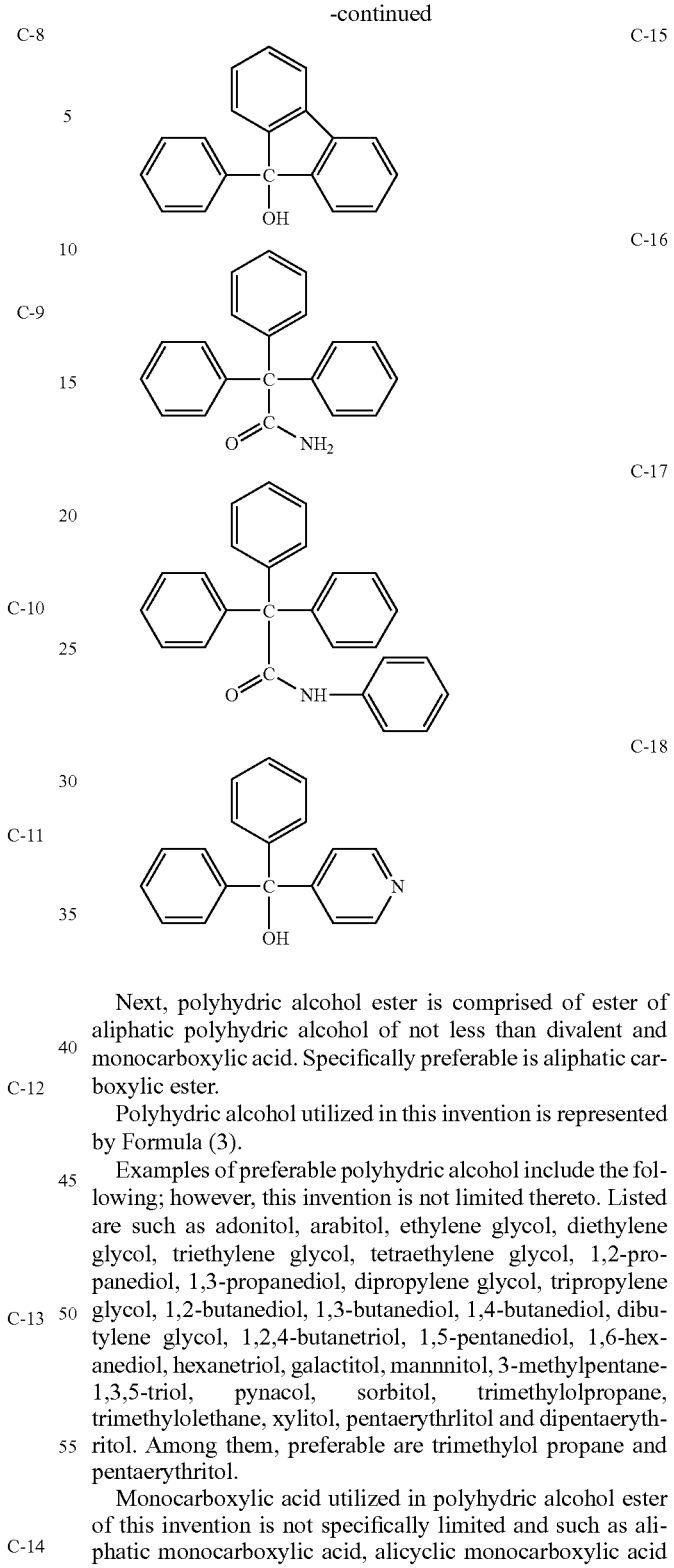

Next, polyhydric alcohol ester is comprised of ester of aliphatic polyhydric alcohol of not less than divalent and monocarboxylic acid. Specifically preferable is aliphatic carboxylic ester.

Polyhydric alcohol utilized in this invention is represented by Formula (3).

Examples of preferable polyhydric alcohol include the following; however, this invention is not limited thereto. Listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannnitol, 3-methylpentane-1,3,5-triol, pynacol, sorbitol, trimethylolpropane, trimethylolethane, xylitol, pentaerythrlitol and dipentaerythritol. Among them, preferable are trimethylol propane and pentaerythritol.

Monocarboxylic acid utilized in polyhydric alcohol ester of this invention is not specifically limited and such as aliphatic monocarboxylic acid, alicyclic monocarboxylic acid and aromatic monocarboxylic acid can be utilized. It is preferable to utilize alicyclic monocarboxylic acid or aromatic monocarboxylic acid with respect to improving water vapor permeability and reservablity. Examples of preferable monocarboxylic acid include the following; however, this invention is not limited thereto.

As aliphatic monocarboxylic acid, straight chain or branched fatty acid having a carbon number of 1-32 can be preferably utilized. The carbon number is more preferably 1-20 and specifically preferably 1-10. It is preferable to utilize acetic acid because compatibility with cellulose ester increases, and it is also preferable to utilize acetic acid and other monocarboxilic acid in combination.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid. Examples of preferable alicyclic monocarboxylic acid include cyclopentane carboxylic acid, cyclohexane carboxylic acid, cyclooctane carboxylic acid or derivatives thereof. Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthaline carboxylic acid and tetraline carboxylic acid; or derivatives thereof. Benzoic acid is specifically preferable.

The molecular weight of polyhydric alcohol is preferably in arrange of 300-1,500 and more preferably in arrange of 350-750. Since it is preferable to have a large molecular weight to make it difficult to evaporate, it is preferable to have a small molecular weight with respect to permeability and compatibility with cellulose ester. Carboxylic acid utilized in polyhydric alcohol ester may be either one type or a mixture of at least two types. Further, all of OH groups in polyhydric alcohol may be esterified or a part of them may be remained as an OH group it self. In the following, specific examples of polyhydric alcohol ester will be shown.

B-1

$C_4H_9-\underset{\underset{O}{\|}}{C}-O-(CH_2)_2-O-(CH_2)_2-O-(CH_2)_2-O-\underset{\underset{O}{\|}}{C}-C_4H_9$

B-2

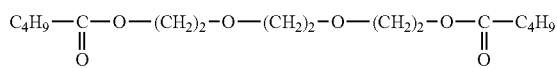

B-3

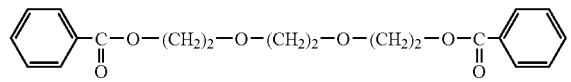

B-4

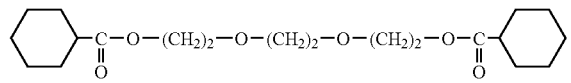

B-5

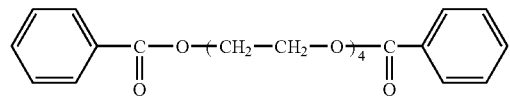

B-6

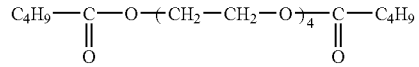

B-7

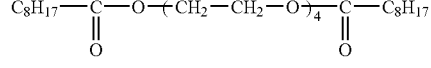

B-8

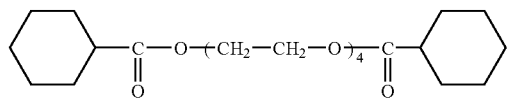

B-9

$C_4H_9-\underset{\underset{O}{\|}}{C}-O-(CH_2CH_2CH_2-O)_3-\underset{\underset{O}{\|}}{C}-C_4H_9$

B-10

$C_8H_{17}-\underset{\underset{O}{\|}}{C}-O-(CH_2CH_2CH_2-O)_3-\underset{\underset{O}{\|}}{C}-C_8H_{17}$

B-11

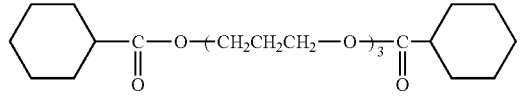

B-12

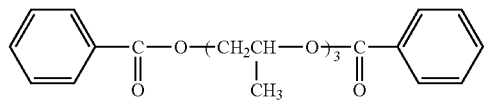

B-13

$C_4H_9-\underset{\underset{O}{\|}}{C}-O-(\underset{\underset{CH_3}{|}}{CH_2CH}-O)_3-\underset{\underset{O}{\|}}{C}-C_4H_9$

B-14

$C_8H_{17}-\underset{\underset{O}{\|}}{C}-O-(\underset{\underset{CH_3}{|}}{CH_2CH}-O)_3-\underset{\underset{O}{\|}}{C}-C_8H_{17}$

B-15

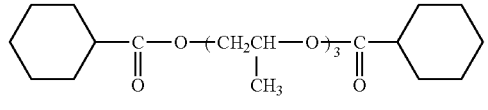

B-16

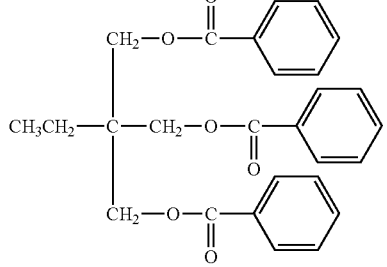

B-17

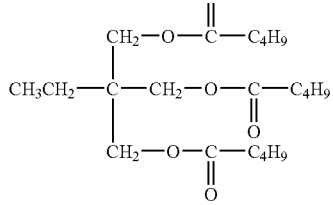

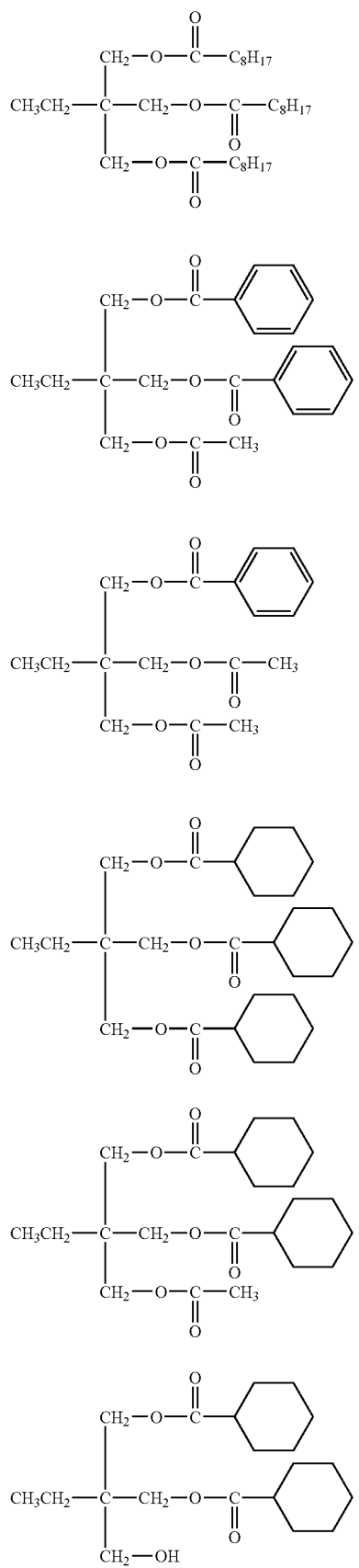
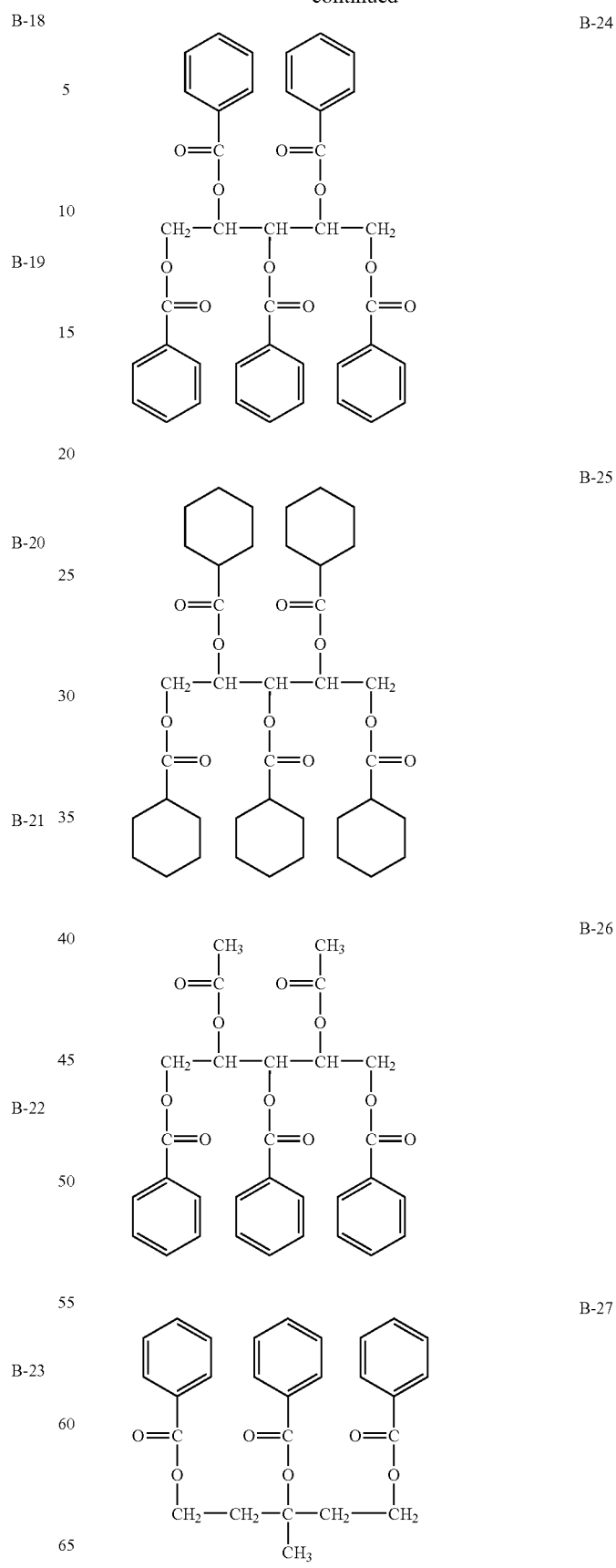

B-28
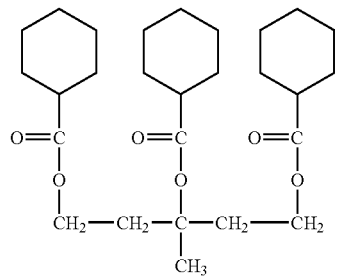

B-29
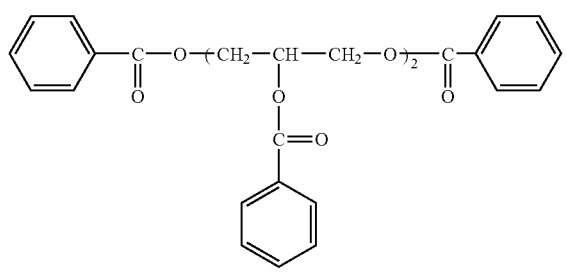

B-30
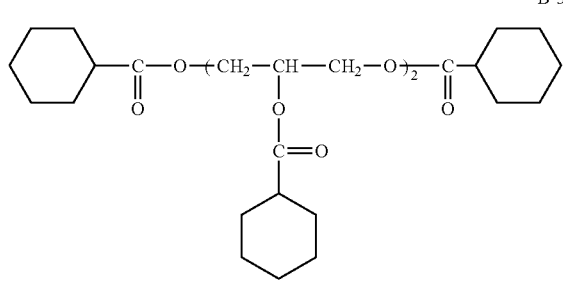

B-31
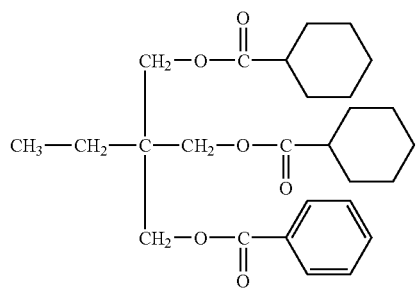

B-32
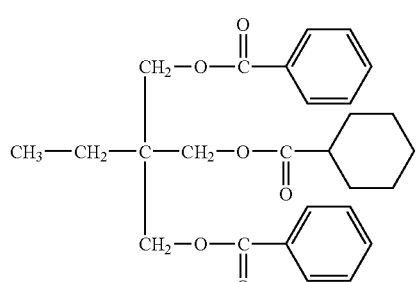

B-33
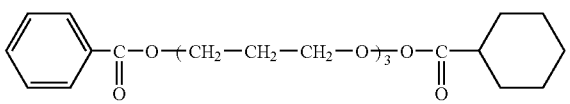

B-34
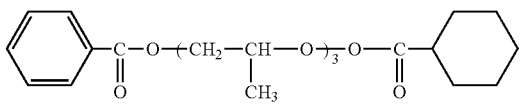

B-35
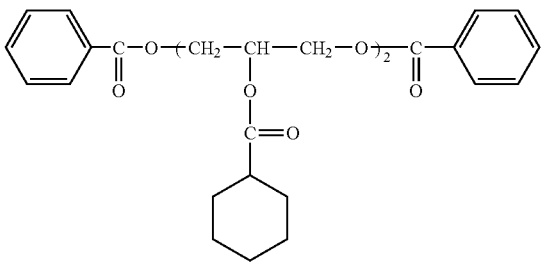

In addition to these, such as trimethylolpropane triacetate and pentaerythritol tetraacetate are also preferably also utilized.

A compound represented by above-described Formulas (1)-(3) is utilized at 0.01-30 weight parts and preferably at 0.5-25 weight parts, against 100 weight parts of cellulose ester. As an addition method of said compound, it may be added in to a dope after having been dissolved in an organic solvent such as alcohol, methylene chloride and dioxorane; or may be directly added into a dope composition.

Compounds of aforesaid Formulas (4)-(12) will be now explained.

In Formula (4)-(12), $Y^{31}$-$Y^{70}$ each independently are an acyloxy group having a carbon number of 1-20, an alkoxycarbonyl group having a carbon number of 1-20 an amido group having a carbon number of 1-20, a carbamoyl group having a carbon number of 1-20 or a hydroxyl group. $V^{31}$-$V^{43}$ each independently are a hydrogen atom or an aliphatic group having a carbon number of 1-20. $L^{31}$-$L^{80}$ each independently are a single bond or a divalent saturated connecting group having the total atom number of 1-40 and a carbon number of 0-20. $V^{31}$-$V^{43}$ and $L^{31}$-$L^{80}$ may be further provided with a substituent.

The carbon number of an acyloxy group is preferably 1-16 and more preferably 2-12. Examples of an acyloxy group include acetoxy, propionyloxy, butyryloxy, valeryloxy, isovaleryloxy, 2,2-dimethylpropionyloxy, 2-methylbutyryloxy, hexanoyloxy, 2,2-dimethylbutyryloxy, heptanoyloxy, cyclohexylcarbonyloxy, 2-ethylhexanoyloxy, octanoyloxy, decanoyloxy, dodecanoyloxy, phenylacetoxy, 1-naphthoyloxy, 2-naphthoyloxy and 1-adamantanecarbonyloxy.

The carbon number of an alkoxycarbonyl group is preferably 2-16 and more preferably 2-12. Examples of an alkoxycarbonyl group include methoxycarbonyl, ethoxycarbonyl, propyloxycarbonyl, isopropyloxycarbonyl, butoxycarbonyl, t-butoxycarbonyl, isobutyloxycarbonyl, sec-butyloxycarbonyl, pentyloxycarbonyl, t-amyloxycarbonyl, hexyloxycarbonyl, cyclohexyloxycarbonyl, 2-ethylhexyloxycarbonyl, 1-ethylpropyloxycarbonyl, octyloxycarbonyl, 3,7-dimethyl-3-octyloxycarbonyl, 3,5,5-trimethylhexyloxycarbonyl, 4-t-butylcyclohexyloxycarbonyl, 2,4-dimethylpentyl-3-oxycarbonyl, 1-adamantaneoxycarbonyl, 2-adamantaneoxycarbonyl, dicyclopentadienyloxycarbonyl, decyloxycarbonyl, dodecyloxycarbonyl, tetradecyloxycarbonyl and hexadecyloxycarbonyl.

The carbon number of an amido group is preferably 1-16 and more preferably 1-12. Examples of an amido group include acetamido, propionamido, butylamido, isobutylamido, pentaneamido, 2,2-dimethylpropioneamido, 3-methylbutylamido, 3-methylbutylamido, hexaneamido, 2,2-dimethylbutylamido, heptaneamido, cyclohexylcarboxyamido, 2-ethylhexaneamido, 2-ethylbutaneamido, octaneamido, nonaneamido, 1-adamantanecarboxyamido, 2-adamantanecarboxyamido, tridecaneamido, hexadecaneamido and heptadecaneamido.

The carbon number of an carbamoyl group is preferably 1-16 and more preferably 1-12. Examples of a carbamoyl group include methylcarbamoyl, dimethylcarbamoyl, ethylcarbamoyl, diethylcarbamoyl, propylcarbamoyl, isopropylcarbamoyl, butylcarbamoyl, t-butylcarbamoyl, isobutylcarbamoyl, sec-butylcarbamoyl, pentylcarbamoyl, t-amylcarbamoyl, hexylcarbamoyl, cyclohexylcarbamoyl, 2-ethylhexylcarbamoyl, 2-ethylbutylcarbamoyl, t-octylcarbamoyl, heptylcarbamoyl, octylcarbamoyl, 1-adamantanecarbamoyl, 2-adamantanecarbamoyl, decylcarbamoyl, dodecylcarbamoyl, tetradecylcarbamoyl and hexadecylcarbamoyl.

Examples of a substituent of $Y^{31}$-$Y^{70}$ include a halogen atom (fluorine atom, chlorine atom, bromine atom or iodine atom), a straight-chain, branched or cyclic alkyl group (including a bicycloalkyl group and an active methylene group), an alkenyl group, an alkynyl group, an aryl group, a heterocyclic group, an acyl group, an alkoxycarbonyl group, an aryloxycarbonyl group, a hetrocyclicoxycarbonyl group, a carbamoyl group, a N-acylcarbamoyl group, a N-sulfonylcarbamoyl group, a N-carbamoylcarbamoyl group, a N-sulfamoylcarbamoyl group, a carbazoyl group, a carboxyl group or salt thereof, an oxalyl group, an oxamoyl group, a cyano group, a carbonimidoyl group, a formyl group, a hydroxyl group, an alkoxy group (including a group repeatedly containing an ethyleneoxy group or propyleneoxy group unit), an aryloxy group, a hetrocyclic oxy group, an acyloxy group, an alkoxycarbonyloxy group, an aryloxycarbonyloxy group, a carbamoyloxy group, a sulfonyloxy group, an amino group, an alkylamino group, an arylamino group, a heterocyclic amino group, an amido group, a sulfonamide group, an ureido group, a thioureido group, imodo group, an alkoxycarbonylamino group, an aryloxycarbonylamino group, a sulfamoylamino group, a semicarbazide group, an ammonio group, an oxamoylamino group, a N-alkylsulfonylureido group, a N-arylsulfonylureido group, a N-acylureido group, a N-acylsulfamoylamino group, a heterocyclic group containing a quaternary nitrogen atom (such as pyridino group, an imidazolio group, a quinolinio group and isoquinolinio group), an asocyano group, an imino group, an alkylsulfonyl group, an arylsulfonyl group, an alkylsulfinyl group, an arylsulfinyl group, a sulfo group or salt thereof, a sulfamoyl group, a N-acylsulfamoyl group, a N-sulfonylsulfamoyl group or salt thereof, a phosphino group, phosphinyl group, phosphinylamino group, a silyl group and a phosphoric ester group.

$Y^{31}$-$Y^{70}$ may form a substituent which is a complex of the above described substituents. Examples of a complex substituent include an ethoxyethoxyethyl group, a hydroxyethoxyethyl group and an ethoxycarbonylethyl group.

The carbon number of aliphatic group of $V^{31}$-$V^{43}$ is preferably 1-16 and more preferably 1-12. An aliphatic group is preferably an aliphatic hydrocarbon group and more preferably a straight-chain, branched or cyclic alkyl group, alkenyl group or alkynyl group.

Examples of an alkyl group include methyl, ethyl, propyl, isopropyl, butyl, isobutyl, sec-butyl, t-butyl, pentyl, t-amyl, hexyl, octyl, decyl, dodecyl, eicosyl, 2-ethylhexyl, cyclopentyl, cyclohexyl, cycloheptyl, 2,6-dimethylcyclohexyl, 4-t-butylcyclohexyl, cyclopentyl, 1-adamantyl, 2-adamantyl and bicyclo[2.2.2]octane-3-yl.

Examples of an alkenyl group include vinyl, allyl, pulenyl, geranyl, oleyl, 2-cyclopentene-1-yl and 2-cyclohexene-1-yl.

Examples of an alkynyl group include ethynyl and propagyl.

Examples of a substituent of $V^{31}$-$V^{43}$ are identical to examples of a substituent of $Y^{31}$-$Y^{70}$.

Examples of a connecting group of $L^{31}$-$L^{80}$ include an alkylene group (such as methylene, ethylene, propylene, trimethylene, tetramethylene, pentamethylene, hexamethylene, methylethylene and ethylethylene), a divalent cyclic group (such as cis-1,4-cyclohexylene, trans-1,4-cyclohexylene and 1,3-cyclopentylydene), ether, thioether, ester, amido, sulfone, sulfoxide, sulfide, sulfonamide, ureylene and thioureylene.

Not less than two connecting groups may join to form a divalent complex connecting group. Examples of a complex connecting group include —(CH$_2$)$_2$—O—(CH$_2$)$_2$—, —(CH$_2$)$_2$—O—(CH$_2$)$_2$—O—(CH$_2$)$_2$—, —(CH$_2$)$_2$—S—(CH$_2$)$_2$— and —(CH$_2$)$_2$—O—CO—(CH$_2$)$_2$—.

$L^{31}$-$L^{80}$ may be further provided with a substituent. Examples of a substituent include groups which may substitute $R^1$-$R^{13}$.

Examples of a compound represented by Formulas (4)-(12) include citric ester (such as triethyl O-acetylcitrate, tributyl O-acetylcitrate, acetyltriethyl citrate, acetyltributyl citrate, acetyltributyl citrate and tri(ethyloxycarbonylmethylene) O-acetylcitrate), oleic ester (such as ethyl oleate, butyl oleate, 2-ethylhexyl oleate, phenyl oleate, cyclohexyl oleate and octyl oleate), ricinoleic ester (such as methylacetyl ricinoleate), sebacic ester (such as dibutyl sebacate), carboxylic ester of glycerin (such as triacetin and tributyrin), glycolic ester (such as butylphthalyl ethylglycolate, ethylephthalyl ethylglycolate, methylephthalyl ethylglycolate, butylphthalyl butylglycolate, methylephthalyl methylglycolate, propylphthalyl propylglycolate and octylphthalyl propylglycolate), carboxylic ester of pentaerythritol (such as pentaerythritol tetraacetate and pentaerythritol tetrabutyrate), carboxylic ester of dipentaerythritol (such as dipentaerythritol hexaacetate, dipentaerythritol hexabutyrate and dipentaerythritol tetraacetate), carboxylic ester of trimethylolpropane (such as trimethylolpropane triacetate, trimethylolpropane diacetate monopropionate, trimethylolpropane tripropionate, trimethylolpropane tripivaloate, trimethylolpropane tri(t-butylacetate), trimethylolpropane di-2-ethylhexanate, trimethylolpropane tetra-2-ethylhexanate, trimethylolpropane diacetate monooctanate, trimethylolpropane trioctanate, trimethylolpropane tri(cyclohexanecarboxylate)), pyrrolidone carboxylic esters (such as 2-pyrrolidone-5-methylcarboxylate, 2-pyrrolidone-5-ethylcarboxylate, 2-pyrrolidone-5-butylcarboxylate and 2-pyrrolidone-5-(2-ethylhexylcarboxylate)), cyclohexane dicarboxylic ester (such as cis-1,2-(cyclohexane didibutylcarboxylate), trans-1,2-(cyclohexane dibutyldicarboxylate), cis-1,4-cyclohexane dibutyldicarboxylate and trans-1,4-cyclohexane dibutyldicarboxylat), xylytol carboxylic ester (such as xylytol pentaacetate, xylytol tetraacetate and xylytol pentapropipnate).

Glycerol ester is described in JP-A 11-246704. Diglycerol ester is described in JP-A 2000-63560. Citric ester is described in JP-A 11-92574.

In a compound of aforesaid Formula (13), $Q^1$, $Q^2$ and $Q^3$ are each independently a group having a 5-member or 6-member ring. The ring includes a hydrocarbon ring and a heterocyclic ring. The ring may form a condensed ring with other rings.

The hydrocarbon ring is preferably a substituted or unsubstituted cyclohexane ring, a substituted or unsubstituted cyclopentane ring or an aromatic hydrocarbon ring, and more preferably an aromatic hydrocarbon ring.

The aromatic hydrocarbon ring is preferably a monocyclic or bicyclic having a carbon number of 6-30 (such as a benzene ring and a naphthalene ring). The carbon number is preferably 6-20 and more preferably 6-12. Specifically preferable is a benzene ring.

A herocyclic ring preferably contains an oxygen atom, a nitrogen atom or a sulfur atom as a hetero atom.

Examples of a heterocyclic ring include furan, pyrrole, thiophen, imidazole, pyrazole, pyridine, pyrazine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthoroline, phenazine, tetrazole, benzimidazole, benzoxazole, benzthiazole, benztriazole and tetrazaindene. Pyridine, triazine and quinoline are preferable.

$Q^1$, $Q^2$ and $Q^3$ may be provided with a substituent.

Examples of a substituent include an alkyl group, an alkenyl group, an alkynyl group, an aryl group, a substituted amino group, an alkoxy group, an aryloxy group, an acyl group, an alkoxycarbonyl group, an aryloxycarbonyl group, an acyloxy group, an amido group, an alkoxycarbonylamino group, an aryloxycarbonylamino group, a sulfonamido group, a sulfamoyl group, a substituted sulfamoyl group, a carbamoyl group, a substituted carbamoyl group, an alkylthio group, an arylthio group, a sulfonyl group, a sulfinyl group, an ureido group, an phosphoric amido group, a hydroxyl group, a mercapto group, a halogen atom (such as a fluorine atom, a chlorine atom, a bromine atom and an iodine atom), a cyano group, a sulfo group, a carboxyl group, a nitro group, a hydroxamic group, a sulfino group, a hydrazine group, an imino group, a heterocyclic group and silyl group. These substituents may be further provided with a substituent. Plural substituents may be different from each other. Further, plural substituents may bond together to form a ring.

The carbon number of an alkyl group is preferably 1-20, more preferably 1-12 and most preferably 1-8. Examples of an alkyl group include methyl, ethyl, isopropyl, tert-butyl, octyl, decyl, hexadecyl, cyclopropyl, cyclopentyl and cyclohexyl.

The carbon number of an alkenyl group is preferably 2-20, more preferably 2-12 and most preferably 2-8. Examples of an alkenyl group include vinyl, allyl, 2-butenyl and 3-pentenyl.

The carbon number of an alkynyl group is preferably 2-20, more preferably 2-12 and most preferably 2-8. Examples of an alkenyl group include propagyl and 3-pentynyl.

The carbon number of an aryl group is preferably 6-30, more preferably 6-20 and most preferably 6-12. Examples of an aryl group include phenyl, p-methylphenyl and naphthyl.

The carbon number of a substituted amino group is preferably 1-20, more preferably 1-10 and most preferably 1-6. Examples of a substituted amino group include methylamino, dimethylamino, diethylamino and dibenzylamino.

The carbon number of an alkoxy group is preferably 1-20, more preferably 1-12 and most preferably 1-8. Examples of an alkyl group include methoxy, ethoxy and butoxy.

The carbon number of an aryloxy group is preferably 6-20, more preferably 6-16 and most preferably 6-12. Examples of an aryl group include phenyloxy and 2-naphthyloxy.

The carbon number of an acyl group is preferably 1-20, more preferably 1-16 and most preferably 1-12. Examples of an acyl group include acetyl, benzoyl, formyl and pivaloyl.

The carbon number of an alkoxycarbonyl group is preferably 2-20, more preferably 2-16 and most preferably 2-12. Examples of an alkoxycarbonyl group include methoxycarbonyl and ethoxycarbonyl.

The carbon number of an aryloxycarbonyl group is preferably 7-20, more preferably 7-16 and most preferably 7-10. Examples of an aryloxycarbonyl group include phenyloxycarbonyl.

The carbon number of an acyloxy group is preferably 2-20, more preferably 2-16 and most preferably 2-10. Examples of an acyloxy group include acetoxy and benzoyloxy.

The carbon number of an amido group is preferably 2-20, more preferably 2-16 and most preferably 2-10. Examples of an amido group include acetoamido and benzamido.

The carbon number of an alkoxycarbonylamino group is preferably 2-20, more preferably 2-16 and most preferably 2-12. Examples of an alkoxycarbonylamino group include methoxycarbonylamino.

The carbon number of an aryloxycarbonylamino group is preferably 7-20, more preferably 7-16 and most preferably 7-12. Examples of an aryloxycarbonylamino group include phenyloxycarbonylamino.

The carbon number of a sulfonamido group is preferably 1-20, more preferably 1-16 and most preferably 1-12. Examples of a sulfonamido group include methanesulfonamido and benzenesulfonamido.

The carbon number of a substituted sulfamoyl group is preferably 1-20, more preferably 1-16 and most preferably 1-12. Examples of a substituted sulfamoyl group include methylsulfamoyl, dimethylsulfamoyl and phenylsulfamoyl.

The carbon number of a substituted carbamoyl group is preferably 2-20, more preferably 2-16 and most preferably 2-12. Examples of a substituted carbamoyl group include carbamoyl, methylcarbamoyl, diethylcarbamoyl and phenylcarbamoyl.

The carbon number of an alkylthio group is preferably 1-20, more preferably 1-16 and most preferably 1-12. Examples of an alkylthio group include methylthio and ethylthio.

The carbon number of an arylthio group is preferably 6-20, more preferably 6-16 and most preferably 6-12. Examples of an arylthio group include phenylthio.

The carbon number of a sulfonyl group is preferably 1-20, more preferably 1-16 and most preferably 1-12. Examples of a sulfonyl group include mesyl and tosyl.

The carbon number of a sulfinyl group is preferably 1-20, more preferably 1-16 and most preferably 1-12. Examples of a sulfinyl group include methanesulfinyl and benzenesulfinyl.

The carbon number of an ureido group is preferably 1-20, more preferably 1-16 and most preferably 1-12. Examples of an ureido group include ureido, methylureido and phenylureido.

The carbon number of a phosphoricamido group is preferably 1-20, more preferably 1-16 and most preferably 1-12. Examples of a phosphoricamido group include diethyl phosphoricamido and phenyl phosphoricamido.

The carbon number of a heterocyclic group is preferably 1-30 and more preferably 1-12. Examples of a hetero atom include a nitrogen atom, an oxygen atom and a sulfur atom. Examples of a heterocyclic group include imidazolyl, pyridyl, quinolyl, furyl, piperidyl, morpholino, benzoxazolyl, benzimidazolyl and benzthiazolyl.

The carbon number of a silyl group is preferably 3-40, more preferably 3-30 and most preferably 3-24. Examples of a silyl group include trimethylsilyl and triphenylsilyl.

Next, a compound of Formula (13) will be explained.

In Formula (13), X is a trivalent group selected from B, C—R (R is a hydrogen atom or a substituent), N, P and P=O. X is preferably B, C—R or N, more preferably C—R or N and most preferably C—R.

Examples of a substituent of R include an aryl group, an amino group, a substituted amino group, an alkoxy group, an aryloxy group, an acyl group, an alkoxycarbonyl group, an aryloxycarbonyl group, an acyoxy group, an acylamino group, an alkoxycarbonylamino group, an aryloxycarbonylamino group, a sulfonylamino group, a hydroxyl group, a mercapto group, a halogen atom (such as a fluorine atom, a chlorine atom, a bromine atom and an iodine atom) and a carboxyl group. A substituent of R is preferably an aryl group, an alkoxy group, an aryloxy group, a hydroxyl group or a halogen atom; more preferably an alkoxy group or a hydroxyl group and most preferably a hydroxyl group.

A compound represented by Formula (13) is further preferably a compound represented by following Formula (a).

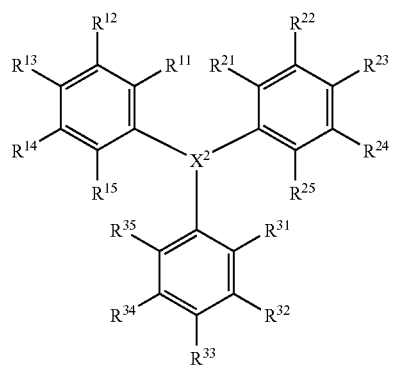

Formula (a)

In Formula (a), $X^2$ is a trivalent group selected from B, C—R (R is a hydrogen atom or a substituent) and N. The details of $X^2$ are identical with Formula (13).

In Formula (a), $R^{11}$, $R^{12}$, $R^{13}$, $R^{14}$, $R^{15}$, $R^{21}$, $R^{22}$, $R^{24}$, $R^{24}$, $R^{25}$, $R^{31}$, $R^{32}$, $R^{33}$, $R^{34}$ and $R^{35}$ each independently are a hydrogen atom or a substituent.

Details of the substituent are similar to substituents of $Q^1$, $Q^2$ and $Q^3$ in Formula (13).

$R^{11}$, $R^{12}$, $R^{13}$, $R^{14}$, $R^{15}$, $R^{21}$, $R^{22}$, $R^{24}$, $R^{24}$, $R^{25}$, $R^{31}$, $R^{32}$, $R^{33}$, $R^{34}$ and $R^{35}$ are preferably an alkyl group, an alkenyl group, an alkynyl group, an aryl group, an amino group, a substituted amino group, an alkoxy group, an aryloxy group, an acyl group, an alkoxycarbonyl group, an aryloxycarbonyl group, an acyloxy group, an amido group, an alkoxycarbonylamino group, an aryloxycarbonylamino group, a sulfonamide group, a sulfamoyl group, a substituted sulfamoyl group, a carbamoyl group, a substituted carbamoyl group, an alkylthio group, an arylthio group, a sulfonyl group, a sulfinyl group, an ureido group, a phosphoricamido group, a hydroxyl group, a mercapto group, a halogen atom (a fluorine atom, a chlorine atom, a bromine atom and an iodine atom), a cyano group, a sulfo group, a carboxyl group, a nitro group, a hydroxamic group, a sulfino group, a hydrazine group, an imono group, a heterocyclic group and silyl group; more preferably an alkyl group, an aryl group, an amino group, a substituted amino group, an alkoxy group, an aryloxy group; and most preferably an alkyl group, an aryl group and an alkoxy group.

These substituents may be further provided with a substituent. Plural substituents may be different from each other. Further, plural substituents may bond together to form a ring.

Next, in a compound represented by Formula (14), $R^1$, $R^2$, and $R^3$ each independently are preferably a hydrogen atom or an alkyl group having a carbon number of 1-5 (such as methyl, ethyl, propyl, isopropyl, butyl, amyl and isoamyl), and at least one of $R^1$, $R^2$, and $R^3$ is specifically preferably an alkyl group having a carbon number of 1-3 (such as methyl, ethyl, propyl and isopropyl). X is preferably a divalent connecting group comprising not less than one type of groups selected from a single bond, —O—, —CO—, an alkylene group (preferably having a carbon number of 1-6 and more preferably of 1-3, such as methylene, ethylene and propylene) or an arylene group (preferably having a carbon number of 6-24 and more preferably of 6-12, such as phenylene, biphenylene and naphthylene); and specifically preferably a divalent connecting group comprising not less than one type of groups selected from —O—, an alkyl group or an arylene group. Y is preferably a hydrogen atom, an alkyl group (preferably having a carbon number of 2-25 and more preferably of 2-20, such as ethyl, isopropyl, t-butyl, hexyl, 2-ethylhexyl, t-octyl, dodecyl, cyclohexyl, dicyclohexyl and adamantyl), an aryl group (preferably having a carbon number of 6-24 and more preferably of 6-18, such as phenyl, biphenyl, terphenyl and naphthyl) or an aralkyl group (preferably having a carbon number of 7-30 and more preferably of 7-20, such as benzyl, cresyl, t-butylphenyl, diphenylmethyl and triphenylmethyl); and specifically preferably an alkyl group, an aryl group or an aralkyl group. As a combination of —X—Y, the total carbon number of —X—Y is preferably 0-40, more preferably 1-30 and most preferably 1-25.

Preferable examples of a compound represented by Formula (14) will be shown below, however, this invention is not limited to these specific examples.

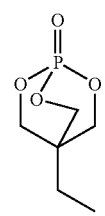

PL-1

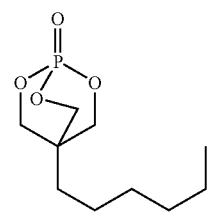

PL-2

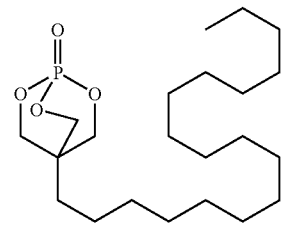

PL-3

PL-4 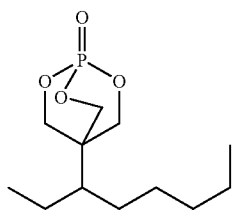
PL-5 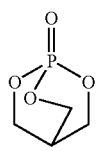
PL-6 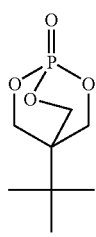
PL-7 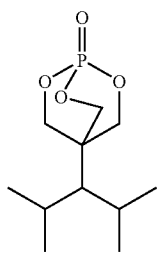
PL-8 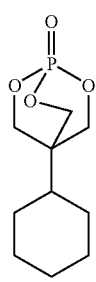
PL-9 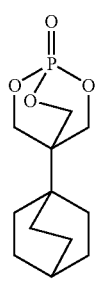
PL-10 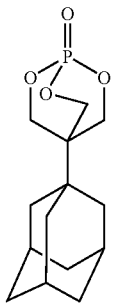
PL-11 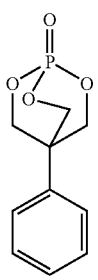
PL-12 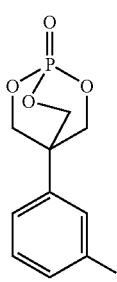
PL-13 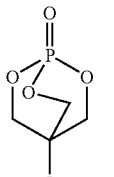
PL-14 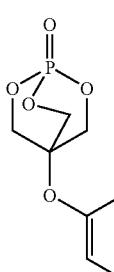
PL-15 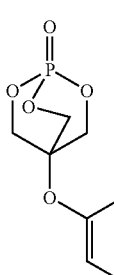

PL-16 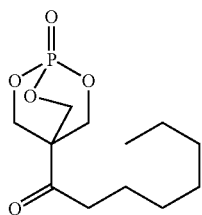
PL-17 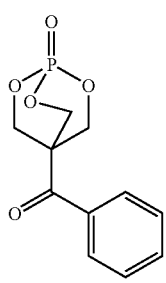
PL-18 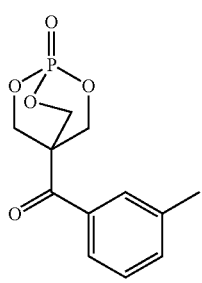
PL-19 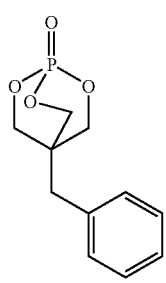
PL-20 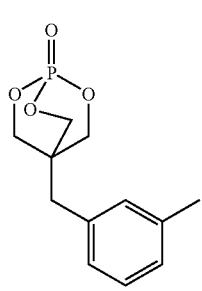
PL-21 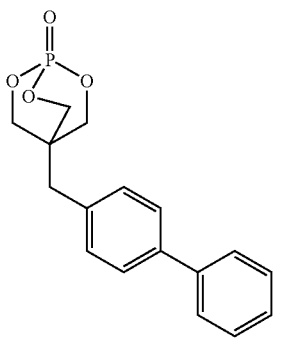
PL-22 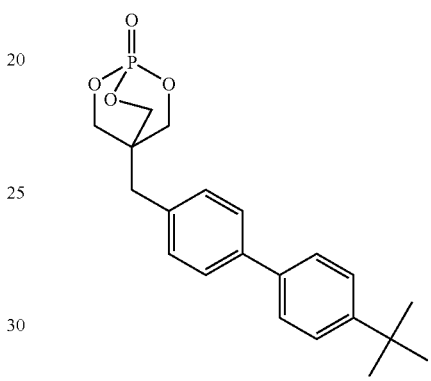
PL-23 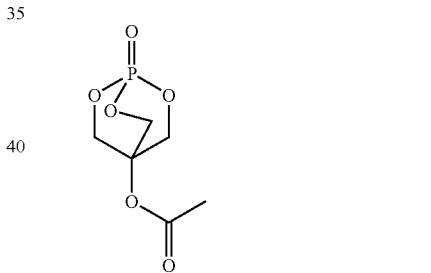
PL-24 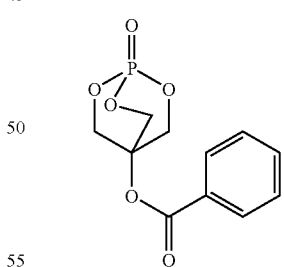
PL-25 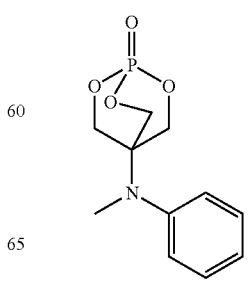

PL-26
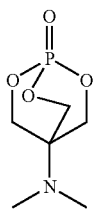
PL-27
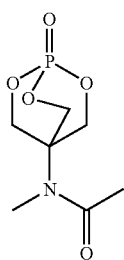
PL-28
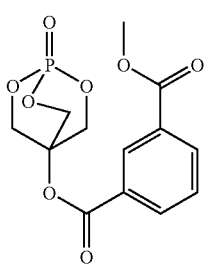
PL-29
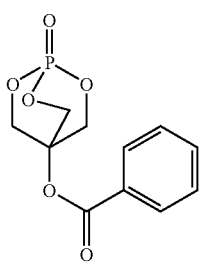
PL-30
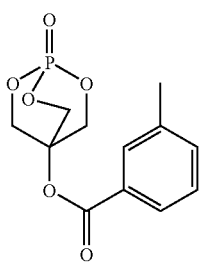
PL-31
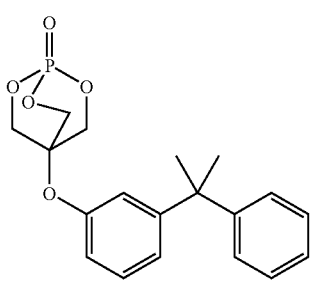
PL-32
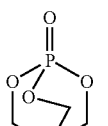
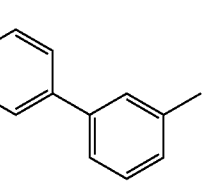
PL-33
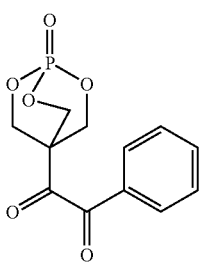
PL-34
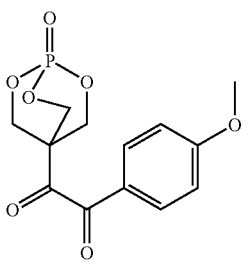
PL-35
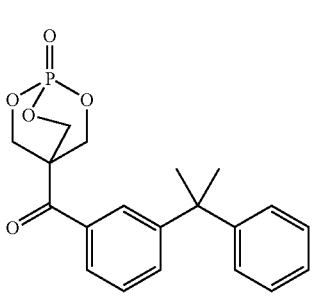
PL-36
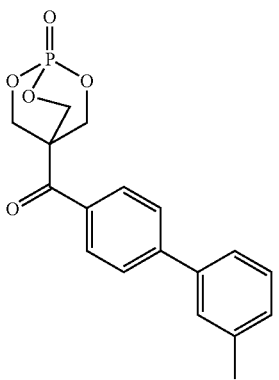

PL-37

PL-38

PL-39

PL-40

PL-41

In addition to this, the following compound is preferably incorporated in polarizing plate protective film of this invention.

Formula (17)

(In the formula, $Q^1$ and $Q^2$ are each independently an aromatic ring. $X^1$ and $X^2$ are a hydrogen atom or a substituent, and at least either one of them is a cyano group, a carbonyl group, a sulfonyl group or an aromatic heterocyclic ring.) An aromatic ring represented by $Q^1$ and $Q^2$ may be either an aromatic hydrocarbon ring or an aromatic heterocyclic ring. Further, these may be a monocycle or may further form a condensed ring together with other rings.

An aromatic hydrocarbon ring is a monocyclic or bicyclic aromatic hydrocarbon ring having a carbon number of 6-30 (including such as a benzene ring and a naphthalene ring), more preferably having a carbon number of 6-20 and furthermore preferably having a carbon number of 6-12. Specifically preferable is a benzene ring.

An aromatic heterocyclic ring is preferably an aromatic heterocyclic ring containing a nitrogen atom or a sulfur atom. Specific examples of an heterocyclic ring include such as thiophene, imidazole, pyrrazole, pyridine, pyradine, pyridazine, triazole, triazine, indole, indazole, purine, thiazoline, thiazole, thiadiazole, oxazoline, oxazole, oxadiazole, quinoline, isoquinoline, phthalazine, naphthyridine, quinoxaline, quinazoline, cinnoline, pteridine, acridine, phenanthroline, phenazine, tetrazole, benzimidazole, benzoxazole, benzthiazole, benztriazole and tetrazainden. Preferable aromatic hetrocyclic rings are pyridine, triazine and quinoline.

An aromatic ring represented by $Q^1$ and $Q^2$ is preferably an aromatic hydrocarbon ring and more preferably a benzene ring.

$Q^1$ and $Q^2$ may be further provided with a substituent, and substituent T described later is preferred. Substituent T includes an alkyl group (preferably having a carbon number of 1-20, more preferably of 1-12 and specifically preferably of 1-8; such as methyl, ethyl, isopropyl, tert-butyl, n-octyl, n-decyl, n-hexadecyl, cyclopropyl, cyclopentyl and cyclohexyl), an alkenyl group (preferably having a carbon number of 2-20, more preferably of 2-12 and specifically preferably of 2-8; such as vinyl, allyl, 2-butenyl and 3-pentenyl), an alkynyl group (preferably having a carbon number of 2-20, more preferably of 2-12 and specifically preferably of 2-8; such as propagyl and 3-pentynyl), an aryl group (preferably having a carbon number of 6-30, more preferably of 6-20 and specifically preferably of 6-12; such as phenyl, p-methylphenyl and naphthyl), a substituted or unsubstituted amino group (preferably having a carbon number of 0-20, more preferably of 0-10 and specifically preferably of 0-6; such as amino, methylamino, dimethylamino, diethylamino and dibenzylamino), an alkoxy group (preferably having a carbon number of 1-20, more preferably of 1-12 and specifically preferably of 1-8; such as methoxy, ethoxy and butoxy), an aryloxy group (preferably having a carbon number of 6-20, more preferably of 6-16 and specifically preferably of 6-12; such as phenyloxy and 2-naphthyloxy), an acyl group (preferably having a carbon number of 1-20, more preferably of 1-16 and specifically preferably of 1-12; such as acetyl, benzoyl, formyl and pivaloyl), an alkoxycarbonyl group (preferably having a carbon number of 2-20, more preferably of 2-16 and specifically preferably of 2-12; such as methoxycarbonyl and ethoxycarbonyl), an aryloxycarbonyl group (preferably having a carbon number of 7-20, more preferably of 7-16 and specifically preferably of 7-10; such as phenyoxycarbonyl), an acyloxy group (preferably having a carbon number of 2-20, more preferably of 2-16 and specifically preferably of 2-10; such as acetoxy and benzoyloxy), an acylamino group (preferably having a carbon number of 2-20, more preferably of 2-16 and specifically preferably of 2-10; such as acetylamino and benzoylamino), an alkoxycarbonylamino group (preferably having a carbon number of 2-20, more preferably of 2-16 and specifically preferably of 2-12; such as methoxycarbonylamion), an aryloxycarbonylamino group (preferably having a carbon number of 7-20, more preferably of 7-16 and specifically preferably of 7-12; such as phenyloxycarbonylamino), a sulfonylamino group (preferably having a carbon number of 1-20, more preferably of 1-16 and specifically preferably of 1-12; such as methanesulfonylamino and benzenesulfonylamino), a sulfamoylamino group (preferably having a carbon number of 0-20, more preferably of 0-16 and specifically preferably of 0-12; such as sulfamoyl, methylsulfamoyl, dimethylsulfamoyl and phenylsulfamoyl), a carbamoyl group (preferably having a carbon number of 1-20, more preferably of 1-16 and specifically preferably of 1-12; such as carbamoyl, methylcarbamoyl, diethylcarbamoyl and phenylcarbamoyl), an alkylthio group (preferably having a carbon number of 1-20, more preferably of 1-16 and specifically preferably of 1-12; such as methylthio and ethylthio), an arylthio group (preferably having a carbon number of 6-20, more preferably of 6-16 and specifically preferably of 6-12; such as phenylthio), a sulfonyl group (preferably having a carbon number of 1-20, more preferably of 1-16 and specifically preferably of 1-12; such as mesyl and tosyl), a sulfinyl group (preferably having a carbon number of 1-20, more preferably of 1-16 and specifically preferably of 1-12; such as methanesulfinyl and benzenesulfinyl), an ureido group (preferably having a carbon number of 1-20, more preferably of 1-16 and specifically preferably of 1-12; such as ureido, methylureido and phenylureido), an phosphoric amido group (preferably having a carbon number of 1-20, more preferably of 1-16 and specifically preferably of 1-12; such as dimethylphosphoric amido and phenylphosphoric amido), a hydroxyl group, a mercapto group, a halogen atom (such as a fluorine atom, a chlorine atom, a bromine atom and an iodine atom), a cyano group, a sulfo group, a carboxyl group, a nitro group, a hydroxam group, a sulfino group, a hydrazine group, an imino group, a heterocyclic group (preferably having a carbon number of 1-30 and more preferably of 1-12; a hetero atom of which is such as a nitrogen atom, an oxygen atom or a sulfur atom; and specifically includes such as imidazolyl, pyridyl, quinolyl, furyl, pyperidyl, morpholino, benzoxazolyl, benzimidazolyl and benzthiazolyl) and silyl group (preferably having a carbon number of 3-40 and more preferably of 3-30 and specifically preferably of 3-24; such as trimethylsilyl and triphenylsilyl). These substituents may be further substituted. Further, when at least two substituents are provided, they may be the same or different. And, they may form a ring by bonding to each other when it is possible.

$X^1$ and $X^2$ are a hydrogen atom or a substituent, and at least one of them is an cyano group, a carbonyl group, a sulfonyl group or an aromatic heterocyclic group. As a substituent represented by $X^1$ and $X^2$, aforesaid substituent T may be employed. Further, a substituent represented by $X^1$ and $X^2$, may be further substituted by a substituent. $X^1$ and $X^2$ each may ring-condense to form a condensed structure.

$X^1$ and $X^2$ are preferably a hydrogen atom, an alkyl group, an aryl group, a cyano group, a nitro group, a carbonyl group, a sulfonyl group and an aromatic heterocyclic ring; more preferably a cyano group, a carbonyl group, a sulfonyl group and an aromatic heterocyclic group; furthermore preferably a cyano group and a carbonyl group; and specifically preferably a cyano group and alkoxycarbonyl group (—C(=O)OR (R is an alkyl group having a carbon number of 1-20, an aryl group having a carbon number of 6-12, and combinations thereof)).

A preferable compound represented by Formula (17) is a compound represented by following (18).

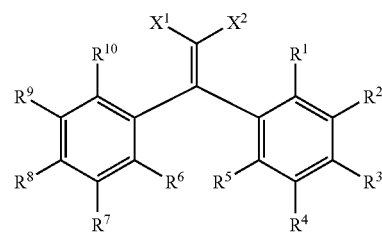

Formula (18)

(In the formula, $R^1$, $R^2$, $R^3$, $R^4$, $R^5$, $R^6$, $R^7$, $R^8$, $R^9$ and $R^{10}$ are each independently a hydrogen atom or a substituent. $X^1$ and $X^2$ are identical with those in Formula (17), and the preferable range is similar.)

$R^1$, $R^2$, $R^3$, $R^4$, $R^5$, $R^6$, $R^7$, $R^8$, $R^9$ and $R^{10}$ are each independently a hydrogen atom or a substituent, and as the substituent aforesaid substituent T can be applied. Further, these substituents may be further substituted by other substituent. Substituents themselves may ring-condense to form a condensed structure.

$R^1$, $R^2$, $R^3$, $R^4$, $R^5$, $R^6$, $R^7$, $R^8$, $R^9$ and $R^{10}$ are preferably a hydrogen atom, an alkyl group, an alkenyl group, an alkynyl group, an aryl group, a substituted or unsubstituted amino group, an alkoxy group, an aryloxy group, a hydroxyl group and a halogen atom; more preferably a hydrogen atom, an alkyl group, an aryl group, an alkoxy group, an aryloxy group, a hydroxyl group and a halogen atom; furthermore preferably a hydroxyl group and an alkyl group having a carbon number of 1-12; specifically preferably a hydrogen atom and a methyl group; and most preferably a hydrogen atom.

$R^3$ and $R^8$ are preferably a hydrogen atom, an alkyl group, an alkenyl group, an alkynyl group, an aryl group, a substituted or unsubstituted amino group, an alkoxy group, an aryloxy group, a hydroxyl group and a halogen atom; more preferably a hydrogen atom, an alkyl group having a carbon number of 1-20, an amino group having a carbon number of 0-20, an alkoxy group having a carbon number of 1-12, an aryloxy having a carbon number of 6-12 and a hydroxyl group; furthermore preferably a hydrogen atom, an alkyl group having a carbon number of 1-12 and an alkoxy group having a carbon number of 1-12; and most preferably a hydrogen.

Formula (17) is more preferably a compound represented by following Formula (19).

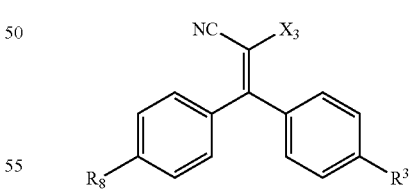

Formula (19)

(In the formula, $R^3$ and $R^8$ are identical to those of Formula (17), and the preferable range is also the same. $X^3$ is a hydrogen atom or a substituent.)

$X^3$ is a hydrogen atom or a substituent, and as the substituent, aforesaid substituent T can be applied and the substituent may be further provided with a substituent when it is possible. $X^3$ is preferably a hydrogen atom, an alkyl atom, an aryl group, a cyano group, a nitro group, a carbonyl group, a sulfonyl group and an aromatic heterocyclic ring; more preferably a cyano group, a carbonyl group, a sulfonyl group and an aromatic heterocyclic ring; furthermore preferably a cyano group and a carbonyl group; and specifically preferably a cyano group and an alkoxycarbonyl group (—C(=O)OR, R is an alkyl group having a carbon number of 1-20, an aryl group having a carbon number of 6-12 and combinations thereof).

Formula (17) is more preferably a compound represented by following Formula (20).

Formula (20)

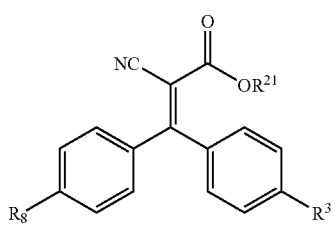

(In the formula, $R^3$ and $R^8$ are identical to those of Formula (18), and the preferable range is also the same. $R^{21}$ is an alkyl group having a carbon number of 1-20.)

In the case that both $R^3$ and $R^8$ are a hydrogen atom, $R^{21}$ is preferably an alkyl group having a carbon number of 2-12; more preferably an alkyl group having a carbon number of 4-12; furthermore preferably an alkyl group having a carbon number of 6-12; specifically preferably an n-octyl group, a tert-octyl group, a 2-ethylhexyl group, an n-decyl group and an n-dodecyl group; and most preferably a 2-ethylhexyl group.

In the case that $R^3$ and $R^8$ are other than a hydrogen atom, $R^{21}$ is preferably an alkyl group to make the molecular weight of a compound represented by Formula (20) of over 300 and having a carbon number of not more than 20.

A compound represented by Formula (17) can be synthesized by a method described in Journal of American Chemical Society, vol. 63, p. 3452 (1941).

In the following, specific examples of a compound represented by Formula (17) will be listed, however, this invention is not limited at all to the following specific examples.

UV-201

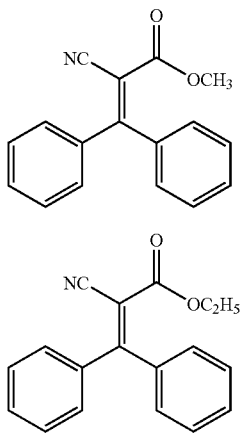

UV-202

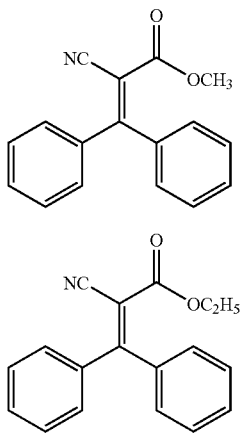

UV-203

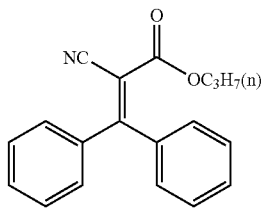

UV-204

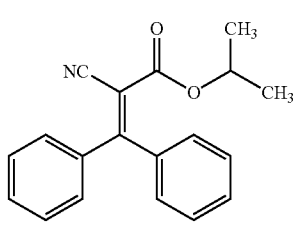

UV-205

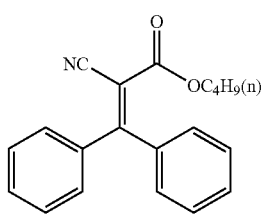

UV-206

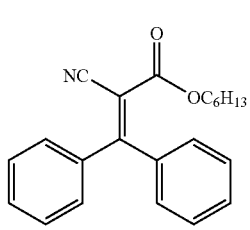

UV-207

UV-208

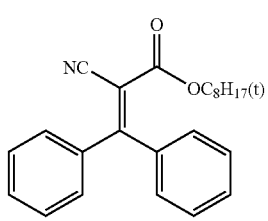

UV-209

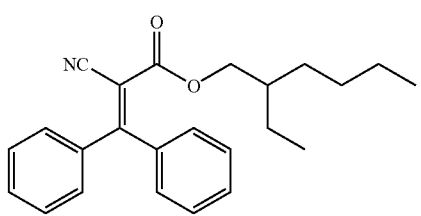

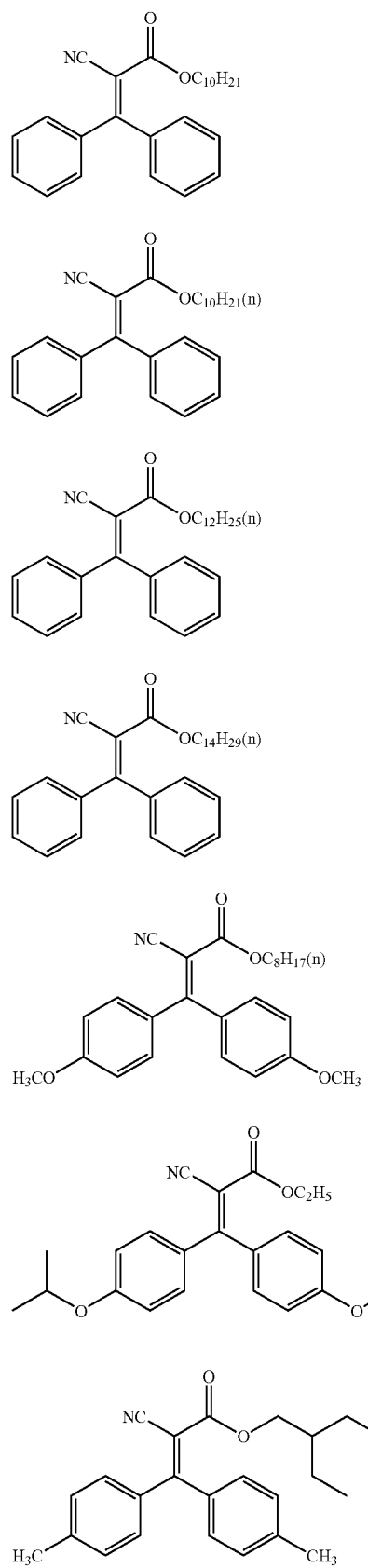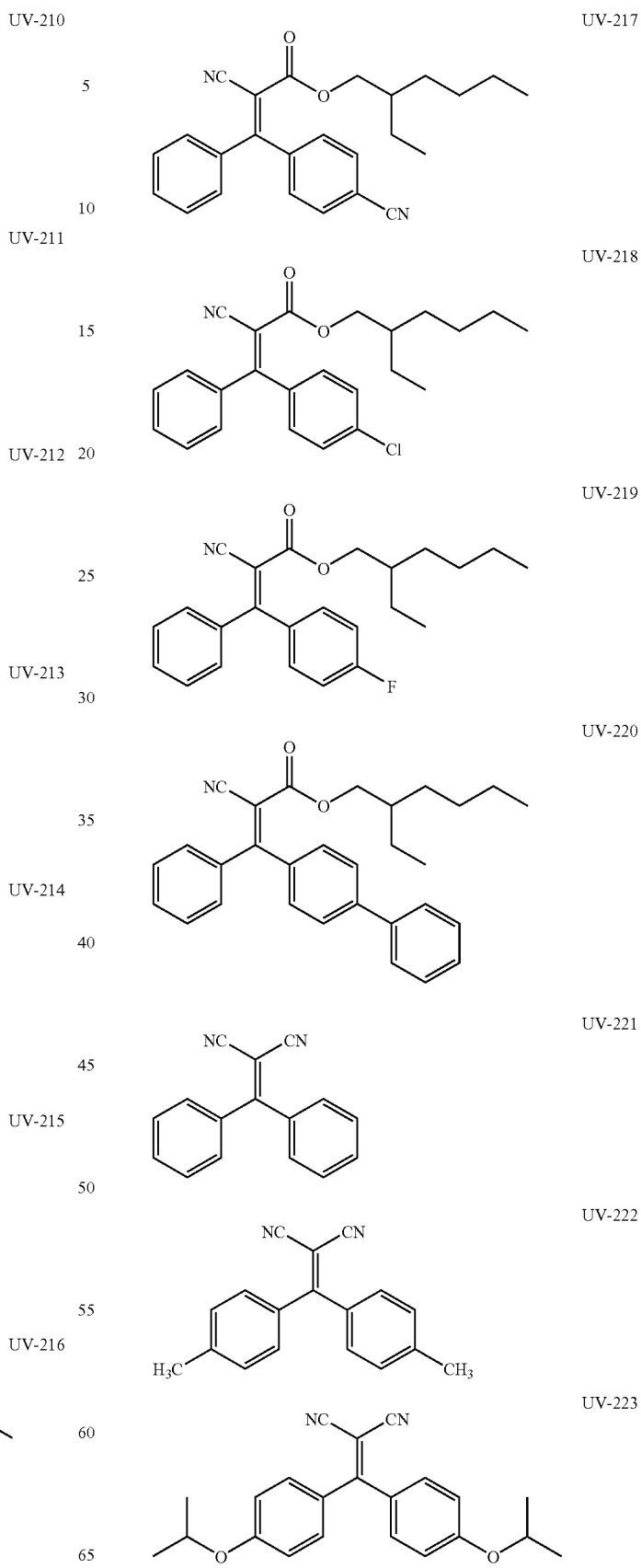

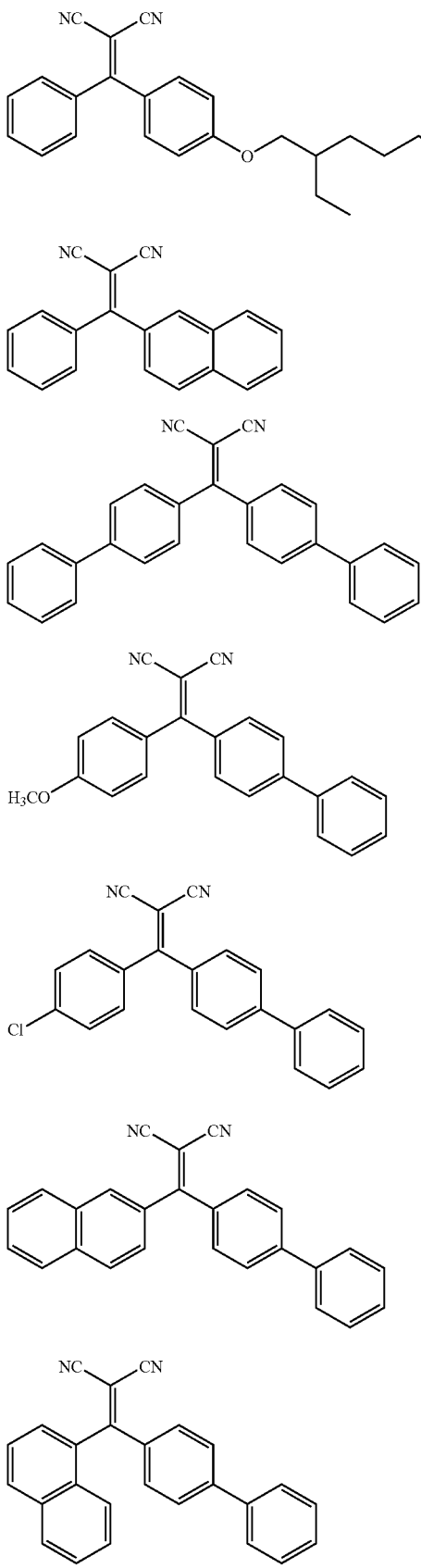

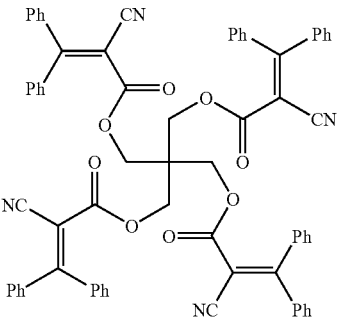

These compounds can be incorporated at 0.1-15 weight % in polarizing plate protective film of this invention.

By employing film in which aforesaid acryl polymer or polyester, or a compound represented by Formulas (1)-(14) are added, a polarizing plate exhibiting little deterioration due to high temperature and high humidity. Further, by utilizing this polarizing plate, an IPS mode type liquid crystal display device, which can maintain stability of a contrast and a viewing angle for a long period and is excellent in flatness of the surface, can be prepared.

<Cellulose Ester>

Cellulose ester utilized in polarizing plate protective film of this invention is not specifically limited, however, cellulose ester may be carboxylic ester having a carbon number of approximately 2-22 or may be ester of aromatic carboxylic acid and is specifically preferably lower fatty acid ester of cellulose. Lower fatty acid in lower fatty acid ester of cellulose means fatty acid having a carbon number of not more than 6. Acyl groups bonding to hydroxyl groups may be either a straight chain or branched, or may form a ring. Further, acyl groups may be substituted by other substituents. In the case of a same substitution degree, since double refraction is decreased when the aforesaid carbon number is large, a carbon number is preferably selected from acyl groups having a carbon number of 2-6. The carbon number as the aforesaid cellulose ester is preferably 2-4 and more preferably 2-3.

The aforesaid cellulose ester can also employ an acyl group derived from mixed acid and specifically preferably an acyl group having a carbon number of 2 and 3 or a carbon number of 2 and 4. As cellulose ester utilized in this invention, mixed fatty acid ester of cellulose in which a propionate group or a butyrate group other than an acetyl group is attached, such as cellulose acetate propionate, cellulose acetate butyrate or cellulose acetate propionate butyrate can be employed. A butyryl group constituting butyrate may be either a straight chain or branched. Cellulose ester specifically preferably utilized in this invention is cellulose acetate, cellulose acetate butyrate, cellulose acetate propionate or cellulose acetate phthalate.

Further, a retardation value can be appropriately controlled by such as the type of the aforesaid acyl group of cellulose ester and a substitution degree of an acyl group to a pyranose ring of the cellulose resin skeleton.

Cellulose ester preferable in this invention is those simultaneously satisfying equations (1) and (2).

$$2.0 \leq X+Y \leq 3.0 \quad \text{Equation (1)}$$

$$0 \leq Y \leq 2.0 \quad \text{Equation (2)}$$

wherein, X is a substitution degree of an acetyl group, Y is a substitution degree of an propionyl group or a butyryl group. Those satisfying the above-described 2 equations are suitable for manufacturing polarizing plate protective film which exhibits excellent optical characteristics to meet an object of this invention.

Among them, triacetyl cellulose and cellulose acetate propionate are specifically preferably utilized. In cellulose acetate propionate, X is in $1.0 \leq X \leq 2.5$, and it is preferable that Y and X+Y are $0.1 \leq Y \leq 1.5$ and $2.0 \leq X+Y \leq 3.0$. A substitution degree of an acyl group can be measured by a measurement method based on ASTM-D817-96.

When the aforesaid substitution degree of an acyl group is excessively low, the unreacted portion against hydroxyl groups of a pyranose ring constituting a skeleton of cellulose resin increases to make a large residual amount of said hydroxyl groups, resulting in decrease of ability to restrain variation of retardation depending on humidity and to protect a polarizer as polarizing plate protective film, which is not preferable.

The number average molecular weight of cellulose ester utilized in this invention is preferably in a range of 60,000-300,000 because of large mechanical strength of prepared film. Those having a number average molecular weight of 70,000-200,000 are more preferably utilized.

The number average molecular weight of cellulose ester can be measured as follows.

Measurement is performed by means of high speed liquid chromatography under the following condition.
Solvent: Acetone
Column: MPW×1 (produced by Toso Co., Ltd.)
Sample concentration: 0.2 (weight/volume) %
Flow rate: 1.0 ml/min
Sample injection quantity: 300 μl
Standard sample: standard polystyrene
Temperature 23° C.

Cellulose as a starting material of cellulose ester utilized in this invention is not specifically limited, and includes such as cotton linter, wood pulp and kenaf. Further, cellulose ester prepared from them can be utilized by mixing each of them at an arbitrary ratio.

Cellulose ester according to this invention, in the case that an acylation agent as a cellulose starting material is acid anhydride, is prepared by a reaction utilizing a proton type catalyst such as sulfuric acid in an organic acid such as acetic acid or in an organic solvent such as methylene chloride. In the case that an acylation agent is acid chloride ($CH_3COCl$, $C_2H_5COCl$, $C_3H_7COCl$), the reaction is performed utilizing a basic compound such as amine as a catalyst. Specifically, the synthesis can be performed referring to a method described in JP-A 10-54804.

An average substitution degree of an acyl group at the 6-position of a glucose unit of cellulose ester utilized in this invention is preferably 0.5-0.9.

A highly reactive primary hydroxyl group is present at the 6-position of a glucose unit constituting cellulose ester, different from the 2-position and the 3-position, and this primary hydroxyl group preferentially forms sulfuric ester in a manufacturing process of cellulose ester employing sulfuric acid as a catalyst. Therefore, in an esterification reaction of cellulose, the average substitution degree at the 2-position and the 3-position of a glucose unit can be made larger that that at the 6-position by increasing the amount of sulfuric acid as a catalyst, compared to general cellulose ester. Further, when necessary, since a hydroxyl group at the 6-position of a glucose unit can be selectively protected when cellulose is tritylated, it is possible to make the average substitution degree at 2-position and the 3-position of a glucose unit larger than that at the 6-position, by protecting a hydroxyl group at the 6-position by tritylation and releasing a trityl group (a protective group) after esterification. Specifically, cellulose ester manufactured by a method described in JP-A 2000-281645 can be also preferably utilized.

In the case of acetyl cellulose, it is necessary to prolong the time of an acetylation reaction to increase an acetylation degree. However, when the reaction time is excessively long, decomposition will proceed simultaneously to cause such as cut off of a polymer chain and decomposition of an acetyl group, which leads to an unfavorable result. Therefore, it is necessary to set the reaction time of a certain range to increase the acetylation degree and depress decomposition to some extent. To regulate by reaction time is not suitable because the reaction conditions are various to be changed depending on the reaction equipment and installation and other conditions. Since molecular weight distribution is broadened as decomposition of polymer proceeds, also in the case of cellulose ester, the degree of decomposition can be determined by a value of weight average molecular weight (Mw)/number average molecular weight (Mn), which is generally utilized. That is, in a process of acetylation of cellulose triacetate, a value of weight average molecular weight (Mw)/number average molecular weight (Mn) can be utilized as one index not to advance decomposition too much due to prolonged reaction time but to perform acetylation reaction for sufficient time.

An example of a manufacturing method of cellulose ester will be shown below. Cotton linter of 100 weight parts as a cellulose starting material was crushed, being added with 40 weight parts of acetic acid, and the resulting system was subjected to a pre-treatment activation at 36° C. for 20 minutes. Thereafter, the system was added with 8 weight parts of sulfuric acid, 260 weight parts of acetic acid anhydride and 350 weight parts of acetic acid, and the resulting system was subjected to esterification at 36° C. for 120 minutes. After neutralization with 11 weight parts of a 24% magnesium acetate aqueous solution, saponification reipnig at 63° C. for 35 minutes was performed to prepare acetyl cellulose. The product, after having been stirred for 160 minutes at room temperature by use of 10 times of an acetic acid aqueous solution (acetic acid/water=1/1 (weight ratio)), was filtered and dried to prepare purified acetyl cellulose having an acetyl substitution degree of 2.75. This acetyl cellulose had Mn of 92,000, Mw of 156,000 and Mw/Mn of 1.7. In a similar manner, by adjusting esterification conditions (temperature, time, stirring) and hydrolysis conditions, cellulose ester having a different substitution degree and a different Mw/Mn can be synthesized. Cellulose ester having a Mw/Mn ratio of 1.4-5.0 is preferably utilized.

Herein, cellulose ester synthesized is preferably subjected to purification to remove a low molecular weight component and to filtration to remove a component which has not been acetylated or has a low acetylation degree.

Further, mixed acid cellulose ester can be prepared by a method described in JP-A 10-45804.

Further, cellulose ester is also affected by trace amounts of metal components in cellulose ester. These are considered to be related with water utilized in a manufacturing process, and a component which forms insoluble nuclei is preferably as small as possible in quantity; and metal ions of such as iron, calcium and magnesium, which may form an insoluble product by salt formation with such as polymer decomposition product possibly containing an organic acid group, are preferably small in quantity. An iron (Fe) component is preferably not more than 1 ppm. A calcium (Ca) component is easily form a coordination compound, that is a complex, with a acid component such as carboxylic acid and sulfonic acid as well as with many ligands, to form many insoluble scum (insoluble sediment, muddiness) derived from calcium.

A calcium (Ca) component is not more than 60 ppm and preferably 0-30 ppm. A magnesium (Mg) component is preferably 0-70 ppm and specifically preferably 0-20 ppm, since an excess amount thereof also generates an insoluble product. Metal components such as a content of iron (Fe), calcium (Ca) and magnesium (Mg) can be analyzed by use of an ICP-AES (an induction coupling plasma emission spectrophotometer) after completely dried cellulose ester is subjected to pretreatment by a micro-digest wet decomposition apparatus (sulfuric nitric acid decomposition) and alkali fusion.

(Plasticizer)

Polarizing plate protective film of this invention can be appropriately incorporated with a plasticizer to achieve the effects of this invention. A plasticizer is not specifically limited, however, is preferably selected from such as a polycarboxylic ester type plasticizer, a glycolate type plasticizer, a phthalic ester type plasticizer, a fatty acid ester type plasticizer, a polyhydric alcohol ester type plasticizer, a polyester type plasticizer and an acryl type plasticizer. When not less than two types among them are utilized, at least one type is preferably a polyhydric alcohol ester type plasticizer.

Polyhydric alcohol ester type plasticizer is a compound represented by aforesaid Formula (3).

A glycolate type plasticizer is not specifically limited, however, alkylphthalylalkyl glycolates are preferably utilized. Alkylphthalylalkyl glycolates include such as methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalate ester type plasticizer includes such as diethyl phthalate, dimethoxyethyl phthalate, dimethyl phthalate, dibutyl phthalate, di-2-ethylhexyl phthalate, dioctyl phthalate, dicyclohexyl phthalate and dicyclohexyl terephthalate.

A citric ester type plasticizer includes such as acetyltrimethyl citrate, acetyltriethyl citrate and acetyltributyl citrate.

A fatty acid ester type plasticizer includes such as butyl oleate, methylacetyl ricinoleate and dibutyl sebacate.

A phosphoric ester type plasticizer includes such as triphenyl phosphate, tricresyl phosphate, cresyldiphenyl phosphate, octyldiphenyl phosphate, diphenylbiphenyl phosphate, trioctyl phosphate and tributyl phosphate.

Polycarboxylic ester compound is comprised of ester of polycarboxylic acid of not less than 2 valences, preferably of 2-20 valences, and alcohol. Further, aliphatic polycarboxylic acid is preferably of 2-20 valences. In the case of aromatic polycarboxylic acid and alicyclic polycarboxylic acid, 3-20 valences are preferable.

Polycarboxylic acid is represented by following Formula (21).

$$R_2(COOH)_m(OH)_n \qquad \text{Formula (21)}$$

(wherein, $R_2$ is an (m+n) valent organic group; m is an integer of not less than 2; n is an integer of not less than 0; COOH group is a carboxyl group; and OH group is an alcoholic or phenolic hydroxyl group.)

Examples of preferable polycarboxylic acid include the following, however, this invention is not limited thereto. Aromatic polycarboxylic acid of not less than 3 valences such as trimellitic acid, trimesic acid and pyromellitic acid, and derivatives thereof; aliphatic polycarboxylic acid such as succinic acid, adipic acid, azelaic acid, sebasic acid, oxalic acid, fumaric acid, maleic acid and tetrahydrophthalic acid; oxypolycarboxylic acid such as tartaric acid, tartronic acid, malic acid and oxalic acid; can be preferably utilized. It is specifically preferable to utilize oxypolycarboxylic acid with respect to such as improvement of reservability.

Alcohol utilized in a polycarboxylic ester compound, which can be utilized in this invention, is not specifically limited and alcohols and phenols well known in the art can be utilized. For example, straight chain or branched aliphatic saturated alcohol or aliphatic unsaturated alcohol, having a carbon number of 1-32, can be preferably utilized. The carbon number is more preferably 1-20 and specifically preferably 1-10. Further, such as alicyclic alcohol such as cyclopentanol and cyclohexanol or derivatives thereof, and aromatic alcohol such as benzyl alcohol and cinnamyl alcohol or derivatives thereof can be also preferably utilized.

When oxypolycarboxylic acid as polyvalent carboxylic acid is utilized, an alcoholic or phenolic hydroxyl group of polycarboxylic acid may be esterified by use of monocarboxylic acid. Preferable monocarboxylic acid includes the following; however, this invention is not limited thereto.

As aliphatic monocarboxylic acid, straight chain or branched fatty acid having a carbon number of 1-32 is preferably utilized. The carbon number is more preferably 1-20 and specifically preferably 1-10.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid.

Examples of preferable alicyclic monocarboxylic acid include cyclopentane carboxylic acid, cyclohexane carboxylic acid and cyclooctane carboxylic acid; or derivatives thereof.

Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthaline carboxylic acid and tetraline carboxylic acid, or derivatives thereof. Acetic acid, propionic acid and benzoic acid are specifically preferable.

The molecular weight of a monocarboxylic ester compound is not specifically limited, however, is preferably in a range of 300-1,000 and more preferably in a range of 350-750. The molecular weight is preferably the larger with respect to reservability, while it is preferably smaller with respect to moisture permeability and compatibility with cellulose ester.

Alcohols, which is utilized in polycarboxylic ester applicable in this invention, may be either one type or a mixture of at least two types.

An acid value of a polycarboxylic ester compound utilizable in this invention is preferably not more than 1 mg KOH/g and more preferably not more than 0.2 mg KOH/g. By setting the acid value within the above-described range, variation of retardation due to environment is preferably suppressed.

(Acid Value)

An acid value refers to a milligram value of potassium hydroxide required to neutralize acid contained in 1 g of a sample (carboxyl groups existing in a sample). An acid value is measured based on JIS K0070.

Specifically preferable examples of a polycarboxylic ester compound will be shown below, however, this invention is not limited thereto. For example, listed are triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate and tetrabutyl pyromellitate.

A polyester type plastisizer is not specifically limited, however, a polyester type plastisizer having an aromatic ring or a cycloalkyl ring in a molecule can be utilized. A polyester type plastisizer is not specifically limited, however, such as an aromatic terminal ester type plastisizer represented by following Formula (22) can be utilized.

$$B\text{-}(G\text{-}A)_n\text{-}G\text{-}B \qquad \text{Formula (22)}$$

(wherein, B is a benzene monocarboxylic acid residual group; G is an alkylene glycol residual group having a carbon number of 2-12, an aryl glycol residual group having a carbon number of 6-12, or an oxyalkylene glycol residual group having a carbon number of 4-12; A is an alkylene dicarboxylic acid residual group having a carbon number of 4-12 or an aryl dicarboxylic acid residual group having a carbon number of 6-12; and n is an integer of not less than 1.)

A compound represented by Formula (22) is comprised of benzene monocarboxylic acid residual group represented by B, an alkylene glycol residual group, an oxyalkylene glycol residual group or an arylglycol residual group represented by G, and an alkylen dicarboxylic acid residual group or an aryl dicarboxylic acid residual group represented by A; and can be prepared by a reaction similar to that of a general polyester type plastisizer.

A benzene monocarboxylic acid component of polyester type plastisizer utilized in this invention includes such as benzoic acid, p-tertiary-butylbenzoic acid, ortho-toluic acid, metha-toluic acid, para-toluic acid, dimethylbenzoic acid, ethylbenzoic acid, n-propylbenzoic acid, aminobenzoic acid and acetoxybenzoic acid, and these each may be utilized alone or as a mixture of not less than two types.

An alkylene glycol component having a carbon number of 2-12, which can be utilized in this invention, includes such as ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol; and these glycols are utilized alone or as a mixture of at least two types. An alkylene glycol having a carbon number of 2-12 is specifically preferable because of excellent compatibility with cellulose ester.

Further, an oxyalkylene glycol component, having a carbon number of 4-12, of the above-described aromatic terminal ester includes such as diethylene glycol, triethylene glycol, tetraethylene glycol, dipropylene glycol and tripropylene glycol; and these glycols can be utilized alone or as a mixture of at least two types.

An alkylene dicarboxylic acid component, having a carbon number of 4-12, of aromatic terminal ester includes such as maleic acid, fumaric acid, glutaric acid, adipic acid, azereic acid, cebasic acid and dodecane dicarboxylic acid; and these may be utilized alone or as a mixture of not less than two types. An arylene dicarboylic acid component having a carbon number of 6-12 is phythalic acid, terephthalic acid, isophthalic acid, 1,5-naphthalene dicarboxylic acid and 1,4-naphthalene dicarboxylic acid.

A polyester type plastisizer utilized in this invention preferably has a number average molecular weight in a range of 300-1,500 and more preferably of 400-1,000. Further, an acid value thereof is not more than 0.5 mg KOH/g and a hydroxyl group value of not more than 25 mg KOH/g; and more preferably the acid value is not more than 0.3 mg KOH/g and the hydroxyl group value of not more than 15 mg KOH/g.

In the following, synthesis examples of an aromatic terminal ester type plastisizer utilizable in this invention will be shown.

<Sample No. 1 (Aromatic Terminal Ester Sample)>

Phthalic acid of 410 parts, 610 parts of benzoic acid, 737 parts of dipropylene glycol and 0.40 parts of tetraisopropyl titanate as a catalyst were charged together in a reaction vessel which was attached with a reflux condenser, and the system was kept heated at 130-250° C. to continuously remove the generated water while excess monohydric alcohol was refluxed with stirring in nitrogen gas flow. Next, the distillate was removed at 200-230° C. under a reduced pressure of not higher than $1.33 \times 10^4$ Pa and finally of not higher than $4 \times 10^2$ Pa, followed by being filtered to prepare an aromatic terminal ester type plastisizer having the following characteristics.

Viscosity (25° C., mPa·s); 43,400

Acid value; 0.2

<Sample No. 2 (Aromatic Terminal Ester Sample)>

An aromatic terminal ester type plastisizer having the following characteristics was prepared in an exactly similar manner to sample No. 1, except that phthalic acid of 410 parts, 610 parts of benzoic acid, 341 parts of ethylene glycol and 0.35 parts of tetraisopropyl titanate as a catalyst were utilized.

Viscosity (25° C., mPa·s); 31,000

Acid value; 0.1

<Sample No. 3 (Aromatic Terminal Ester Sample)>

An aromatic terminal ester type plastisizer having the following characteristics was prepared in an exactly similar manner to sample No. 1, except that phthalic acid of 410 parts, 610 parts of benzoic acid, 418 parts of 1,2-propanediol and 0.35 parts of tetraisopropyl titanate as a catalyst were utilized.

Viscosity (25° C., mPa·s); 38,000

Acid value; 0.05

<Sample No. 4 (Aromatic Terminal Ester Sample)>

An aromatic terminal ester type plastisizer having the following characteristics was prepared in an exactly similar manner to sample No. 1, except that phthalic acid of 410 parts, 610 parts of benzoic acid, 418 parts of 1,3-propanediol and 0.35 parts of tetraisopropyl titanate as a catalyst were utilized.

Viscosity (25° C., mPa·s); 37,000

Acid value; 0.05

In the following, specific examples of an aromatic terminal ester type plastisizer utilizable in this invention will be shown; however, this invention is not limited thereto.

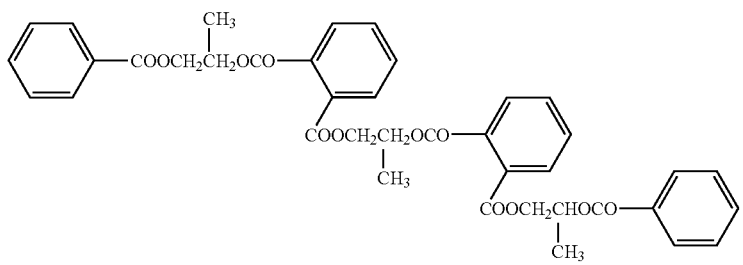
(1)
Mw: 696
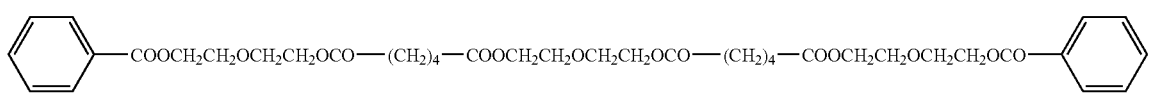
(2)
Mw: 746
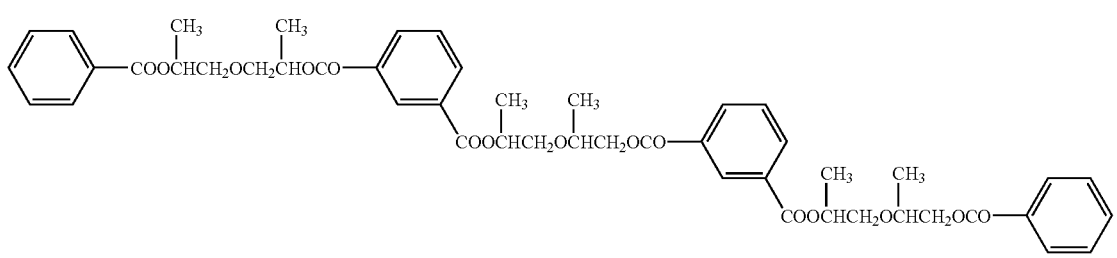
(3)
Mw: 830
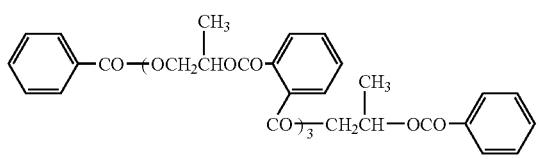
(4)
Mw: 886
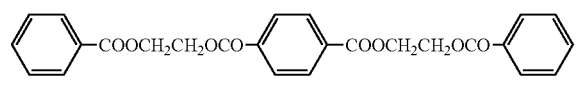
(5)
Mw: 462
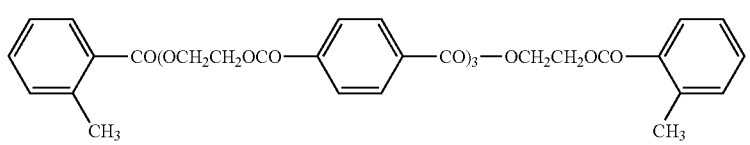
(6)
Mw: 874
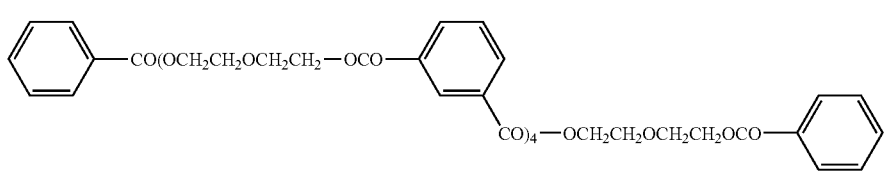
(7)
Mw: 1258
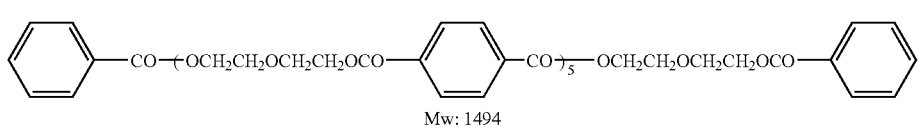
(8)
Mw: 1494
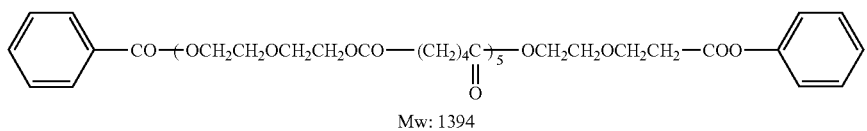
(9)
Mw: 1394

-continued

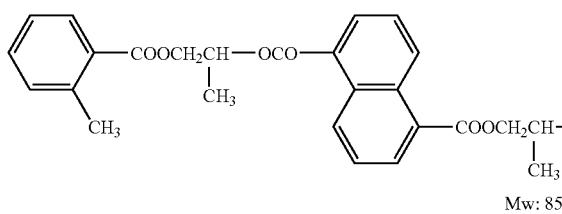
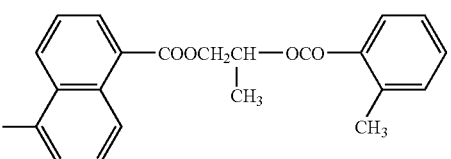

(10)

Mw: 852

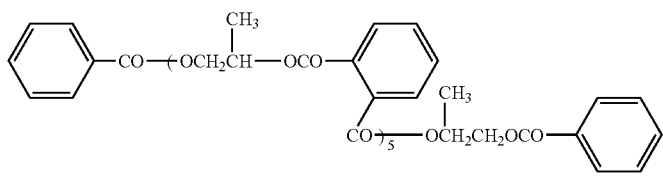

(11)

Mw: 1314

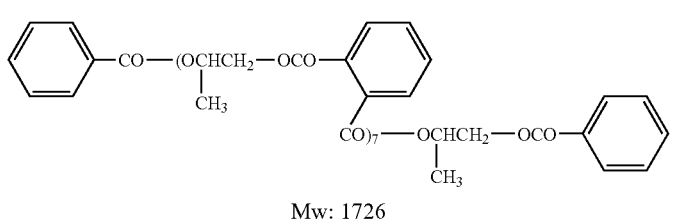

(12)

Mw: 1726

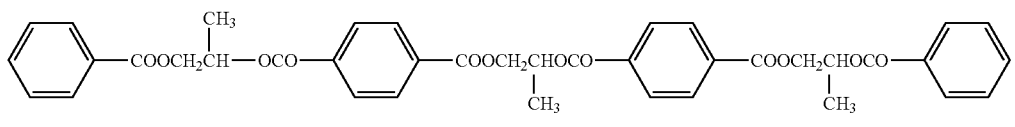

(13)

Mw: 696

(Ultraviolet Absorbent)

Protective film according to this invention can also incorporate an ultraviolet absorbent. An ultraviolet absorbent has an object to improve durability by absorbing ultraviolet rays of not longer than 400 nm, and in particular, transmittance at a wavelength of 370 nm is preferably not more than 10%, more preferably not more than 5% and still more preferably not more than 2%.

An ultraviolet absorbent utilized in this invention is not specifically limited, however, includes such as an oxybenzophenone type compound, a benzotriazole type compound, a salicylic ester type compound, a benzophenone type compound, a cyano acrylate type compound, a triazine type compound, a nickel complex type compound and inorganic powder.

For example listed are 5-chloro-2-(3,5-di-sec-butyl-2-hydroxylphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxybenzophenone; and also listed and preferably utilized are Tinuvins, such as Tinuvin 109, Tinuvin 171, Tinuvin 234, Tinuvin 326, Tinuvin 327 and Tinuvin 328, which are available on the market from Ciba Specialty Chemicals.

Ultraviolet absorbents utilized in this invention are preferably a benzotriazole type ultraviolet absorbent, a benzophenone type ultraviolet absorbent and a triazine type ultraviolet absorbent, and specifically preferably a benzotriazole type ultraviolet absorbent and a benzophenone type ultraviolet absorbent.

For example, as a benzotriazole type ultraviolet absorbent, a compound represented by following Formula (b) can be utilized.

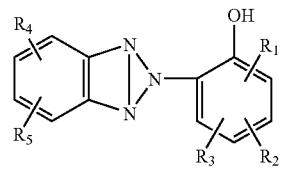

Formula (b)

In the formula, $R_1$, $R_2$, $R_3$, $R_4$ and $R_5$, which may be same or different, are a hydrogen atom, a halogen atom, a nitro group, a hydroxyl group, an alkyl group, an alkenyl group, an aryl group, an alkoxy group, an acyloxy group, an aryloxy group, an alkyltho group, an arylthio group, mono- or di-alkylamino group, an acylamino group or a 5-6 member heterocyclic group; and $R_4$ and $R_5$ may perform ring closure to form a 5-6 member carbon ring.

Further, these groups described above may be provided with a substituent.

In the following, specific examples of a benzotriazole type ultraviolet absorbent utilized in this invention will be listed; however, this invention is not limited thereto.

UV-1: 2-(2'-hydroxy-5'-methylphenyl)benzotriazole

UV-2: 2-(2'-hydroxy-3',5'-di-tert-butylphenyl)benzotriazole

UV-3: 2-(2'-hydroxy-3'-tert-5'-methylphenyl)benzotriazole

UV-4: 2-(2'-hydroxy-3',5'-di-tert-butylphenyl)chlorobenzotriazole

UV-5: 2-(2'-hydroxy-3'-(3",4",5",6"-tetrahydrophthalimidomethyl)-5'-methylphenyl)benzotriazole UV-6: 2,2-methylenebis-(4-(1,1,3,3-tetramethylbutyl)-6-(2H-benzotriazole-2-yl)phenol)

UV-7: 2-(2'-hydroxy-3'-di-tert-butyl-5'-methylphenyl)-5-chlorobenzotriazole

UV-8: 2-(2H-benzotriazole-2-yl)-6-(straight chain and branched dodecyl)-4-methylphenol (Tinuvin 171)

UV-9: A mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate (Tinuvin 109)

Further, a compound represented by following Formula (c) is preferably utilized as a benzophenone type ultraviolet absorbent.

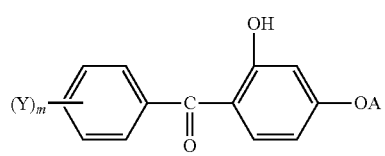

Formula (c)

In the formula, Y is a hydrogen atom, a halogen atom, an alkenyl group, an alkoxy group and a phenyl group; and these alkenyl group, alkenyl group and phenyl group may be provided with a substituent. A is a hydrogen atom, an alkyl group, an alkenyl group, a phenyl group, a cycloalkyl group, an alkylcarbonyl group, an alkylsulfonyl group or —CO(NH)$_{n-1}$-D group; and D is an alkyl group, an alkenyl group or a phenyl group which may be provided with a substituent. m and n are 1 or 2.

In the above description, an alkyl group is, for example, a straight chain or branched aliphatic group having a carbon number of up to 24; an alkoxy group is, for example, an alkoxy group having a carbon number of up to 18; and an alkenyl group is, for example, an alkenyl group having a carbon number of up to 16 such as an allyl group and a 2-butenyl group. Further, a substituent to an alkyl group, an alkenyl group and a phenyl group includes such as a halogen atom (such as a chlorine atom, a bromine atom and a fluorine atom), a hydroxyl group and a phenyl group (this phenyl group may be substituted by such as an alkyl group or a halogen atom).

In the following, specific examples of a benzophenone type ultraviolet absorbent represented by Formula (c), however, this invention is not limited thereto.

UV-10: 2,4-dihydroxybenzophenone
UV-11: 2,2'-dihydroxy-4-methoxybenzophenone
UV-12: 2-hydroxy-4-methoxy-5-sulfobenzophenone
UV-13: bis(2-methoxy-4-hydroxy-5-benzoylphenyl-methane)

In addition to these, a disc form compound such as a compound having a 1,3,5-triazine ring is preferably utilized.

Polarizing plate protective film according to this invention preferably contains more than two types of ultraviolet absorbents.

Further, a polymer ultraviolet absorbent may also be preferably utilized as an ultraviolet absorbent, and polymer type ultraviolet absorbents described in JP-A 6-148430 are specifically preferably utilized.

As an addition method of an ultraviolet absorbent, an ultraviolet absorbent may be added into a dope after having been dissolved in an organic solvent such as alcohol like methanol, ethanol and butanol, methylenechloride, methyl acetate, acetone and dioxane; or may be directly added into a dope composition. Those insoluble in an organic solvent, such as inorganic powder, will be added into a dope after having been dispersed in an organic solvent and cellulose ester by use of such as a dissolver or a sand mill.

The using amount of an ultraviolet absorbent is not uniform depending on a type and a using condition of an ultraviolet absorbent, however, in the case of the dry layer thickness of polarizing plate protective film of 30-200 μm, it is preferably 0.5-10 weight % and more preferably 0.6-4 weight %, against polarizing plate protective film.

(Micro-Particles)

Polarizing plate protective film according to this invention preferably contains micro-particles.

As inorganic micro-particles utilized in this invention, examples of an inorganic compound include silicon dioxide, titanium dioxide, aluminum oxide, zirconium oxide, calcium carbonate, talc, clay, burned kaolin, burned calcium silicate, hydrated calcium silicate, aluminum silicate, magnesium silicate and calcium phosphate. Micro-particles are preferably those containing silicon because turbidity is decreased and silicon dioxide is specifically preferred.

The mean particle size of a primary particle of micro-particles is preferably 5-400 nm and more preferably 10-300 nm. These may be contained as secondary aggregate having a particle size of 0.05-0.3 μm, or may be contained as primary particles without aggregation in the case of particles having an average particle size of 100-400 nm. The content of these micro-particles in polarizing plate protective film is preferably 0.01-1 weight % and specifically preferably 0.05-0.5 weight %. In the case of a polarizing plate protective film comprising a constitution of plural layers by a co-casting method, micro-particles of this addition amount are preferably incorporated in the surface.

As micro-particles of silicon dioxide, for example, products under the names of Aerosil R972, R972V, R974, R812, 200, 200V, 300, R202, OX50 and TT600 (produced by Nippon Aerosil Co., Ltd.) are available on the market and can be utilized.

As micro-particles of zirconium oxide, for example, products under the names of Aerosil R976 and R811 (produced by Nippon Aerosil Co., Ltd.) are available on the market and can be utilized.

Examples of polymer include silicone resin, fluorine-containing resin and acrylic resin. Silicone resin is preferred and those, having a three dimensional net structure, are specifically preferable; for example, products under the name of Tospearl 103, 105, 108, 120, 145, 3120 and 240 (produced by Toshiba Silicones Co., Ltd.) are available on the market and can be utilized.

Among these, Aerosil 200V and Aerosil R972 are specifically preferably utilized because of a large effect to decrease a friction coefficient while keeping turbidity of polarizing plate protective film to be low. In polarizing plate protective film utilized in this invention, a dynamic friction coefficient of at least one of the surfaces is preferably 0.2-1.0.

(Dye)

Polarizing plate protective film of this invention can incorporate dye for tint adjustment. For example, blue dye may be incorporated to restrain yellow tint of film. Preferable dye includes anthraquinone type dye.

Anthraquinone dye may be provided with an arbitrary substituent at any position from 1-position to 8-position of anthraquinone. A preferable substituent includes an aniline group, a hydroxyl group, an amino group, a nitro group or a hydrogen atom. In particular, blue dye and specifically anthraquinone type dye described in JP-A 2001-154017 are preferably incorporated.

Various types of additives may be batch-wise added into a dope as a cellulose ester containing solution before casting, or may be inline-wise added by preparing a solution of dissolved additives. In particular, a part of or the total amount of microparticles are preferably added by an inline method to reduce a load on a filter medium.

In the case of addition of an additive solution is performed by an inline method, it is preferable to dissolve a small amount of cellulose ester in the solution to increase compatibility with a dope. The preferable amount of cellulose ester is 1-10 weight parts and more preferably 3-5 weight parts against 100 parts of a solvent.

To perform inline addition and mixing in this invention, for example, an inline mixer such as Static Mixer (manufactured by Toray Engineering Corp.) and SWJ (Toray Static Inline Mixer, Hi-MIxer) is preferably utilized.

(Manufacturing of Polarizing Plate Protective Film)

Next, polarizing plate protective film of this invention will be explained.

As polarizing plate protective film according to this invention, either of film manufactured by a solution casting method or film manufactured by a melt casting method can be preferably utilized.

Manufacturing of polarizing plate protective film of this invention is performed by a process to dissolve cellulose ester and additives in a solvent to prepare a dope, a process to cast the dope on an infinitely transferring endless metal support, a process to dry the cast dope to make a web, a process to peel off the web from a metal support, a process to stretch the web or to hold the width, a process to further dry the web, and a process to wind up the finished film.

A process to prepare a dope will be now described. The concentration of cellulose in a dope is preferably the higher with respect to decreasing a drying load after the dope has been cast on a metal support, while, when the concentration of cellulose ester is excessively high, filtering precision will be deteriorated due to an increased load at the time of filtering. The concentration to balance these is preferably 10-35 weight % and more preferably 15-25 weight %.

A solvent utilized in a dope of this invention, one type alone or at least two types in combination may be utilized, however, a good solvent and a poor solvent of cellulose ester are preferably utilized in combination with respect to manufacturing efficiency. A preferable range of a mixing ratio of a good solvent to a poor solvent is 70-98 weight % of good solvent to 2-30 weight % of a poor solvent. As a good solvent and a poor solvent, one dissolves cellulose ester, which is utilized, by itself alone is defined as a good solvent and one swells or can not dissolve cellulose ester is defined as a poor solvent. Therefore, a good solvent and a poor solvent may differ depending on an average acetylation degree (an acetyl substitution degree), and for example, when acetone is utilized as a solvent, it becomes a good solvent for acetic ester of cellulose ester (an acetyl substitution degree of 2.4) and cellulose acetate propionate, while it becomes a poor solvent for acetic ester of cellulose (an acetyl substitution degree of 2.8) of cellulose.

A good solvent utilized in this invention is not specifically limited, however, includes an organic halogen compound such as methylene chloride, dioxoranes, acetone, methylacetate and methyl acetoacetate. Methylene chloride and methyl acetate are specifically preferable.

Further, a poor solvent utilized in this invention is not specifically limited, however, such as methanol, ethanol, n-butanol, cyclohexane and cyclohexanone are preferably utilized. Further, a dope is preferably contains 0.01-2 weight % of water. Further, as a solvent utilized for dissolution of cellulose ester, a solvent removed from film by drying in a film casting process is recovered and reused. In a recovered solvent, a trace amount of additives such as a plastisizer, an ultraviolet absorbent, polymer or monomer components may be contained, however, the solvent may be utilized even containing them or may be utilized appropriately after purification.

As a dissolution method of cellulose ester at the time of preparation of the dope described above, a general method can be employed. By combination of heating and increased pressure, it is possible to heat up to higher than a boiling point at an ordinary pressure. It is preferable because generation of a granular insoluble residue, which is called as gel or flocculates, is inhibited, when cellulose ester is dissolved with stirring while being heated at a temperature in a range of not lower than a boiling point under ordinary pressure and not to boil the solvent under increased pressure. Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside and, for example, a jacket type equipment is preferable with respect to easy temperature control.

Heating temperature with addition of a solvent is preferably the higher in view of solubility of cellulose ester, however, productivity may be deteriorated due to increase of a required pressure when the heating temperature is excessively high. The heating temperature is preferably 45-120° C., more preferably 60-110° C. and still more preferably 70-105° C. Further, pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small. Therefore, the absolute filtering precision of a filter medium is preferably not larger than 0.008 mm, more preferably 0.001-0.008 mm and furthermore preferably 0.003-0.006 mm.

The material of a filter medium is not specifically limited and an ordinary filter medium can be utilized, however, a filter medium made of plastic such as polypropylene and Teflon (a registered trade mark) and a filter medium made of metal such as stainless steel are preferable because of such as no release of fiber of a filter medium. It is preferable to eliminate and reduce particularly impurities and foreign materials causing a bright spot defect having been contained in cellulose ester as a raw material by filtration.

Foreign materials causing bright spot defects means a spot (a foreign material) which is visible due to light leak, when two sheets of polarizing plates, between which polarizing plate protective film is placed, are arranged in a crossed nicols state, and light is irradiated from one of the polarizing plate side to be observed from the other polarizing plate side. The number of bright spots having a diameter of not less than 0.01 mm is preferably not more than 200 spots/cm$^2$, more preferably not more than 100 spots/not more than 200 spots/cm$^2$, furthermore preferably not more than 50 spots/cm$^2$ and most preferably 0-10 sport/cm². Further, the number of a bright spot defect of not larger than 0.01 mm is also preferably the smaller.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures before and after filtering (referred to as a pressure difference). The preferable temperature is 45-120° C., more preferably 45-70° C. and furthermore preferably 45-55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is mirror finished, is utilized. The cast width can be set to 1-4 m. The surface temperature of a metal support in a cast process is from −50° C. to lower than a boiling point of a solvent and it is preferable the temperature is the higher since web drying speed is fast; however, excessively high temperature may sometimes cause foaming of a web or deterioration of flatness. The support temperature is preferably 0-40° C. and more preferably 5-30° C. It is also a preferable method to make a web gelled by cooling and to peel off the web from a drum with a plenty of residual solvent contained. A method to control the temperature of a metal support is not specifically limited, however, there are a method to blow a hot wind or a cold wind on the web and a method to make hot water contact the rear side of a metal plate. A method to utilize hot water is preferable because time required to make a metal support become a constant temperature is short due to more efficient heat transfer by use of a hot water. In the case of employing a hot wind, a wind of a temperature higher than the aimed temperature may be employed.

To provide a good flatness of polarizing plate protective film, the residual solvent amount at the time of peeling off a web from a metal support is preferably 10-150 weight %, more preferably 20-40 weight % or 60-130 weight % and specifically preferably 20-30 weight % or 70-120 weight %.

In this invention, a residual solvent amount is defined by the following equation.

Residual solvent amount (weight %)={(M−N)/N}×100

Herein, M is a weight of a sample picked at an arbitrary time during or after manufacturing of a web or film and N is a weight after heating at 115° C. for 1 hour.

Further, in a drying process of polarizing plate protective film, a web is preferably peeled off from a metal support and further dried to make a residual solvent amount of not more than 1 weight %, more preferably not more than 0.1 weight % and specifically preferably 0-0.01 weight %.

In a film drying process, a roll drying method (in which a web is dried while being alternately passed through many rolls which are arranged up and down) or a method to dry a web while being transported by a tenter method will be applied.

To prepare polarizing plate protective film of this invention, it is specifically preferable that a web is stretched along the transport direction (the longitudinal direction) immediately after having been peeled off from a metal support with a large amount of a residual solvent and is further stretched in the width direction by means of a tenter method to grip the both edges of the web by such as clips.

To perform longitudinal stretch immediately after peel off, it is preferable to peel off at a peel-off tension of not less than 210 N/m and specifically preferably at 220-300 N/m.

A means to dry a web is not specifically limited, and it can be generally performed by such as a hot wind, ultraviolet rays, a heat roll and microwaves, however, preferably performed by a hot wind with respect to convenience.

Drying temperature in a drying process of a web is preferably 40-200° C. and stepwise raised and more preferably in a range of 50-140° C. to improve dimension stability.

The layer thickness of polarizing plate protective film is not specifically limited; however, a layer thickness of 10-200 μm is applied. The layer thickness is specifically preferably 10-100 μm and furthermore preferably 20-60 μm.

Polarizing plate protective film of this invention has a width of 1-4 m. The width is preferably 1.4-4 m and specifically preferably 1.6-3 m. When the width exceeds 4 m, the transportation becomes difficult.

(Stretching Operation, Refractive Index Control)

Polarizing plate protective film of this invention is characterized in that retardation values Ro and Rt, which are represented by the following equations, are 0-10 nm and −30-+20 nm, respectively.

$$Ro = (nx - ny) \times d \qquad \text{Equation (i)}$$

$$Rt = [(nx + ny)/2 - nz] \times d \qquad \text{Equation (ii)}$$

(In the formula, Ro is a retardation value in the film plane; Rt is a retardation value in the film thickness direction; nx is a refractive index in slow axis in the film plane; ny is a refractive index in fast axis in the film plane; nz is a refractive index of in the film thickness direction; and d is film thickness (nm).)

The above-described refractive index can be determined by use of, for example, KOBRA-21ADH (manufactured by Oji Instrument Co., Ltd.) at a wavelength of 590 nm under an environment of 23° C. and 55% RH.

Further, it is more preferable that retardation value Ro is in a range of 0-5 nm and Rt is in a range of −10-10 nm, with respect to increasing the targeted effects of this invention.

To achieve retardation values Ro and Rt which are described above, it is preferable that polarizing plate protective film employs a constitution of this invention and refractive index control is further performed by a stretching operation.

For example, it is possible to perform successive or simultaneous stretching in the longitudinal direction of film (the cast direction) and in the direction perpendicular thereto, that is, in the width direction.

The stretching magnifications in the biaxial directions perpendicular to each other are preferably set to finally 1.0-2.0 times in the cast direction and 1.01-2.5 times in the width direction, and more preferably set to 1.01-1.5 times in the cast direction and 1.05-2.0 times in the width direction.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to stretch by widening similarly along the width direction, or a method to stretch in the both of longitudinal and width directions by simultaneously widening along the longitudinal and width directions. Of cause, these methods can be utilized in combination. In a so-called tenter method, it is preferable that a smooth stretching can be performed by driving the clip portion by a linear drive method which reduces risk to such as break.

It is preferable to perform the width holding or stretching in the width direction by a tenter, which may be either a pin tenter or a clip tenter.

The slow axis or the fast axis of polarizing plate protective film of this invention preferably is present in a film plane and θ1 is preferably not less than −1° and not more than +1°, and more preferably not less than −0.5° and not more than +0.5°, when the angle against the casting direction is θ1. This θ1 can be defined as an orientation angle, and measurement of θ1 can be performed by use of automatic double refractometer KOBRA-21ADH (Oji Scientific Instruments). To satisfy the above-described relationships by θ1 can contributes to obtain a high luminance and to restrain or prevent light leak, and to obtain faithful color reproduction in a color liquid display (Physical Properties)

Moisture permeability of polarizing plate protective film according to this invention is preferably 10-1,200 g/m²·24 h, more preferably 20-1,000 g/m²·24 h and specifically preferably 20-850 g/m²·24 h at 40° C., 90% RH. Moisture permeability can be measured according to a method described in JIS Z 0208.

Elongation percentage of the polarizing plate protective film according to this invention is preferably 10-80% and more preferably 20-50%.

Visible light transmittance of polarizing plate protective film according to this invention is preferably not less than 90% and more preferably not less than 93%.

Haze of polarizing plate protective film according to this invention is preferably less than 1% and specifically preferably 0-0.1%.

(Polarizing Plate)

A polarizing plate of this invention and a liquid crystal display device utilizing the same will be now explained.

A polarizing plate of this invention is characterized by being a polarizing plate constituted of a polarizer, pasted with the aforesaid polarizing plate protective film of this invention on at least one surface. A liquid crystal display device of this invention is characterized in that a polarizing plate according to this invention is pasted up on at least one liquid crystal cell surface via an adhesive layer.

A polarizing plate of this invention can be prepared by an ordinary method. Polarizing plate protective film of this invention, the polarizer side of which is subjected to an alkaline saponification treatment, is preferably pasted up on at least one surface of a polarizer which has been prepared by immersion stretching in an iodine solution by use of a completely saponificated type polyvinyl alcohol aqueous solution. On the other surface, said polarizing plate protective film may be utilized or another polarizing plate protective film may be utilized. Cellulose ester film (such as Konicaminolta TAC KC8UX, KC4UX, KC5UX, KC8UY, KC4UY, KC12UR, KC8UCR-3, KC8UCR-4, KC8UCR-5, KC4FR-1, KC8UY-HA and KC8UX-RHA, manufactured by Konicaminolta Opto Co., Ltd.) available on the market is also preferably utilized. Against polarizing film of this invention, the polarizing plate protective film utilized on the opposite side of a polarizing plate via a liquid crystal cell is preferably provided with a phase difference of in-plane retardation Ro of 150-350 nm and Rt of −100-100 nm, which are measured at a wavelength of 590 nm. These can be prepared by a method described in such as JP-A 2005-196149 and JP-A 2005-275104. In addition to these, polarizing plate protective film having an optical anisotropic layer, which is formed by orientating an liquid crystal compound such as discotic liquid crystal, and functioning also as an optical compensation film can be also preferably utilized. For example, an optical anisotropic layer can be formed by a method described in JP-A 2005-275083. The above-described phase difference film, by utilizing in combination with polarizing plate protective film of this invention, can provide a liquid crystal display device having a stable effect of viewing angle enlargement.

A polarizer as a primary constitution element is an element to pass light of a polarized wave plane of a predetermined direction, and a typical polarizer known at present is polyvinyl type polarizing film, which includes polyvinyl alcohol film dyed with iodine and one dyed with dichroic dye. As a polarizer, utilized is one in which a polyvinyl alcohol aqueous solution is cast, and the cast film is uniaxially stretched and dyed, or is uniaxially stretched after having been dyed, preferably followed by being subjected to a durability treatment with a boron compound. The layer thickness of a polarizer is preferably 5-30 μm and specifically preferably 10-20 μm.

Further, ethylene modified polyvinyl alcohol which is described in such as JP-A 2003-248123 and JP-A 2003-342322 and has an ethylene unit content of 1-4 mol %, a polymerization degree of 2,000-4,000 and a saponification degree of 99.0-99.99 mol % is also preferably utilized. Among them, ethylene modified polyvinyl alcohol having a hot water breaking temperature of 66-73° C. is preferably utilized. Further, a difference of hot water breaking temperature between two points remote from each other by 5 cm in the film TD direction is preferably not more than 1° C. and more preferably not more than 0.5° C., with respect to decreasing color spottiness.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is pasted up, is utilized as a polarizing plate. An adhesive employed at the time of paste up includes a PVA type adhesive and an urethane type adhesive, however, among them preferably utilized is a PVA type adhesive.

(IPS Mode Type Liquid Crystal Display Device)

By assembling a polarizing plate of this invention into an IPS (In Plain Switching) mode type liquid crystal display device available on the market, a liquid crystal display device of this invention, which is excellent in visual recognition and has an enlarged viewing angle, can be prepared.

An IPS mode of this invention also includes a fringe-field switching (FFS) mode, in which a polarizing plate of this invention can be assembled similar to an IPS mode, and a liquid crystal display device of this invention having similar effects can be prepared.

In the case of arranging polarizing plate protective film of this invention in a liquid crystal display device, a visual recognition side polarizer and a backlight side polarizer are arranged on the both sides of a liquid crystal cell, and in this constitution, at least one sheet of polarizing plate protective film is preferably arranged in either one of the space between a liquid cell and a visual recognition side polarizer or between a liquid cell and a backlight side polarizer, so as to make the polarizing plate protective film become on the liquid crystal cell side.

EXAMPLES

In the following, this invention will be specifically explained referring to examples, however, this invention is not limited thereto.

Example 1

Synthesis of Acryl Polymer (Synthesis of AC1-AC7)

In a glass flask equipped with a stirrer, two dropping funnels, a gas introduction tube and a thermometer, 40 g of a monomer mixture solution of the type and ratio described in Table 1, 3.0 g of mercaptopropionic acid as a chain transfer agent and 30 g of toluene were charged and heated up to 90° C. Thereafter, simultaneously with titrating 60 g of a monomer mixture solution of the type and ratio described in Table 1 over 3 hours from one of the dropping funnels, 0.6 g of azobisisobutyronitrile dissolved in 14 g of toluene were titrated over 3 hours from the other dropping funnel. Thereafter, after further 0.6 g of azobisisobutyronitrile dissolved in 56 g of toluene were titrated over 2 hours and a reaction was continued for further 2 hours, whereby AC1 was prepared. Next, AC2-AC7 were prepared by performing similar synthesis in which an addition amount mercaptopropionic acid as a chain transfer agent was varied.

Weight average molecular weight of said AC1-AC7 was measured according to the following measurement method and was shown in Table 1.

MA, MMA, HEMA and HEA, which are described in Table 1, are abbreviations of the following compounds.

MA: Methyl acrylate
MMA: Methyl methacrylate
HEMA: 2-hydroxyethyl methacrylate
HEA: β-Hydroxyethyl acrylate (Measurement of Molecular Weight)

Weight average molecular weight was measured by use of high speed liquid chromatography.

The measurement conditions are as follows.

Solvent: Methylene chloride
Column: Shodex K806, K805 and K803G (3 columns, manufactured by Showa Denko Co., Ltd., were utilized in connection)
Column temperature: 25° C.
Sample concentration: 0.1 weight %
Detector: RI Model 504 (manufactured by GL Sience Corp.)
Pump: L6000 (manufactured by Hitachi Corp.)
Flow rate: 1.0 ml/min
Calibration curve: Utilized is a calibration curve based on 13 samples of standard polystyrene STK (manufactured by Toso Co., Ltd.) having Mw=1,000,000-500. 13 samples are utilized at approximately same intervals.

(Synthesis of AC7, AC8 and AC10)

Block polymerization was performed according to a polymerization method described in JP-A 2000-128911. That is, the following methyl acrylate as monomer was charged in a flask equipped with a stirrer, a nitrogen gas introducing tube, a thermometer, an addition inlet and a reflux condenser and the interior of the flask was replaced with a nitrogen gas by introducing a nitrogen gas. The following thioglycerol was added while stirring.

After addition of thioglycerol, polymerization was performed for 4 hours and the content was cooled to room temperature, which was added with 20 weight parts of a 5 weight % tetrahydrofuran solution of benzoquinone to stop polymerization. The content was transferred to an evaporator, and tetrahydrofuran, residual monomer and residual thioglycerol were removed under a reduced pressure at 80° C., whereby acryl polymer AC8, AC9 and AC10 were prepared.

TABLE 1

| Compound name | Xa | m | Xb | n | Xc | p | Mw |
|---|---|---|---|---|---|---|---|
| AC1 | MMA | 90 | HEA | 10 | — | 0 | 2,000 |
| AC2 | MMA | 90 | HEA | 10 | — | 0 | 5,000 |
| AC3 | MMA | 85 | HEA | 15 | — | 0 | 8,000 |
| AC4 | MMA | 85 | HEA | 15 | — | 0 | 12,000 |
| AC5 | MMA | 80 | HEMA | 20 | — | 0 | 8,000 |
| AC6 | MMA | 90 | HEMA | 10 | — | 0 | 8,000 |
| AC7 | MMA | 80 | HEA | 20 | — | 0 | 30,000 |

$-(X_a)_m-(X_b)_n-(X_c)_p-$

| Compound name | Ya | k | Yb | q | Mw |
|---|---|---|---|---|---|
| AC8 | MMA | 100 | — | 0 | 500 |
| AC9 | MMA | 100 | — | 0 | 1,000 |
| AC10 | MMA | 100 | — | 0 | 3,000 |

$-(Y_a)_k-(Y_b)_q-$

MA: Methyl acrylate
MMA: Methyl methacrylate
HEMA: 2-hydroxyethyl methacrylate
HEA: β-Hydroxyethyl acrylate $B_1 - (G-A-)_m G-B_1$

| Compound name | $B_1$ | G | A | Mw |
|---|---|---|---|---|
| E1 | $CH_3COO$ | $C_2H_4-O$ | $CO-C_2H_4-COO$ | 500 |
| E2 | $C_7H_{15}COO$ | $C_2H_4-O$ | $CO-C_2H_4-COO$ | 3,000 |
| E3 | $CH_3COO$ | $C_2H_4-O$ | $CO-C_2H_4-COO$ | 8,500 |
|  |  | $C_4H_8-O$ | $CO-C_4H_8-COO$ |  |
| E4 | $C_{11}H_{23}COO$ | $C_2H_4-O$ | $CO-C_2H_4-COO$ | 30,000 |
|  |  | $C_{12}H_{24}-O$ | $CO-C_{10}H_{20}-COO$ |  |

The above-described alkyl groups and alkylene groups are normal (n-).

$B_2-(A-G-)_n A-B_2$

| Compound name | $B_2$ | A | G | Mw |
|---|---|---|---|---|
| E5 | $C_2H_5O$ | $CO-C_2H_4-COO$ | $C_2H_4-O$ | 1,000 |
| E6 | $C_2H_5O$ | $CO-COO$ | $C_4H_8-O$ | 8,000 |
| E7 | $C_2H_5O$ | $CO-COO$ | $C_2H_4-O$ | 25,000 |

(Preparation of Polarizing Plate Protective Film)
(Silicon Dioxide Dispersion)

| | |
|---|---|
| Aerosil 972V (produced by Nippon Aerosil Co., Ltd.) (mean particle size of primary particles of 16 nm, apparent density of 90 g/L) | 12 weight parts |
| Ethanol | 88 weight parts |

The above composition, after having been stirred by a dissolver for 30 minutes, was homogenized by use of a Manton-Gaulin homogenizer. The resulting dispersion of silicon dioxide was added with 88 weight parts of methylene chloride while stirring, followed by being mixed with stirring for 30 minutes, whereby a dispersion of silicon dioxide was prepared.

(Preparation of Inline Addition Solution)

| | |
|---|---|
| Tinuvin 109 (produced by Ciba Specialty Chemicals) | 11 weight parts |
| Tinuvin 171 (produced by Ciba Specialty Chemicals) | 5 weight parts |
| Methylene chloride | 100 weight parts |

The above composition was charged in a sealed vessel and completely dissolved while being heated and stirred, followed by being filtered.

This was added with 36 weight parts of a diluted solution of silicon dioxide dispersion with stirring, being stirred further for 30 minutes, and then 6 weight parts of the following cellulose triacetate were added with stirring. The system, after having been stirred for further 60 minutes, was filtered through polypropylene wind cartridge filter TCW-PPS-1N produced by Advantch Toyo Co., Ltd., whereby an inline additive solution was prepared.

(Dope Composition)

| | |
|---|---|
| Cellulose triacetate (described as TAC in the Tables) (acetylation degree: 61.5%, Mn: 110,000, Mw/Mn = 2.0) | 100 weight parts |

Additive 1 (Saccharide Ester):

| | |
|---|---|
| Compound 1 (acetyl cellulose) | 15 weight parts |
| Methylene chloride | 430 weight parts |
| Ethanol | 40 weight parts |

The above composition was charged in a sealed vessel and completely dissolved while being heated and stirred, followed by being filtered through Azumi filter paper No. 24 produced by Azumi Filter Paper Co., Ltd., whereby a dope solution was prepared.

A dope solution was filtered by Finemet NF produced by Nippon Seisen Co., Ltd. in the casting line. An inline additive solution was filtered by Finemet NF produced by Nippon Seisen Co., Ltd. in an inline additive solution line. The filtered dope solution of 100 weight parts was added with 2 weight pats of an inline additive solution, followed by being sufficiently mixed with an inline mixer (Toray Static Type Inline Mixer, Hi-Mixer SWJ), and successively the resulting dope was uniformly cast on a stainless band support at 35° C. at a width of 1.8 m by use of a belt casting apparatus. A solvent was evaporated until the residual solvent amount reaches 120% on a stainless band support and the resulting web was peeled off from the stainless band support. The peeled off web of cellulose ester, after a solvent having been evaporated at 35° C. and was slit into 1.65 wide and then dried at a drying temperature of 135° C. while being stretched in the TD direction by 1.05 times by use of a tenter. Herein, the residual solvent amount at the start of stretching by a tenter was 30%.

Thereafter, drying of the web was finished while being transported by many rolls through drying zones of 110° C. and 120° C., and the resulting film was slit into 1.5 m wide and was provided with a knurling treatment having a width of 15 mm and a mean height of 10 μm on the both film edges, whereby polarizing plate protective film 1 having a mean layer thickness of 40 μm was prepared. The film width was set to 1.4 m and the winding length to 3,000 m. The winding tension was 150 N/1,300 mm as a initial tension and 100 N/1.4 m as a final tension.

(Preparation of Polarizing Plate Protective Film 2-39)

Polarizing plate protective film 2-39 were prepared in a similar manner to preparation of polarizing plate protective film 1, except that cellulose ester, types and addition amount of additive 1 (saccharide ester), additive 2, additive 3 and additive 4 were changed into compounds and the addition amount thereof as described in Tables 2 and 3 and the layer thickness is changed as described in Tables 2 and 3.

In the tables, abbreviations are as follows.

CAP: Cellulose acetate propionate (acetyl group substitution degree: 2.0, propionyl group substitution degree: 0.9, Mn: 80,000 Mw/Mn=2.5)

TPP: Tripheny phospate

EPEG: Etylphthalyl ethylglycolate

TMPB: Trimethylolpropane tribenzoate (polyhydric alcohol ester represented by Formula (3))

ATBC: Acetyltributyl citrate

A-10: Exemplary compound A-10 of a compound represented by Formula (1)

A-31: Exemplary compound A-31 of a compound represented by Formula (1)

PL-22: Exemplary compound PL-22 of a compound represented by Formula (14)

UV-201L: Exemplary compound UV-201 of a compound represented by Formula (20)

TABLE 2

| Polarizing plate protective film No. | Cellulose ester | **1 (sugar ester) | *1 | **2 | *1 | **3 | *1 | **4 | *1 | Layer thickness (μm) | Ro (nm) | Rt (nm) | Rt variation (nm) | Remarks |
|---|---|---|---|---|---|---|---|---|---|---|---|---|---|---|
| 1 | TAC | Compound 1 | 15 | — | — | — | — | — | — | 40 | 5 | 20 | B | Inv. |
| 2 | TAC | Compound 1 | 7 | AC1 | 8 | — | — | — | — | 40 | 1 | 5 | A | Inv. |
| 3 | TAC | Compound 1 | 7 | AC3 | 8 | — | — | — | — | 40 | 0 | 0 | A | Inv. |
| 4 | TAC | Compound 1 | 7 | AC4 | 8 | — | — | — | — | 40 | 0 | 2 | A | Inv. |
| 5 | TAC | Compound 1 | 7 | AC5 | 8 | — | — | — | — | 40 | 0 | −1 | A | Inv. |
| 6 | TAC | Compound 1 | 7 | AC6 | 8 | — | — | — | — | 40 | 1 | −5 | A | Inv. |
| 7 | TAC | Compound 1 | 7 | AC7 | 5 | — | — | — | — | 40 | 1 | 10 | A | Inv. |
| 8 | TAC | Compound 1 | 8 | — | — | E1 | 15 | — | — | 40 | 3 | −15 | B | Inv. |
| 9 | TAC | Compound 1 | 8 | — | — | E2 | 10 | — | — | 40 | 2 | −3 | A | Inv. |
| 10 | TAC | Compound 1 | 10 | — | — | E3 | 5 | — | — | 40 | 1 | 3 | A | Inv. |
| 11 | TAC | Compound 1 | 10 | — | — | E4 | 5 | — | — | 40 | 0 | 10 | A | Inv. |
| 12 | TAC | Compound 1 | 10 | — | — | E5 | 5 | — | — | 40 | 2 | 0 | B | Inv. |
| 13 | TAC | Compound 1 | 10 | — | — | E6 | 5 | — | — | 40 | 1 | 3 | A | Inv. |
| 14 | TAC | Compound 1 | 10 | — | — | E7 | 5 | — | — | 40 | 2 | 6 | A | Inv. |
| 15 | TAC | Compound 1 | 5 | AC3 | 5 | AC7 | 5 | — | — | 40 | 0 | −10 | A | Inv. |
| 16 | TAC | Compound 1 | 5 | AC3 | 5 | AC8 | 5 | — | — | 20 | 0 | 0 | A | Inv. |
| 17 | TAC | Compound 1 | 5 | AC3 | 5 | TMPB | 5 | — | — | 60 | 1 | 12 | B | Inv. |
| 18 | TAC | Compound 1 | 5 | AC6 | 5 | TMPB | 5 | — | — | 80 | 3 | 20 | B | Inv. |

TABLE 2-continued

| Polarizing plate protective film No. | Cellulose ester | **1 (sugar ester) | *1 | **2 | *1 | **3 | *1 | **4 | *1 | Layer thickness (μm) | Ro (nm) | Rt (nm) | Rt variation (nm) | Remarks |
|---|---|---|---|---|---|---|---|---|---|---|---|---|---|---|
| 19 | TAC | Compound 1 | 5 | AC3 | 5 | ATBC | 5 | — | — | 80 | 2 | 12 | B | Inv. |
| 20 | TAC | Compound 1 | 5 | AC6 | 5 | ATBC | 5 | — | — | 40 | 1 | 6 | A | Inv. |

*1: Addition amount (weight parts),
**Additive,
Inv.: Invention

TABLE 3

| Polarizing plate protective film No. | Cellulose ester | **1 (sugar ester) | *1 | **2 | *1 | **3 | *1 | **4 | *1 | Layer thickness (μm) | Ro (nm) | Rt (nm) | Rt variation (nm) | Remarks |
|---|---|---|---|---|---|---|---|---|---|---|---|---|---|---|
| 21 | TAC | Compound 1 | 5 | AC3 | 5 | E1 | 5 | A-11 | 5 | 40 | 2 | −5 | A | Inv. |
| 22 | TAC | Compound 1 | 5 | — | — | — | — | A-31 | 5 | 40 | 1 | 15 | B | Inv. |
| 23 | TAC | Compound 1 | 5 | AC3 | 5 | — | — | A-31 | 3 | 40 | 1 | 3 | A | Inv. |
| 24 | TAC | Compound 1 | 8 | AC6 | 5 | E5 | 3 | PL-22 | 5 | 40 | 2 | −6 | A | Inv. |
| 25 | TAC | Compound 3 | 8 | AC3 | 5 | E1 | 3 | — | — | 40 | 0 | 0 | A | Inv. |
| 26 | TAC | Compound 5 | 8 | AC9 | 8 | E2 | 5 | — | — | 40 | 1 | −30 | B | Inv. |
| 27 | TAC | Compound 7 | 8 | AC3 | 5 | E1 | 3 | TMPB | 3 | 40 | 1 | 5 | A | Inv. |
| 28 | TAC | Compound 9 | 8 | AC6 | 5 | E5 | 3 | TMPB | 3 | 40 | 1 | 7 | A | Inv. |
| 29 | TAC | Compound 10 | 8 | AC3 | 5 | E1 | 3 | UV-201 | 5 | 40 | 1 | 2 | A | Inv. |
| 30 | CAP | Compound 10 | 8 | AC3 | 5 | TMPB | 3 | — | — | 40 | 2 | −4 | A | Inv. |
| 31 | CAP | Compound 10 | 8 | AC6 | 5 | ATBC | 3 | — | — | 40 | 4 | 11 | B | Inv. |
| 32 | TAC | — | — | TPP | 8 | EPEG | 5 | — | — | 80 | 3 | 52 | D | Comp. |
| 33 | CAP | — | — | TMPB | 8 | EPEG | 5 | — | — | 40 | 5 | 40 | D | Comp. |
| 34 | TAC | — | — | AC3 | 10 | E3 | 10 | — | — | 40 | 2 | 25 | C | Comp. |
| 35 | TAC | — | — | AC3 | 15 | E3 | 10 | — | — | 80 | 1 | 15 | D | Comp. |
| 36 | TAC | Compound 1 | 5 | — | — | — | — | — | — | 80 | 1 | 60 | D | Comp. |
| 37 | TAC | Compound 1 | 5 | — | — | E1 | 10 | — | — | 60 | 10 | 15 | B | Inv. |
| 38 | TAC | Compound 1 | 7 | AC2 | 8 | — | — | — | — | 40 | 0 | 5 | A | Inv. |
| 39 | TAC | Compound 1 | 7 | AC10 | 8 | — | — | — | — | 40 | 1 | 8 | A | Inv. |

*1: Addition amount (weight parts),
**Additive,
Inv.: Invention,
Comp.: Comparison

[Evaluation]

With respect to above-described polarizing plate protective films 1-39, the following evaluations were performed.

(Measurement of Ro and Rt)

A mean refractive index of polarizing plate protective film was measured by use of an Abbe's refractometer (4T). Further, a layer thickness of film was measured by use of a micrometer available on the market.

Retardation at a wavelength of 590 nm was measured, with respect to film having been kept under an environment of 23° C. and 55% RH for 24 hours, by use of automatic double refractometer KOBRA-21ADH (manufactured by Oji Instruments Co., Ltd.) under the same environment. The above-described mean refractive index and layer thickness were input in the following equation to determine values of in-plain retardation (Ro) and retardation in the thickness direction (Rt).

$$Ro = (nx - ny) \times d \quad \text{Equation (i)}$$

$$Rt = ((nx + ny)/2 - nz) \times d \quad \text{Equation (ii)}$$

(wherein, Ro is a retardation value in the film plane; Rt is a retardation value in the thickness direction; nx is a refractive index in the slow axis direction in the film plane; ny is a refractive index in the fast axis direction in the film plane; nz is a refractive index in the film thickness direction; and d is a film thickness (nm)).

(Rt Stability)

With respect to prepared polarizing plate protective film, Rt was measured after having been treated at 23° C. and 20% RH for 10 hours, and successively Rt was measured after having been treated at 50° C. and 80% RH for 100 hours. ΔRt was determined by the following equation and evaluation was made based on the following criteria.

$$\Delta Rt(\text{nm}) = |Rt(23° \text{ C. and } 20\% \text{ RH}) - Rt(50° \text{ C. and } 80\% \text{ RH})|$$

A: ΔRt is less than 5 nm.
B: ΔRt is 5-less than 10 nm.
C: ΔRt is 10-less than 20 nm.
D: ΔRt is not less than 20 nm.

The above evaluation results are shown in Tables 2 and 3.

It is clear from Tables 2 and 3 that polarizing plate protective films 1-31 and 37-39, which are constitutions of this invention, have retardation value Ro in a range of 0-10 nm and Rt in a range of −30 to +20 nm, and are excellent in Rt variation.

(Preparation of Polarizing Plate)
(Preparation of Polarizer P1)

Etylene modified polyvinyl alcohol, which has an ethylene unit content of 2.1 mol %, a saponification degree of 99.92% and a polymerization degree of 3,000, of 100 weight parts was immersed with 10 weight parts of glycerin, into 200 weight parts of water, and the resulting composition, after having been melt-kneaded and defoamed, was melt-extruded on a metal roll from a T die and dried, whereby an ethylene modified polyvinyl alcohol film having a layer thickness of 40 μm was prepared.

The prepared ethylene modified polyvinyl alcohol film was continuously treated in the order of pre-swelling, dyeing, uniaxial stretching, fixing treatment, drying and heat treatments to prepare polarizer P1. That is, the aforesaid ethylene modified polyvinyl alcohol film was pre-swelled by being immersed in 30° C. water for 60 seconds, and was immersed in an aqueous solution of a boric acid concentration of 40 g/L, an iodine concentration of 0.4 g/L and potassium iodide concentration of 60 g/L at 35° C. for 2 minutes. Successively, uniaxial stretching at a function of 6 was performed in an aqueous solution of a boric acid concentration of 4%, and a fixing treatment was performed by being emmersed in an aqueous solution of a potassium iodide concentration of 60 g/L, a boric acid concentration of 40 g/L and a zinc chloride concentration of 10 g/L at 30° C. for 5 minutes. Thereafter, ethylene modified polyvinyl alcohol film was taken out to be dried by hot forced air under ordinary humidity at 40° C., and was further subjected to a heat treatment at 100° C. for 5 minutes.

Polarizer P1 prepared above exhibited a transmittance of 43% and a polarizing degree of 99.9%. The layer thickness was 15 μm.

(Preparation of Polarizing Plates 1-39)

The above-described polarizing plate protective films 1-39 were subjected to an alkaline treatment in a 2.3 mol/L sodium hydroxide aqueous solution at 40° C. and washed with water for 3 minutes, whereby the targeted alkaline treated films were prepared.

Next, polarizing plate protective films 1-39, which had been subjected to an alkaline treatment, were each pasted up on both surfaces of above-prepared polarizer P1 employing a 5% completely saponificated polyvinyl alcohol aqueous solution as an adhesive, to prepare polarizing plates 1-39.

(Preparation of Liquid Crystal Display Device)

By utilizing the above-described polarizing plates 1-39, a liquid crystal panel to be subjected to a viewing angle measurement was prepared in the following manner, whereby characteristics of the liquid crystal display devices were evaluated.

Only a single polarizing plate, which had been pasted up in advance onto the front side (the observer's side), of a Hitachi Liquid Crystal TV, model Wooo W17-LC50, was peeled off, and the above-prepared polarizing plates 1-39 were each pasted up onto the glass surface of a liquid crystal cell.

At that time, the direction of pasting of the polarizing plate was performed so as to make the absorption axis be in the same direction as the polarizing plate which had been prepared in advance, whereby liquid crystal display devices 1-39 were prepared.

Next, with respect to liquid crystal display devices 1-39, the following evaluations were performed.

The viewing angle measurement was performed using EZ-Contrast 160D manufactured by ELDIM Corp., under an environment of 23° C. and 55% RH. The viewing angle was determined by defining a region a contrast (the ratio of white display/black display) which was at least 20 as an effective viewing field. Successively, with respect to the above-described polarizing plate which had been treated at 60° C. and 90% RH for 500 hours, similar measurement was performed. Further, with respect to the above-described polarizing plate which had been treated at 60° C. and 90% RH for 1,000 hours, similar measurement was performed and evaluations were made based on the following criteria.

A: No variation of the effective viewing angle was noted.
B: Slight variation of the effective viewing angle was noted.
C: The effective viewing angle was narrowed.
D: The effective viewing angle was significantly narrowed.

The above evaluation results are shown in following Table 4.

TABLE 4

| Liquid crystal display device No. | *1 | 500 hours | 1000 hours | Remarks |
|---|---|---|---|---|
| 1 | 1 | B | C | Invention |
| 2 | 2 | A | A | Invention |
| 3 | 3 | A | A | Invention |
| 4 | 4 | A | A | Invention |
| 5 | 5 | A | A | Invention |
| 6 | 6 | A | A | Invention |
| 7 | 7 | A | A | Invention |
| 8 | 8 | B | C | Invention |
| 9 | 9 | A | A | Invention |
| 10 | 10 | A | B | Invention |
| 11 | 11 | A | B | Invention |
| 12 | 12 | B | B | Invention |
| 13 | 13 | A | B | Invention |
| 14 | 14 | A | B | Invention |
| 15 | 15 | A | A | Invention |
| 16 | 16 | A | A | Invention |
| 17 | 17 | B | B | Invention |
| 18 | 18 | B | C | Invention |
| 19 | 19 | B | C | Invention |
| 20 | 20 | B | B | Invention |
| 21 | 21 | A | A | Invention |
| 22 | 22 | B | C | Invention |
| 23 | 23 | A | A | Invention |
| 24 | 24 | A | A | Invention |
| 25 | 25 | A | A | Invention |
| 26 | 26 | B | B | Invention |
| 27 | 27 | A | A | Invention |
| 28 | 28 | A | A | Invention |
| 29 | 29 | A | A | Invention |
| 30 | 30 | A | A | Invention |
| 31 | 31 | B | C | Invention |
| 32 | 32 | D | D | Comparison |
| 33 | 33 | D | D | Comparison |
| 34 | 34 | C | D | Comparison |
| 35 | 35 | D | D | Comparison |
| 36 | 36 | D | D | Comparison |
| 37 | 37 | B | C | Invention |
| 38 | 38 | A | A | Invention |
| 39 | 39 | A | A | Invention |

*1: Polarizing plate protective film No.

It is clear from Table 4 that a liquid crystal display device utilizing a polarizing plate of this invention is an IPS mode type liquid crystal display device exhibiting excellent viewing angle stability.

Example 2

A liquid crystal display device was prepared in a similar manner to Example 1, except that a Hitachi Liquid Crystal TV, model Wooo W32-L7000, was utilized instead of Hitachi Liquid Crystal TV, model Wooo W17-LC-50, and evaluations similar to Example 1 were made to reproduce the results of Example 1, that is, liquid crystal display devices according to this invention exhibited excellent viewing angle stability.

What is claimed is:
1. A polarizing plate protective film comprising:
a cellulose ester;
a polyester having no aromatic ring and having a weight average molecular weight of not less than 500 and not more than 10,000, the polyester containing a compound represented by Formula (B1) or (B2):

$$B_1\text{-}(G\text{-}A\text{-})mG\text{-}B_1 \qquad \text{Formula (B1)}$$

wherein $B_1$ is mono-carboxylic acid having 1-12 carbon atoms; G is dihydric alcohol having 2-12 carbon atoms; and A is dibasic acid having 2-12 carbon atoms; neither of $B_1$, G and A contains an aromatic ring; and m is a repeating number that is an integer not less than 1:

$$B_2\text{-}(A\text{-}G\text{-})nA\text{-}B_2 \qquad \text{Formula (B2)}$$

wherein $B_2$ is monohydric alcohol having 1-12 carbon atoms; G is dihydric alcohol having 2-12 carbon atoms; A is dibasic acid having 2-12 carbon atoms; neither of $B_2$, G and A contains an aromatic ring; and n is a repeating number that is an integer not less than 1;

a saccharide ester compound in which all or a part of OH groups in Compound (A) or in Compound (B) are esterified, wherein Compound (A) consists of one of a furanose structure and a pyranose structure, and Compound (B) consists of two to twelve of at least one type of a furanose structure and a pyranose structure which are bonded in Compound (B);

wherein the polarizing plate protective film has a thickness of 20 μm to 60 μm and exhibits Ro of 0 to 5 nm and Rt of −10 to +20 nm, which are represented by the following equations:

$$Ro=(nx-ny)\times d \qquad \text{Equation (i)}$$

$$Rt=((nx+ny)/2-nz)\times d \qquad \text{Equation (ii)}$$

wherein, Ro is a retardation value in the film plane; Rt is a retardation value in the thickness direction; nx is a refractive index in the slow axis direction in the film plane; ny is a refractive index in the fast axis direction in the film plane; nz is a refractive index in the film thickness direction (refractive index was measured under an environment of 23° C. and 55% RH, at a wavelength of 590 nm); and d is a film thickness (nm)), wherein the polarizer protective film has a variation less than 10 nm in thickness direction retardation value due to a humidity change between 20% RH at 23° C. and 80% RH at 50° C. when the film has a film thickness of 40 μm.

2. The polarizing plate protective film described in claim 1, wherein the polarizing plate protective film further comprising at least one kind of additive selected from Formulas (1), (2), (3), (4), (5), (6), (7), (8), (9), (10), (11), (12), (13) and (14):

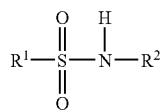

Formula (1)

wherein $R^1$ and $R^2$ are each independently an alkyl group which may be provided with a substituent or an aryl group which may be provided with a substituent:

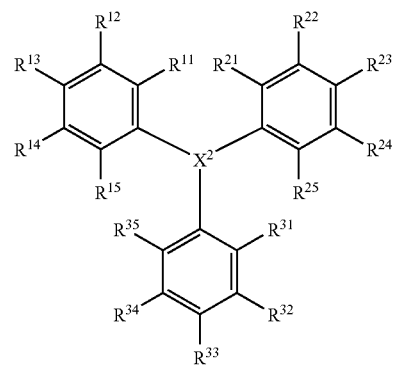

Formula (2)

wherein $X^2$ is B, C—R (R is a hydrogen atom or a substituent) or N; $R^{11}$, $R^{12}$, $R^{13}$, $R^{14}$, $R^{15}$, $R^{21}$, $R^{22}$, $R^{23}$, $R^{24}$, $R^{25}$, $R^{31}$, $R^{32}$, $R^{33}$, $R^{34}$ and $R^{35}$ are a hydrogen atom or a substituent:

$$R^1\text{—(OH)}n \qquad \text{Formula (3)}$$

wherein $R^1$ is an n-valent organic group and n is a positive integer of not less than 2:

$$Y^{31}\text{—}L^{31}\text{—}Y^{32} \qquad \text{Formula (4)}$$

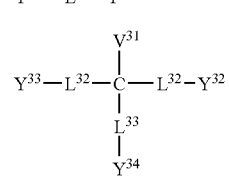

Formula (5)

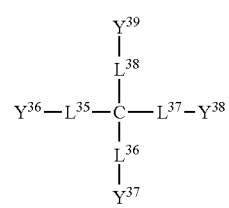

Formula (6)

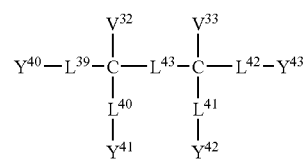

Formula (7)

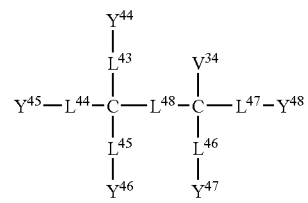

Formula (8)

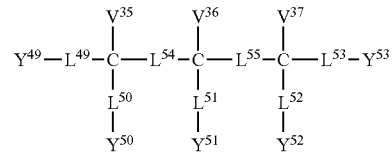

Formula (9)

-continued

Formula (10)

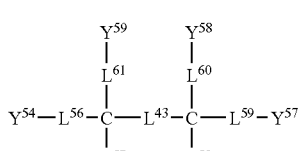

Formula (11)

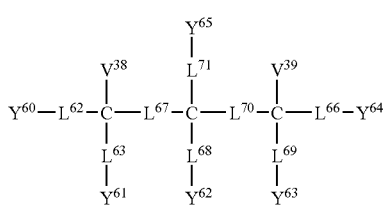

Formula (12)

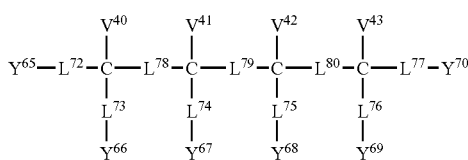

wherein $Y^{31}$-$Y^{70}$ are each independently an acyloxy group having 1-20 carbon atoms, an alkoxycarbonyl group having 2-20 carbon atoms, an amido group having 1-20 carbon atoms, a carbamoyl group having 1-20 carbon atoms or a hydroxyl group; $V^{33}$-$V^{43}$ are each independently a hydrogen atom or an aliphatic group having 1-20 carbon atoms; $L^{31}$-$L^{80}$ are each independently a single bond or a divalent saturated connecting group having 0-20 carbon atoms; and $V^{31}$-$V^{43}$ and $L^{31}$-$L^{80}$ may be further provided with a substituent:

Formula (13)

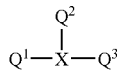

wherein $Q^1$, $Q^2$ and $Q^3$ are each independently a group having a 5-member ring or a 6-member ring; the ring includes a hydrocarbon ring and a heterocyclic ring; and the ring may form a condensed ring together with other rings:

Formula (14)

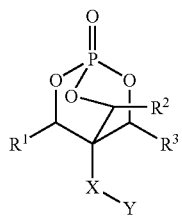

wherein $R^1$, $R^2$ and $R^3$ are each independently a hydrogen atom or an alkyl group having 1-5 carbon atoms; X is a single bond, —O—, —CO—, an alkylene group or an arylene group; and Y is a hydrogen atom, an alkyl group, an aryl group or an aralkyl group.

3. A polarizing plate comprising a polarizing plate protective film described in claim 1 being pasted onto at least one surface of a polarizer.

4. A liquid crystal display device comprising the polarizing plate described in claim 3 being pasted on at least one surface of a liquid crystal cell.

5. The liquid crystal display device described in claim 4, wherein the liquid crystal display device is an IPS mode type liquid crystal display device.

* * * * *